United States Patent
Bharatia et al.

(10) Patent No.: US 11,729,854 B2
(45) Date of Patent: Aug. 15, 2023

(54) NETWORK ASSISTED CONNECTION

(71) Applicant: Comcast Cable Communications, LLC, Philadelphia, PA (US)

(72) Inventors: Jayshree Bharatia, Plano, TX (US); Esmael Dinan, McLean, VA (US); Kyungmin Park, Herndon, VA (US); Peyman Talebi Fard, Vienna, VA (US); Weihua Qiao, Fairfax, VA (US); Jinsook Ryu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/733,535

(22) Filed: Jan. 3, 2020

(65) Prior Publication Data
US 2020/0221527 A1    Jul. 9, 2020

Related U.S. Application Data

(60) Provisional application No. 62/787,843, filed on Jan. 3, 2019.

(51) Int. Cl.
*H04W 76/20* (2018.01)
*H04W 76/15* (2018.01)
*H04W 8/02* (2009.01)
*H04W 60/00* (2009.01)

(52) U.S. Cl.
CPC ............ *H04W 76/20* (2018.02); *H04W 8/02* (2013.01); *H04W 60/00* (2013.01); *H04W 76/15* (2018.02)

(58) Field of Classification Search
CPC ..... H04W 76/20; H04W 76/15; H04W 60/00; H04W 8/02
See application file for complete search history.

(56) References Cited

U.S. PATENT DOCUMENTS

| | | | |
|---|---|---|---|
| 2018/0198867 A1* | 7/2018 | Dao ................... | H04W 76/34 |
| 2019/0274178 A1* | 9/2019 | Salkintzis ............ | H04W 76/16 |
| 2020/0178196 A1* | 6/2020 | Wang .................. | H04W 48/18 |
| 2020/0374965 A1* | 11/2020 | Liu ..................... | H04W 72/12 |

FOREIGN PATENT DOCUMENTS

CN       111107664 A  *  5/2020

OTHER PUBLICATIONS

May 29, 2020—European Extended Search Report—EP 20150227.5.
S2-188220 SA WG2 Meeting #128bis, Sophia Antipolis, France, Aug. 20-24, Source: ZTE, Title: QoS flow handling for Multi-Access PDU session.

(Continued)

*Primary Examiner* — Jinsong Hu
*Assistant Examiner* — Farideh Madani
(74) *Attorney, Agent, or Firm* — Banner & Witcoff, Ltd.

(57) ABSTRACT

Wireless communications are described for network assisted connection. A wireless device may send an indication of a multi-access packet data unit (PDU) session capability. A computing device may send (e.g., based on the indication) an indication to the wireless device to modify a single-access PDU session to a multi-access PDU session.

25 Claims, 23 Drawing Sheets

(56) References Cited

OTHER PUBLICATIONS

3GPP TR 23.793 V2.0.0 (Dec. 2018); Technical Report; 3rd Generation Partnership Project; Technical Specification Group Services and System Aspects; Study on Access Traffic Steering, Switching and Splitting support in the 5G system architecture (Release 16).
3GPP TS 24.302 V13.5.0 (Mar. 2016); Technical Specification; 3rd Generation Partnership Project; Technical Specification Group Core Network and Terminals; Access to the 3GPP Evolved Packet Core (EPC) via non-3GPP access networks; Stage 3 (Release 13).
3GPP TS 36.331 V15.2.2 (Jun. 2018); Technical Specification; 3rd Generation Partnership Project; Technical Specification Group Radio Access Network; Evolved Universal Terrestrial Radio Access (E-UTRA); Radio Resource Control (RRC); Protocol specification (Release 15).
S2-175745 3GPP TSG-SA WG2 Meeting #122bis, Sophia Antipolis, France, Aug. 21-25, 2017, Source: InterDigital Inc., Title: New key issue for TR 23.793: Support for a single PDU session over multiple accesses.
S2-176291 3GPP TSG-SA WG2 Meeting #122bis, Sophia Antipolis, France, Aug. 21-25, 2017, Source: Nokia, Alcatel-Lucent Shanghai Bell, ZTE, InterDigital Inc, BT Plc, LG Electronics, Huawei, Hisilicon, Oracle, Motorola Mobility, Lenovo, Title: 23.793: ATSSS Key Issues.
S2-180295 3GPP TSG-SA WG2 Meeting #125, Gothenburg, Sweden, Jan. 22-26, 2018, Source: BT Plc, Title: ATSSS architecture update.
S2-180449 3GPP TSG-SA WG2 Meeting #125, Gothenburg, Sweden, Jan. 22-26, 2018, Source: InterDigital Inc., Title: UE Requested Multi-access PDU Session Establishment.
S2-180620 3GPP TSG-SA WG2 Meeting #125, Gothenburg, Sweden, Jan. 22-26, 2018, Source: ITRI, Title: Update to KI#5: Multi-access PDU sessions (untrusted access).
S2-180689 3GPP TSG-SA WG2 Meeting #125, Gothenburg, Sweden, Jan. 22-26, 2018, Source: CATT, Title: Multi-access PDU session support for Non-IP type PDU sessions.
S2-180765 3GPP TSG-SA WG2 Meeting #125, Gothenburg, Sweden, Jan. 22-26, 2018, Source: ETRI, Title: 23.793: UE Requested Multi-access PDU Session Establishment.
S2-180983 3GPP TSG-SA WG2 Meeting #125, Gothenburg, Sweden, Jan. 22-26, 2018, Source: OPPO, Title: Key Issue 1 for ATSSS.
S2-180987 3GPP TSG-SA WG2 Meeting #125, Gothenburg, Sweden, Jan. 22-26, 2018, Source: Motorola Mobility, Lenovo, Title: Establishment of MA-PDU Sessions.
S2-181361 3GPP TSG-SA WG2 Meeting #125, Gothenburg, Sweden, Jan. 22-26, 2018, Source: ZTE, Oracle, Convida Wireless, Title: 23.793: Key Issue update for Traffic Splitting over Multi-access.
S2-181596 3GPP TSG-SA WG2 Meeting #126, Montreal, Canada, Feb. 26-Mar. 2, 2018, Source: CATT, Title: Multi-access PDU session support for Non-IP type PDU sessions.
S2-182015 3GPP TSG-SA WG2 Meeting #126, Montreal, Canada, Feb. 26-Mar. 2, 2018, Source: InterDigital Inc., Title: UE Requested Multi-access PDU Session Establishment.
S2-182017 3GPP TSG-SA WG2 Meeting #126, Montreal, Canada, Feb. 26-Mar. 2, 2018, Source: InterDigital Inc., Title: Network-controlled Traffic Steering for Multi-access PDU Session.
S2-182043 3GPP TSG-SA WG2 Meeting #126, Montreal, Canada, Feb. 26-Mar. 2, 2018, Source: LG Electronics, Title: ATSSS Solution—Multi-Access PDU Session Establishment.
S2-182123 3GPP TSG-SA WG2 Meeting #126, Montreal, Canada, Feb. 26-Mar. 2, 2018, Source: ETRI, Title: 23.793: Proposed Solution for Multi-access PDU Session.
S2-182243 3GPP TSG-SA WG2 Meeting #126, Montreal, Canada, Feb. 26-Mar. 2, 2018, Source: ITRI, Title: MA-PDU session release operations.
S2-182504 3GPP TSG-SA WG2 Meeting #126, Montreal, Canada, Feb. 26-Mar. 2, 2018, Source: Motorola Mobility, Lenovo, Title: Update of Solution 2.
S2-182505 3GPP TSG-SA WG2 Meeting #126, Montreal, Canada, Feb. 26-Mar. 2, 2018, Source: ITRI, Title: Update the existing solution to Support of Multi-Access PDU Sessions.
S2-182883 3GPP TSG-SA WG2 Meeting #126, Montreal, Canada, Feb. 26-Mar. 2, 2018, Souice: Broadcom, Title: Architectural Extension for ATSSS Solution 1.
S2-182884 3GPP TSG-SA WG2 Meeting #126, Montreal, Canada, Feb. 26-Mar. 2, 2018, Source: Samsung, Title: TR 23.793: ATSSS architecture updates.
S2-182885 3GPP TSG-SA WG2 Meeting #126, Montreal, Canada, Feb. 26-Mar. 2, 2018, Source: OPPO, Title: Solution: NCP Based Solution Improvement.
S2-182886 3GPP TSG-SA WG2 Meeting #126, Montreal, Canada, Feb. 26-Mar. 2, 2018, Source: Huawei, HiSilicon, OPPO, Title: Solution: Solution 3: Multi-access PDU Session Establishment with NCP.
S2-183550 3GPP TSG-SA WG2 Meeting #127, Sanya, China, Apr. 16-20, 2018, Source: InterDigital Inc., Title: UE Requested Multi-access PDU Session Establishment.
S2-183551 3GPP TSG-SA WG2 Meeting #127, Sanya, China, Apr. 16-20, 2018, Source: InterDigital Inc., Title: Network-controlled Traffic Steering for Multi-access PDU Session.
S2-183677 3GPP TSG-SA WG2 Meeting #127, Sanya, China, Apr. 16-20, 2018, Source: ITRI, Title: Update separate establishment for a MA-PDU Session in Solution 2.
S2-184473 3GPP TSG-SA WG2 Meeting #127, Sanya, China, Apr. 16-20, 2018, Source: Motorola Mobility, Lenovo, Title: Solution 2 Update: NW-Requested Establishment of MA-PDU session.
S2-184474 3GPP TSG-SA WG2 Meeting #127, Sanya, China, Apr. 16-20, 2018, Source: LG Electronics, Motorola Mobility, Lenovo, InterDigital Inc., Title: ATSSS Solution—Update of Solution 2.
S2-184475 3GPP TSG-SA WG2 Meeting #127, Sanya, China, Apr. 16-20, 2018, Source: Huawei, HiSilicon, Title: ATSSS Rule definition and update of TFCP.
S2-184476 3GPP TSG-SA WG2 Meeting #127, Sanya, China, Apr. 16-20, 2018, Source: BT Plc, Broadcom, Deutsche Telekom, Title: Architectural Updates for ATSSS Solution 1.
S2-184829 3GPP TSG-SA WG2 Meeting #127bis, Newport Beach, USA, May 28-Jun. 1, 2018, Source: InterDigital Inc., Title: Solution 2 Update: Modifying Multi-access PDU Session as single-access PDU.
S2-185001 3GPP TSG-SA WG2 Meeting #127bis, Newport Beach, USA, May 28-Jun. 1, 2018, Source: ETRI, Title: Updating 6.2 Solution 2 to add a procedure for Multi-Access PDU Session Modification.
S2-185624 3GPP TSG-SA WG2 Meeting #127bis, Newport Beach, USA, May 28-Jun. 1, 2018, Source: Huawei, HiSilicon, Title: Solution for the UL CL case on the Multi-access PDU sessions.
Aug. 18, 2022—EP Office Action—EP App. No. 20150227.5.

* cited by examiner

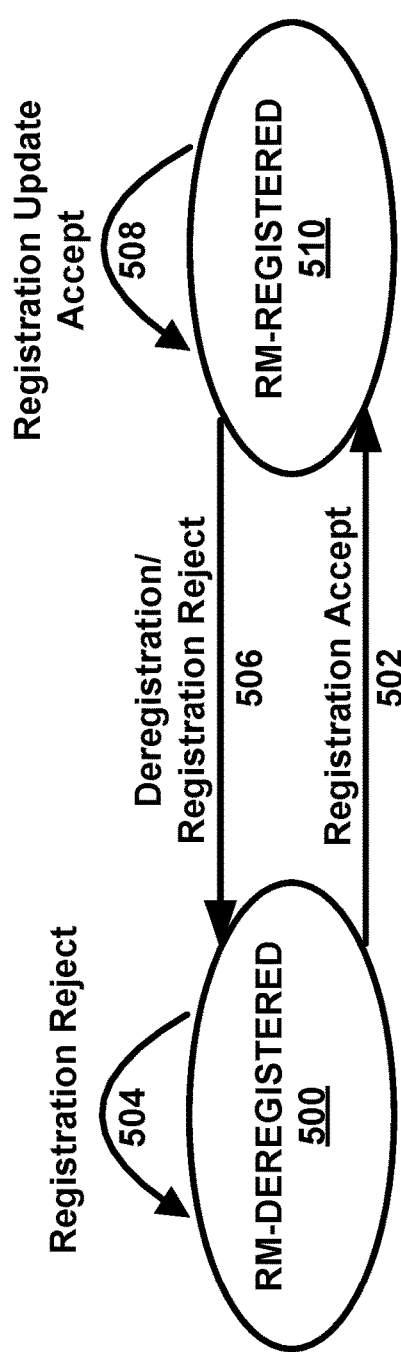
FIG. 5A RM State Transition in a Wireless Device
FIG. 5B RM State Transition in an AMF

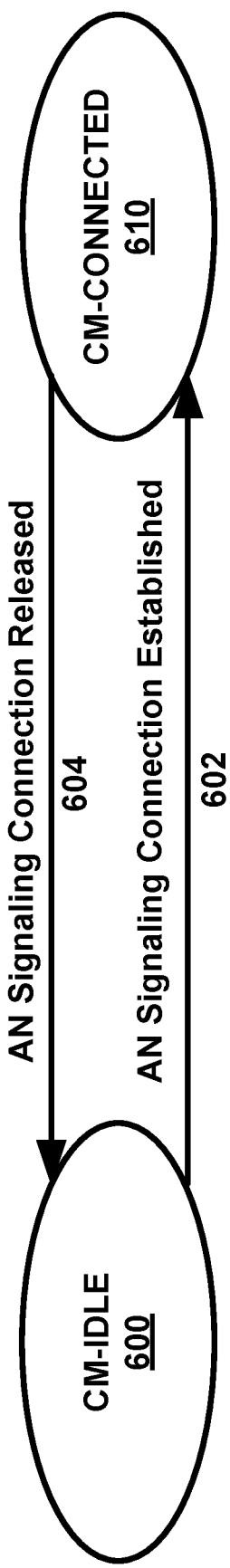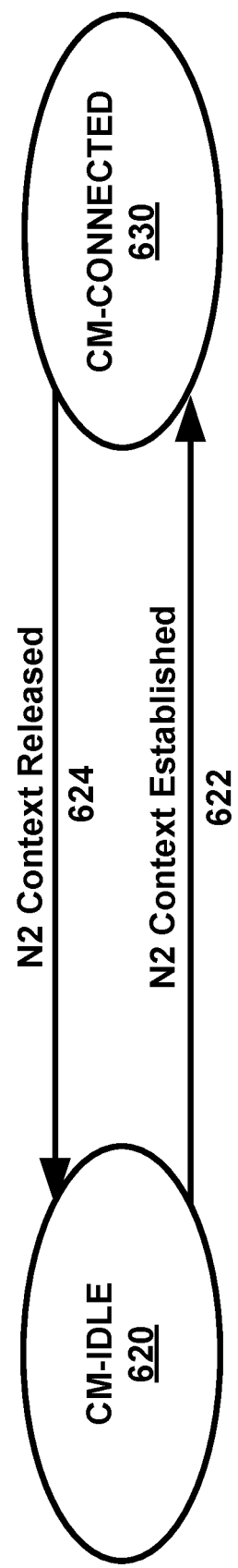

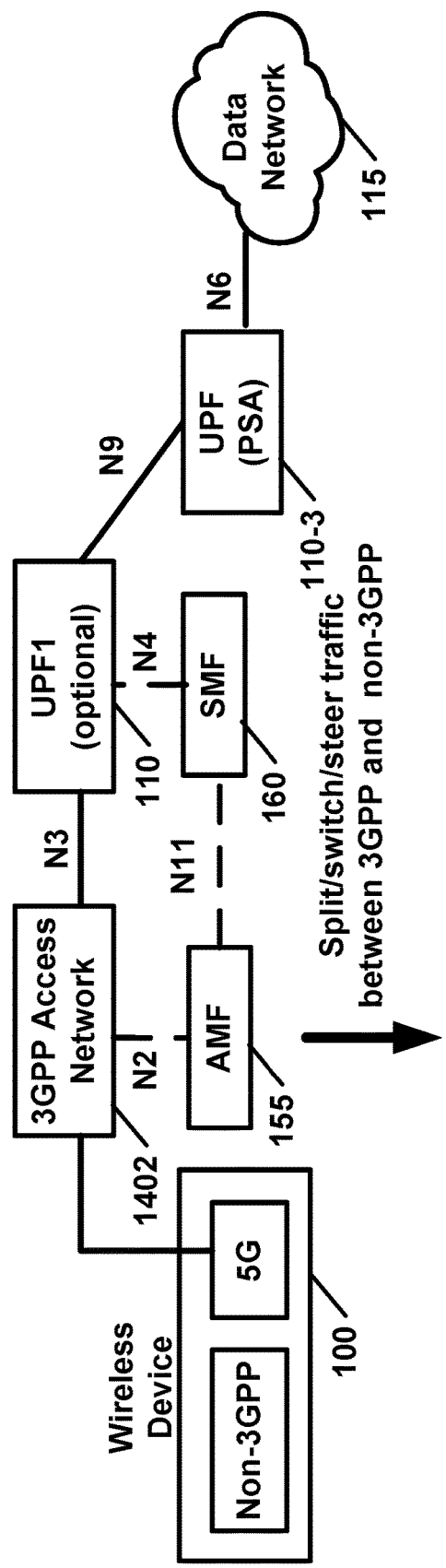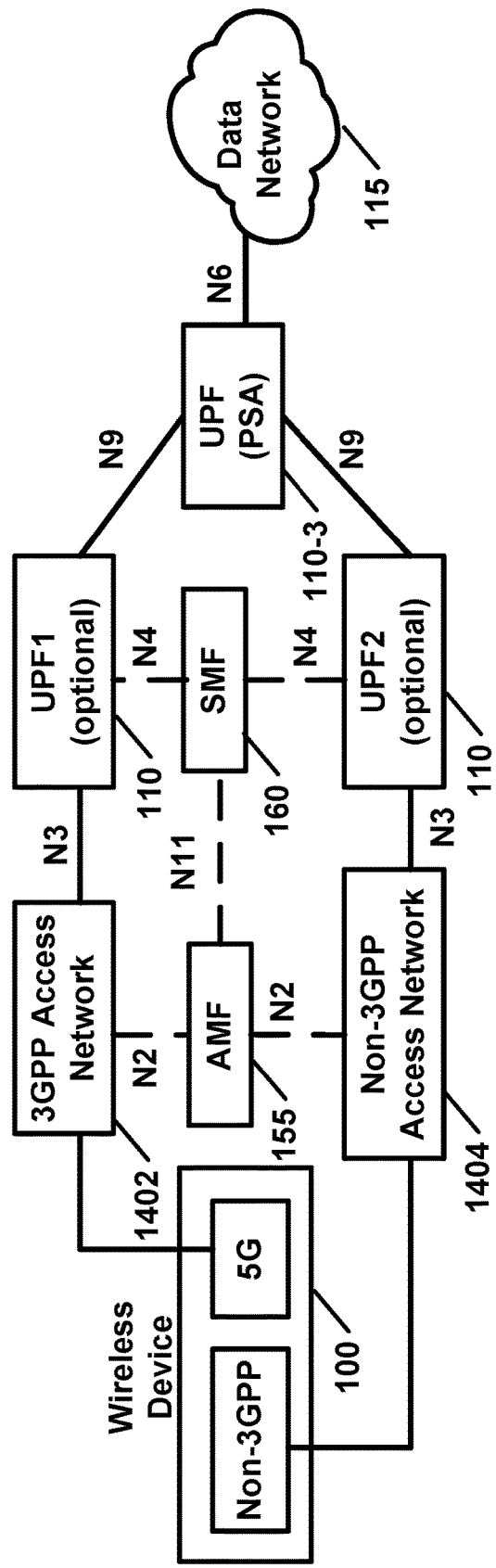

Rule 1

Priority: 1
Traffic Descriptor: Application-x,
Mode: Active-Standby; Active Network: First, Standby Network: non-3GPP

Rule 2

Priority 2
Traffic Descriptor: TCP traffic with destination address 10.10.10.1
Mode: Active-Standby; Active Network: First, Standby Network: None

Rule 3

Priority: Default
Traffic Descriptor: All traffic
Mode: Active-Standby; Active Network: Second, Standby access: First

NETWORK ASSISTED CONNECTION

CROSS-REFERENCE TO RELATED APPLICATIONS

This application claims the benefit of U.S. Provisional Application No. 62/787,843, titled "Network Initiated Multi-Access Packet Data Session Update" and filed on Jan. 3, 2019. The above-referenced application is hereby incorporated by reference in its entirety.

BACKGROUND

Wireless devices may connect to base stations through network connections. Wireless devices may communicate with one or more base stations and/or other devices using different access technologies.

SUMMARY

The following summary presents a simplified summary of certain features. The summary is not an extensive overview and is not intended to identify key or critical elements.

A wireless device may include radio capability information as part of a registration procedure, for example, to indicate multi-access packet data unit (PDU) session capability. A core network may delay establishing, with the wireless device, the multi-access PDU session, for example, until after establishing a single-access PDU session. The wireless device may receive a session modification command to request to the wireless device to change the single-access PDU session to a multi-access PDU session. The wireless device may send a response, for example, indicating a determination of whether the wireless device is within the coverage and/or in the coverage area of a second access network.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A and FIG. 5B show example registration management state transitions for a wireless device and an access and mobility management function (AMF).
FIG. 6A and FIG. 6B show example connection management state transitions for a wireless device and an AMF.
FIG. 14A and FIG. 14B show example network connectivity associated with modifying PDU sessions.
FIG. 18 shows example rules for access traffic steering, switching, and/or splitting.

DETAILED DESCRIPTION

Figure 1:
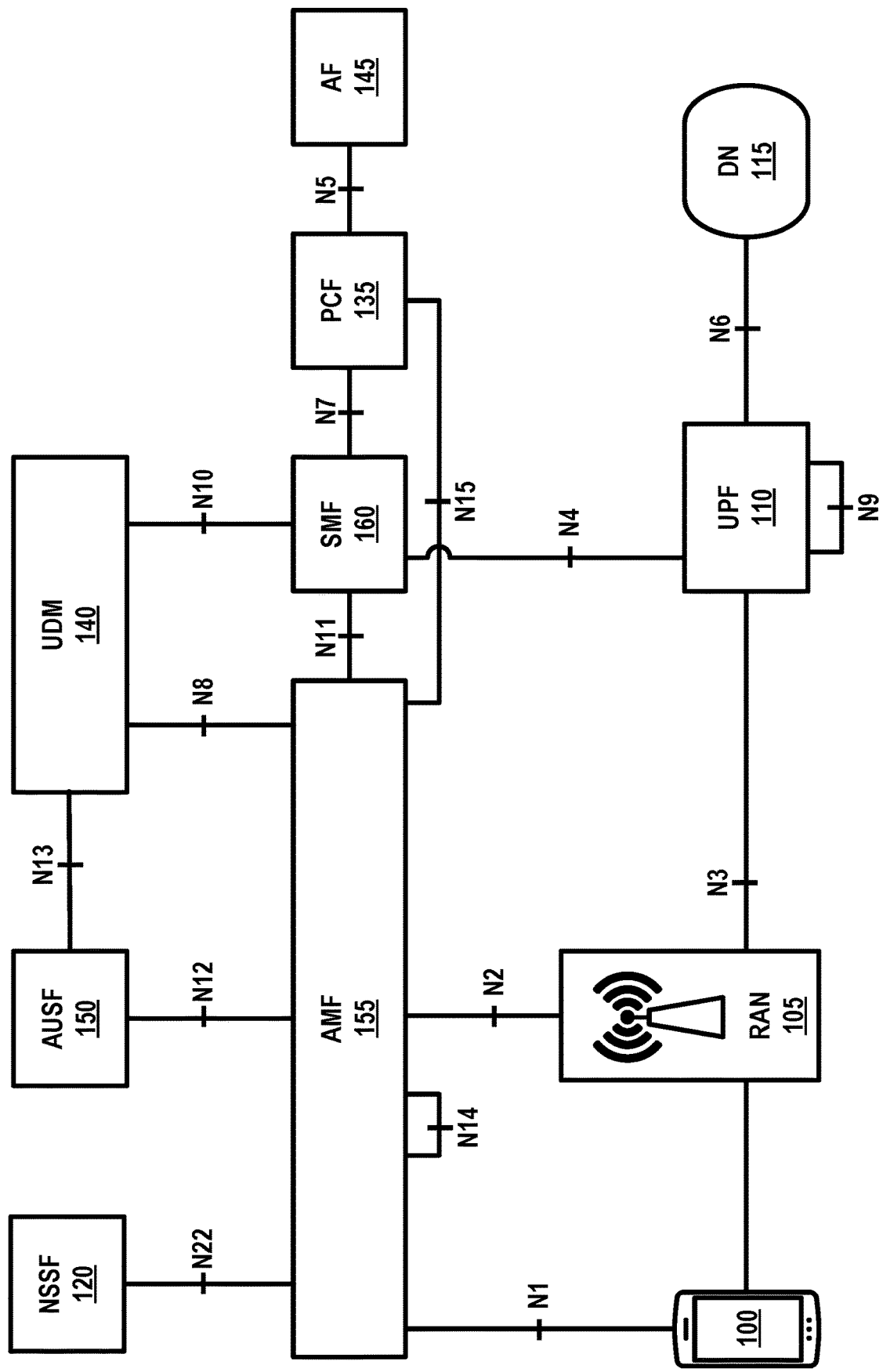
FIG. 1 shows an example 5G system architecture.

The accompanying drawings, which form a part hereof, show examples of the disclosure. It is to be understood that the examples shown in the drawings and/or discussed herein are non-exclusive and that there are other examples of how the disclosure may be practiced.

Examples of enhanced features and functionalities in networks, such as 4G networks, 5G networks, or other networks or systems are described. More particularly, the technology herein may relate to a core network (e.g., 5GC), a 5G network, 4G, and/or other systems. The communication systems may comprise any quantity and/or type of devices, such as, for example, computing devices, wireless devices, base stations, network devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices.

Figure 2:
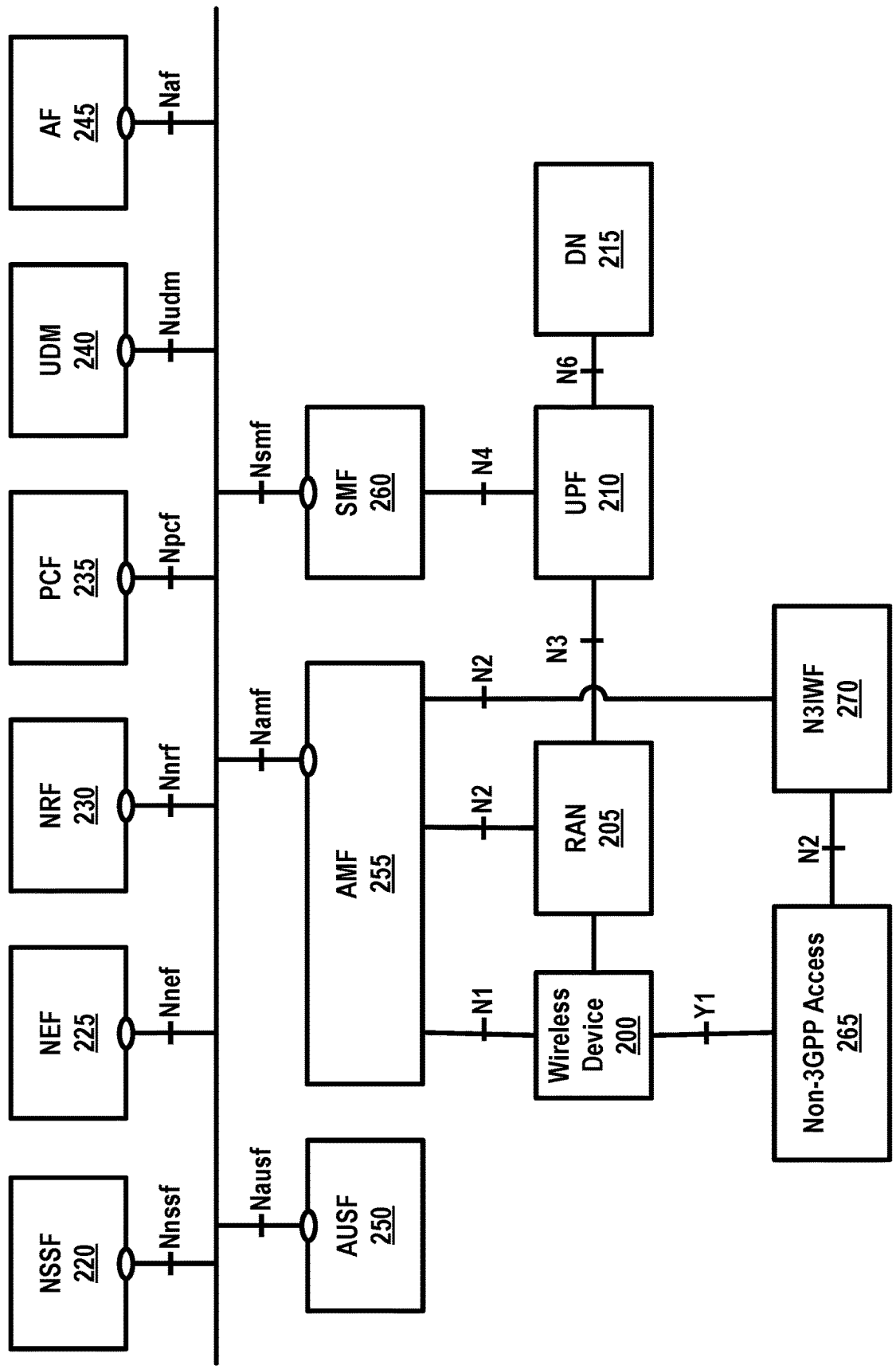
FIG. 2 shows an example 5G system.

The following acronyms are used throughout the present disclosure, provided below for convenience although other acronyms may be introduced in the detailed description.
5G 5th generation mobile networks
5GC 5G Core Network
5GS 5G System
5G-AN 5G Access Network
5QI 5G QoS Indicator
ACK Acknowledgement
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
DRX Discontinuous Reception F-TEID Fully Qualified TEID
gNB next generation Node B
GPSI Generic Public Subscription Identifier
GTP GPRS Tunneling Protocol
GUTI Globally Unique Temporary Identifier
HPLMN Home Public Land Mobile Network
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
PRACH Physical Random Access Channel
PLMN Public Land Mobile Network
RAN Radio Access Network
QFI QoS Flow Identity
RM Registration Management
S1-AP S1 Application Protocol
SBA Service Based Architecture
SEA Security Anchor Function
SCM Security Context Management
SI System Information
SIB System Information Block
SMF Session Management Function
SMSF SMS Function
S-NSSAI Single Network Slice Selection Assistance information
SUCI Served User Correlation ID
SUPI Subscriber Permanent Identifier
TEID Tunnel Endpoint Identifier
UE User Equipment
UL Uplink
UL CL Uplink Classifier
UPF User Plane Function
VPLMN Visited Public Land Mobile Network FIG. 1 and FIG. 2 show examples of system architecture (e.g., 5G system architecture). A 5G access network may comprise an access network in communication with and/or connecting to and a core network (e.g., a 5G core network). An example access network (e.g., a 5G access network) may comprise an access network connected to a core network (e.g., 5G core network). An access network may comprise a RAN 105 (e.g., NG-RAN) and/or a non-3GPP AN. The core network (e.g., 5G core network) may communicate with one or more access networks (e.g., 5G access networks (5G-AN) and/or RANs 105. The 5GC may comprise functional elements or network functions as in example FIG. 1 and example FIG. 2, where interfaces may be employed for communication among the functional elements and/or network elements. A network function may be a processing function in a network that has a functional behavior and interfaces. A network function may be implemented as a network element on a dedicated hardware, a base station, and/or as a software instance running on a dedicated hardware, shared hardware, and/or as a virtualized function instantiated on an appropriate platform.

A wireless device 100 may communicate with the RAN 105. The RAN 105 may comprise an access network. The wireless device 100 may communicate with a first network entity/component (for example and purposes of explanation, an AMF 155) via a second network entity/component (for example and purposes of explanation, a N1 interface). The RAN 105 may communicate with the AMF 155 via a fourth network entity/component (for example and purposes of explanation, an N2 interface). The RAN 105 may communicate with a fifth network entity/component (for example and purposes of explanation, a UPF 110) via a sixth network entity/component (for example and purposes of explanation, an N3 interface). The UPF 110 may communicate with a seventh network entity/component (for example and purposes of explanation, a data network (DN) 115) via an eighth network entity/component (for example and purposes of explanation, an N6 interface). The UPF 110 may communicate with itself and/or another UPF 110 via a ninth network entity/component (for example and purposes of explanation, an N9 interface). The UPF 110 may communicate with a tenth network entity/component (for example and purposes of explanation, an SMF 160) via an eleventh network entity/component (for example and purposes of explanation, an N4 interface). The AMF 155 may communicate with itself and/or another AMF 155 via a twelfth network entity/component (for example and purposes of explanation, an N14 interface). The AMF 155 may communicate with a thirteenth network entity/component (for example and purposes of explanation, an NSSF 120) via a fourteenth network entity/component (for example and purposes of explanation, an N22 interface. The AMF 155 may communicate with a fifteenth network entity/component (for example and purposes of explanation, a UDM 140) via a sixteenth network entity/component (for example and purposes of explanation, an N8 interface). The AMF 155 may communicate with a seventeenth network entity/component (for example and purposes of explanation, an AUSF 150) via an eighteenth network entity/component (for example and purposes of explanation, an N12 interface). The AMF 155 may communicate with a nineteenth network entity/component (for example and purposes of explanation, a PCF 135) via a twentieth network entity/component (for example and purposes of explanation, an N15 interface). The AMF 155 may communicate with the SMF 160 via a twenty-first network entity/component (for example and purposes of explanation, an N11 interface). The AUSF 150 may communicate with the UDM 140 via a twenty-second network entity/component (for example and purposes of explanation, an N13 interface). The UDM 140 may communicate with the SMF 160 via a twenty-third network entity/component (for example and purposes of explanation, an N10 interface). The SMF may communicate with the PCF 135 via twenty-fourth network entity/component (for example and purposes of explanation, an N7 interface). The PCF 135 may communicate with a twenty-fifth network entity/component (for example and purposes of explanation, an application function (AF) 145 via a twenty-sixth network entity/component (for example and purposes of explanation, an N5 interface).

FIG. 2 shows an example system comprising access networks and a core network. The access network may comprise, for example, a RAN 205 and a non-3GPP access network 265 (e.g., untrusted non-3GPP access network). Elements shown in FIG. 2 may correspond to elements in FIG. 1 with like numerals.

The access and mobility management function AMF 155, 255 may comprise one or more of the following functionalities: termination of (R)AN CP interface (N2), termination of NAS (N1), NAS ciphering and integrity protection, registration management, connection management, reachability management, mobility management, lawful intercept (for AMF events and interface to LI system), transport for session management, SM messages between a wireless device 100, 200 and an SMF 160, 260, transparent proxy for routing SM messages, access authentication, access authorization, transport for short message service (SMS) messages between wireless device 100, 200 and an SMS function (SMSF), security anchor function (SEA) interaction with the AUSF 150, 250 and the wireless device 100, 200, receiving an intermediate key established as a result of the wireless device 100, 200 authentication process, security context management (SCM), and/or receiving a key from the SEA to derive access network specific keys. A variety of these functionalities may be supported in a single instance of an AMF 155, 255 and/or in multiple instances of AMF 155, 255 as appropriate.

The AMF 155, 255 may support non-3GPP access networks via an N2 interface with N3IWF 170, 270, NAS signaling with a wireless device 100, 200 over N3IWF 170, 270, authentication of wireless devices connected over N3IWF 170, 270, management of mobility, authentication, and separate security context state(s) of a wireless device 100, 200 connected via non-3GPP access 265 or connected via 3GPP access 105, 205 and non-3GPP accesses 265 simultaneously, support of a coordinated RM context valid over 3GPP access 105, 205 and non-3GPP access 265, and/or support of context management (CM) management contexts for the wireless device 100, 200 for connectivity over non-3GPP access. Some functionalities described above may be supported in an instance of a network slice. An AMF 155, 255 region may comprise of one or multiple AMF 155, 255 sets. AMF 155, 255 set may comprise of some AMFs 155, 255 that serve a given area and/or network slice(s). Multiple AMF 155, 255 sets may be per AMF 155, 255 region and/or network slice(s). Application identifiers may be mapped to one or more specific application traffic detection rules. A configured NSSAI may be a NSSAI that has been provisioned in a wireless device 100, 200. DN 115, 215 access identifier (DNAI), for a DNN, may be an identifier of a user plane access to a DN 115, 215. Initial registration may be related to a wireless device 100, 200 registration in a RM-DEREGISTERED state. N2AP wireless device 100, 200 association may be a logical per wireless device 100, 200 association between a 5G AN node and an AMF 155, 255. Wireless device 100, 200 may comprise a N2AP wireless device-TNLA-binding, which may be a binding between a N2AP wireless device 100, 200 association and a specific transport network layer (TNL) association for a given wireless device 100, 200.

The session management function (SMF) 160, 260 may comprise one or more of the following functionalities: session management (e.g., session establishment, modify and release, comprising tunnel maintain between UPF 110, 210 and an AN such as RAN 105, 205 node), wireless device IP address allocation & management (comprising optional authorization), selection and control of user plane function(s), configuration of traffic steering at UPF 110, 210 to route traffic to its proper destination, termination of interfaces towards policy control functions, control part of policy enforcement and QoS, lawful intercept (for SM events and interface to LI system), termination of SM parts of NAS messages, downlink data notification, initiation of AN specific SM information, sent via AMF 155, 255 over N2 to (R)AN 105, 205, determination of SSC mode of a session, roaming functionality, handling local enforcement to apply QoS SLAB (VPLMN), charging data collection and charging interface (VPLMN), lawful intercept (in VPLMN for SM events and interface to LI system), and/or support for interaction with external DN 115, 215 for transport of signaling for PDU session authorization/authentication by external DN 115, 215. One or more of these functionalities may be supported in a single instance of a SMF 160, 260. One or more of the SMF functionalities may be supported in a single instance of the SMF 160, 260.

The user plane function (UPF) 110, 210 may comprise one or more of the following functionalities: anchor point for Intra-/Inter-RAT mobility (if applicable), external PDU session point of interconnect to DN 115, 215, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, and/or downlink data notification triggering. Some of the UPF functionalities may be supported in a single instance of a UPF 110, 210. One or more of functionalities described above may be supported in an instance of a network slice. User plane function(s) (UPF(s)) 110, 210 may handle the user plane path of PDU sessions. A UPF 110, 210 that provides the interface to a data network supports the functionality of a PDU session anchor.

IP address management may comprise allocation and release of the wireless device IP address as well as renewal of the allocated IP address. The wireless device 100, 200 sets the requested PDU type during the PDU session establishment procedure based on its IP stack capabilities and configuration. The SMF 160, 260 may select PDU type of a PDU session as follows: if the SMF 160, 260 receives a request with PDU type set to IP, the SMF 160, 260 may select either PDU type IPv4 or IPv6 based on DNN configuration and/or operator policies. The SMF 160, 260 may also provide a cause value to the wireless device 100, 200 to indicate whether the other IP version (e.g. IPv6 if IPv4 is selected and vice versa) may be supported on the DNN. If the other IP versions are supported, wireless device 100, 200 may request another PDU session to the same DNN for the other IP version. If the SMF 160, 260 receives a request for PDU type IPv4 or IPv6 and the requested IP version may be supported by the DNN, the SMF 160, 260 selects the requested PDU type. The 5GC elements and wireless device 100, 200 support the following mechanisms: during PDU session establishment procedure, the SMF 160, 260 may send the IP address to the wireless device 100, 200 via SM NAS signaling. The IPv4 address allocation and/or IPv4 parameter configuration via DHCPv4 may also be used if the PDU session may be established. IPv6 prefix allocation may be supported via IPv6 stateless auto configuration, if IPv6 may be supported. IPv6 parameter configuration via stateless DHCPv6 may also be supported. The 5GC may support the allocation of a static IPv4 address and/or a static IPv6 prefix based on subscription information in the UDM 140, 240 or based on the configuration on a per-subscriber, per-DNN basis.

The policy control function PCF 135, 235 may support unified policy framework to govern network behavior, provide policy rules to control plane function(s) to enforce them, and/or implement a front end to access subscription information relevant for policy decisions in a user data repository (UDR). The unified data management UDM 140, 240 may comprise an application front end (FE) that comprises the UDM-FE that may be in charge of processing credentials, location management, and/or subscription management. The PCF 135, 235 may be in charge of policy control and the user data repository (UDR) that stores data required for functionalities provided by UDM-FE, plus policy profiles required by the PCF 135, 235. The data stored in the UDR may comprise at least user subscription data, comprising at least subscription identifiers, security credentials, access and mobility related subscription data, session related subscription data, and/or policy data. The network exposure function NEF 125, 225 may provide a means to securely expose the services and capabilities provided by the 3GPP network functions, translate between information exchanged with the AF 145, 245 and information exchanged with the internal network functions, and/or receive information from other network functions.

The NF repository function NRF 130, 230 may support a service discovery function that receives NF discovery requests from a NF instance, provides the information of the discovered NF instances to the NF instance, and/or maintains the information of available NF instances and their supported services.

The functionality of non-3GPP interworking function N3IWF 170, 270 for non-3GPP access 265 may comprise at least one or more of the following: supporting of IPsec tunnel establishment with the wireless device, terminating the IKEv2/IPsec protocols with the wireless device 100, 200 over NWu, relaying over N2 the information needed to authenticate the wireless device 100 and authorize its access to the 5GC, terminating of N2 and N3 interfaces to 5GC for control-plane and user-plane respectively, relaying uplink and downlink control-plane NAS (N1) signaling between the wireless device 100, 200 and AMF 155, 255, handling of N2 signaling from SMF 160, 260 (which may be relayed by AMF 155, 255) related to PDU sessions and QoS, establishing of IPsec security association (IPsec SA) to support PDU session traffic, relaying uplink and downlink user-plane packets between the wireless device 100, 200 and UPF 110, 210, enforcing QoS corresponding to N3 packet marking, considering QoS requirements associated to such marking received over N2, N3 user-plane packet marking in the uplink, local mobility anchor within untrusted non-3GPP access networks 265 using MOBIKE, and/or supporting AMF 155, 255 selection.

The application function AF 145, 245 may interact with the 3GPP core network to provide a variety of services. Based on operator deployment, AF 145, 245 may be trusted by the operator to interact directly with relevant network functions. Application functions not provided by the operator to access directly the network functions may use the external exposure framework (via the NEF 125, 225) to interact with relevant network functions.

The control plane interface between the (R)AN 105, 205 and the 5GC may support connection of multiple different kinds of ANs, such as 3GPP (R)AN 105, 25 and/or N3IWF 170, 270, to the 5GC via a unique control plane protocol. A single N2 AP protocol may be employed for both the 3GPP access 105, 205 and non-3GPP access 265 and/or for decoupling between AMF 155, 255 and other functions such as SMF 160, 260 that may need to control the services supported by AN(s) (e.g. control of the UP resources in the AN 105, 205 for a PDU session). The 5GC may be able to provide policy information from the PCF 135, 235 to the wireless device 100, 100. Such policy information may comprise the following: access network discovery & selection policy, wireless device route selection policy (URSP) that groups to or more of SSC mode selection policy (SSCMSP), network slice selection policy (NSSP), DNN selection policy, and/or non-seamless offload policy. The 5GC may support the connectivity of a wireless device 100, 200 via non-3GPP access networks 265. As shown in example FIG. 5, the registration management, RM may be employed to register or de-register a wireless device 100, 200 with the network, and establish the user context in the network. Connection management may be employed to establish and release the signaling connection between the wireless device 100, 200 and the AMF 155, 255.

A wireless device 100, 200 may need to register with the network to receive services that require registration. The wireless device 100, 200 may update its registration with the network, for example, periodically, after the wireless device is registered, to remain reachable (e.g. periodic registration update), on mobility (e.g. mobility registration update), and/or to update its capabilities or re-negotiate protocol parameters. An initial registration procedure, such as in the examples shown in FIG. 8 and FIG. 9, may involve execution of network access control functions (e.g. user authentication and access authorization based on subscription profiles in UDM 140, 240). As result of the registration procedure, the identity of the serving AMF 155, 255 may be registered in UDM 140, 240. The registration management (RM) procedures may be applicable over both 3GPP access 105, 205 and non-3GPP access 265.

Figure 3:
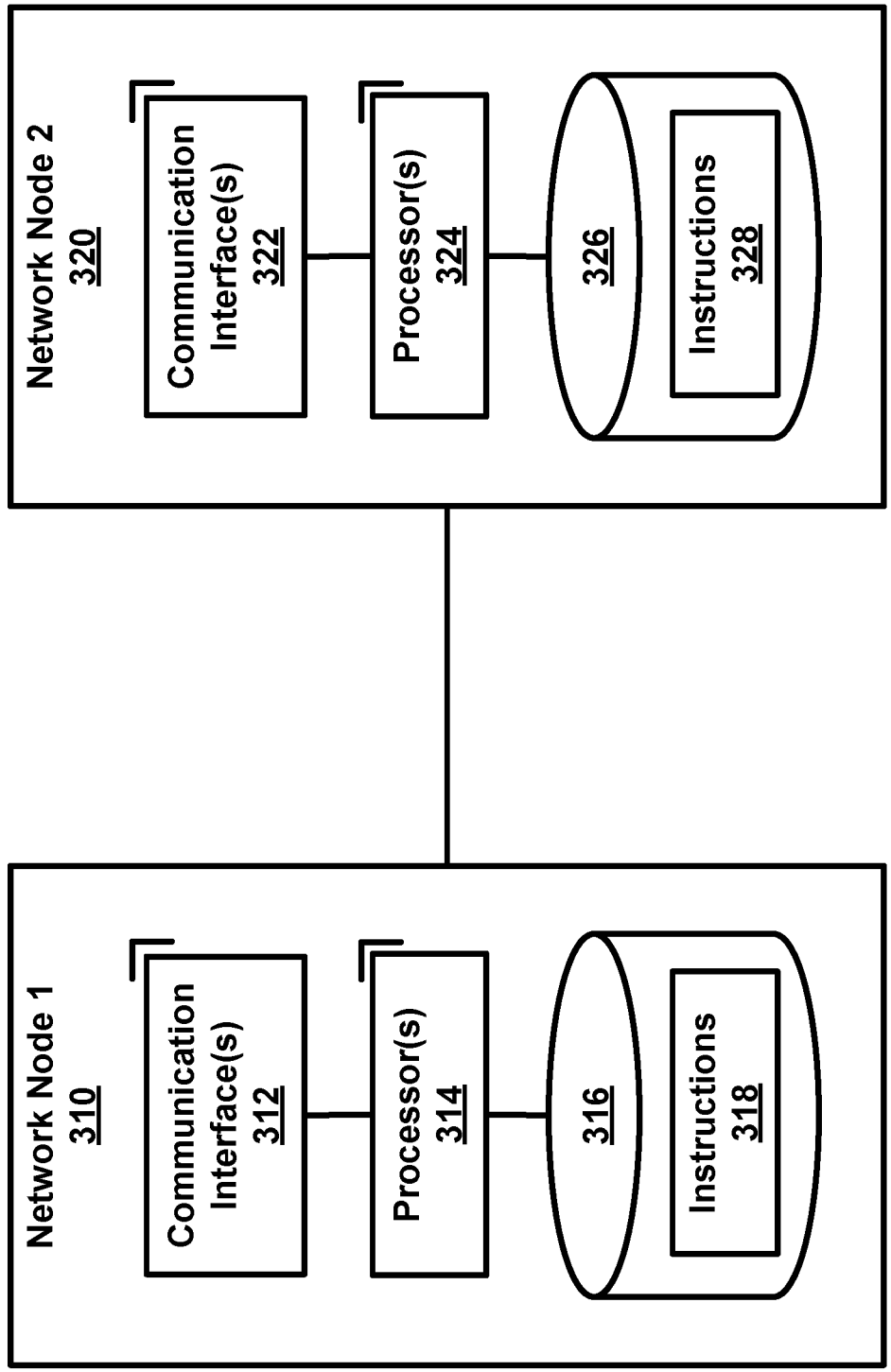
FIG. 3 shows an example of a wireless device and one or more base stations.
Figure 4A:
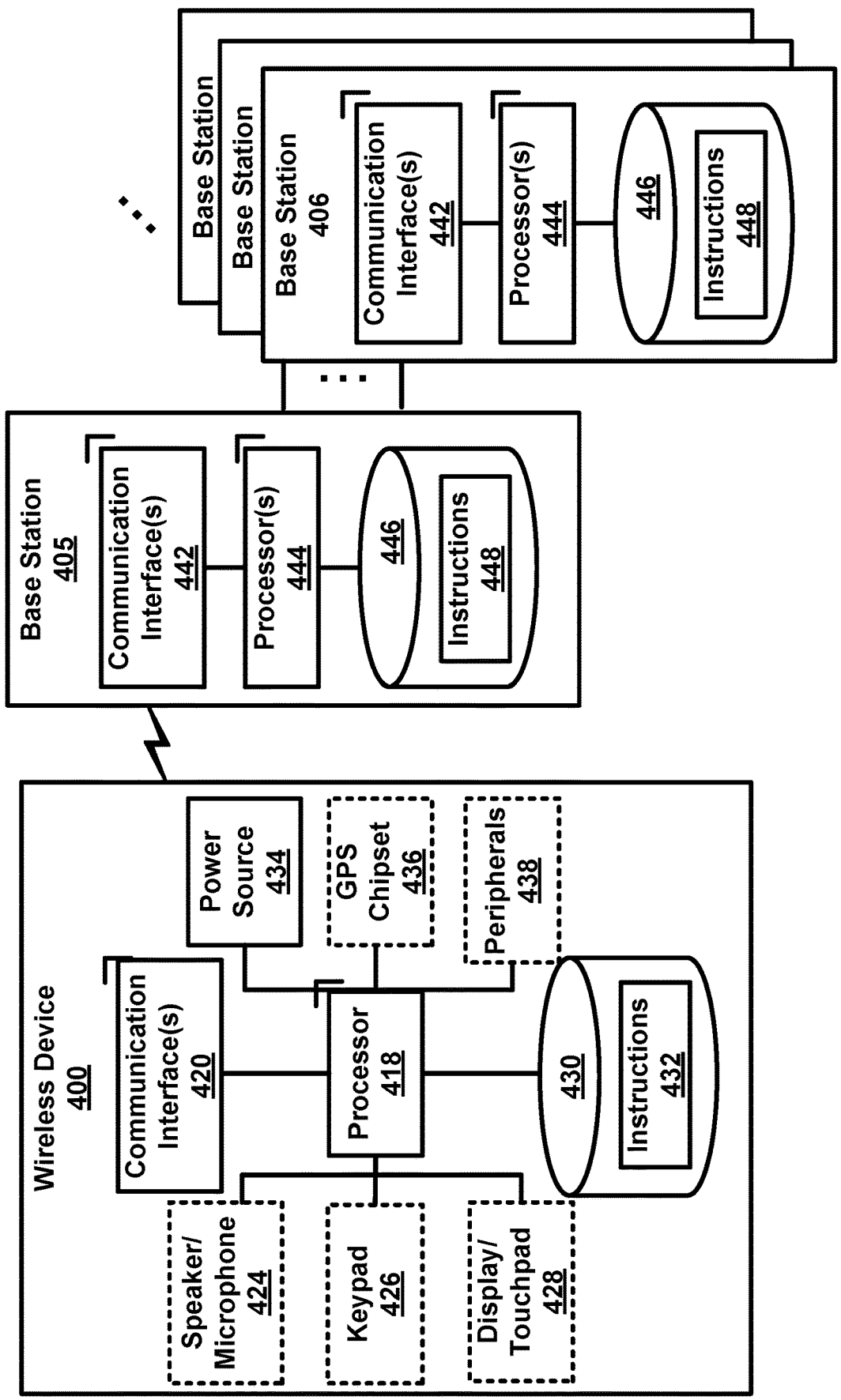
FIG. 4A shows an example of one or more network nodes.
Figure 4B:
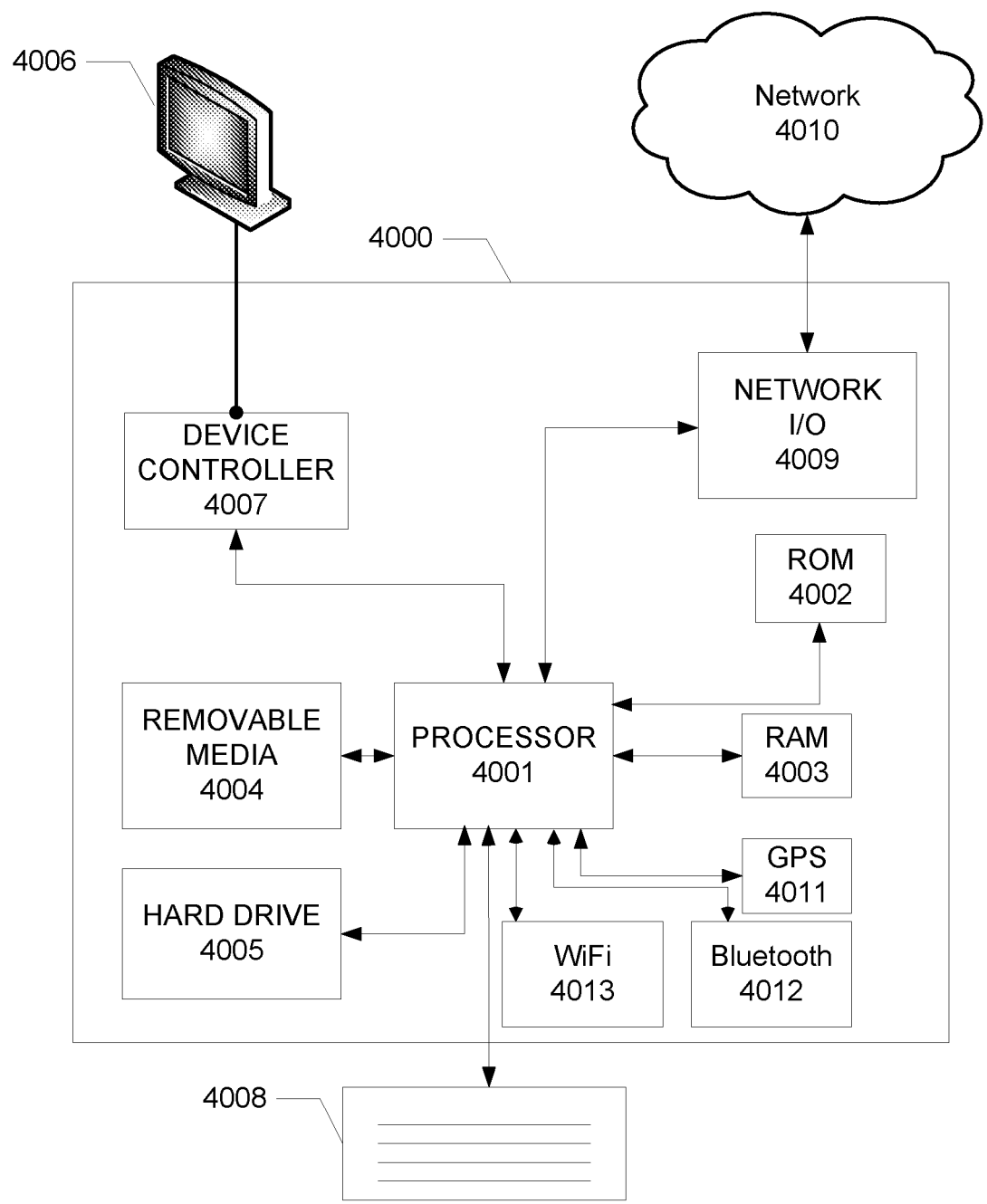
FIG. 4B shows an example elements of computing devices that may be used to implement any of the various devices described herein.

FIG. 3 shows hardware elements of a first network node 310 (e.g., a wireless device) and a second network node 320 (e.g., a base station). A communication network may include at least one first network node 310 and at least one second network node 320. The first network node 310 may include one or more communication interface 312, one or more processors 314, and one or more sets of program code instructions 318 stored in non-transitory memory 316 and executable by the one or more processors 314. The second network node may include one or more communication interface 322, one or more processors 324, and one or more sets of program code instructions 328 stored in non-transitory memory 326 and executable by the one or more processors 324. A communication interface 312 in the first network node 310 may be configured to engage in communication with a communication interface 22 in the second network node 320, such as via a communication path that includes at least one wireless link. The wireless link may be a bi-directional link. The communication interface 322 in the second network node 320 may be configured to engage in communication with the communication interface 312 in the first network node 310. The first network node 310 and the second network node 320 may be configured to send and receive data over the wireless link using multiple frequency carriers. Network nodes, base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 312, 322 and the wireless link are shown in FIG. 3, FIGS. 4A, and 4B, and associated text. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, and/or any other device capable of sending and/or receiving signals. Any reference to one or more of these terms/devices also considers use of any other term/device mentioned above.

The communications network may comprise Radio Access Network (RAN) architecture. The RAN architecture may comprise one or more RAN nodes that may be a next generation Node B (gNB) (e.g., 320) providing New Radio (NR) user plane and control plane protocol terminations towards a first network node (e.g. 310) such as a wireless device. A RAN node may be a next generation evolved Node B (ng-eNB), providing Evolved UMTS Terrestrial Radio Access (E-UTRA) user plane and control plane protocol terminations towards a second wireless device. A first network node 310 (e.g., a wireless device) may communicate with a base station (e.g., a gNB) over a Uu interface. A second wireless device may communicate with a base station (e.g., an ng-eNB) over a Uu interface. The second network node 320 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_I-NACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

FIG. 4A shows general hardware elements that may be used to implement any of the various computing devices discussed herein, including any base station, wireless device, or computing device. The computing device 400 (e.g., wireless device) may include one or more processors 418, which may execute instructions stored memory, such as non-removable memory 430, removable memory 432 (such as a Universal Serial Bus (USB) drive, compact disk (CD) or digital versatile disk (DVD), or floppy disk drive), or any other desired storage medium. Instructions may also be stored in an attached (or internal) hard drive. The computing device 400 may also include a security processor (not shown), which may execute instructions of a one or more computer programs to monitor the processes executing on the processor 418 and any process that requests access to any hardware and/or software components of the computing device 400 (e.g., the non-removable memory 430, the removable memory 432, the hard drive, a device controller (e.g., a keypad 426, a display and/or touchpad 428, a speaker and/or microphone 424, and/or one or more peripherals 438), a transceiver 420, a network interface, a GPS 436 (e.g., a GPS chipset), a Bluetooth interface, a WiFi interface, etc.). The computing device 400 may include one or more output devices, such as the display and/or touchpad 428 (e.g., a screen, a display device, a monitor, a television, etc.), and may include one or more output device controllers, such as a video processor. There may also be one or more user input devices, such as a remote control, keyboard, mouse, touch screen, microphone, etc., that may be configured, for example, as one or more of the peripherals 438. The computing device 400 may also include one or more network interfaces, such as a network interface, the may be a wired interface, a wireless interface such as the transceiver 420, or a combination of the two. The network interface may provide an interface for the computing device 400 to communicate (e.g., via wireless or wired communications) with a network (e.g., a RAN, or any other network). The network interface may include a modem (e.g., a cable modem), and the external network may include communication links, an external network, an in-home network, a provider's wireless, coaxial, fiber, or hybrid fiber/coaxial distribution system (e.g., a DOCSIS network), or any other desired network. Additionally, the computing device 400 may include a location-detecting device, such as a global positioning system (GPS) chipset or microprocessor 436, which may be configured to receive and process global positioning signals and determine, with possible assistance from an external server and antenna, a geographic position of the computing device 400.

The wireless device 400 may communicate with a first base station 405 and/or one or more second base stations 406. The first base station 405 may comprise one or more of a communication interface 442, processor 444, memory 446, instructions 448, and/or any of element, including any element described above regarding the wireless device 400. The one or more second base stations 406 may comprise one or more of a communication interface 442, processor 444, memory 446, instructions 448, and/or any of element, including any element described above regarding the wireless device 400. The first base station 405 may communicate with the wireless device 400 and/or the one or more second base stations 406 via communication interface 442. The one or more second base stations 406 may communicate with the wireless device 405 and/or the first base station via communication interface 442.

FIG. 4B shows general hardware elements that may be used to implement any of the various computing devices discussed herein, including, e.g., the network node 310, the network node 320, the wireless device 400, the base station 405, the base stations 406, or any other network node, base station, wireless device, or computing device described herein. The computing device 4000 may include one or more processors 4001, which may execute instructions stored in the random access memory (RAM) 4003, the removable media 4004 (such as a Universal Serial Bus (USB) drive, compact disk (CD) or digital versatile disk (DVD), or floppy disk drive), or any other desired storage medium. Instructions may also be stored in an attached (or internal) hard drive 4005. The computing device 4000 may also include a security processor (not shown), which may execute instructions of one or more computer programs to monitor the processes executing on the processor 4001 and any process that requests access to any hardware and/or software components of the computing device 4000 (e.g., ROM 4002, RAM 4003, the removable media 4004, the hard drive 4005, the device controller 4007, a network interface 4009, a GPS 4011, a Bluetooth interface 4012, a WiFi interface 4013, etc.). The computing device 4000 may include one or more output devices, such as the display 4006 (e.g., a screen, a display device, a monitor, a television, etc.), and may include one or more output device controllers 4007, such as a video processor. There may also be one or more user input devices 4008, such as a remote control, keyboard, mouse, touch screen, microphone, etc. The computing device 4000 may also include one or more network interfaces, such as a network interface 4009, which may be a wired interface, a wireless interface, or a combination of the two. The network interface 4009 may provide an interface for the computing device 4000 to communicate with a network 4010 (e.g., a RAN, or any other network). The network interface 4009 may include a modem (e.g., a cable modem), and the external network 4010 may include communication links, an external network, an in-home network, a provider's wireless, coaxial, fiber, or hybrid fiber/coaxial distribution system (e.g., a DOCSIS network), or any other desired network. Additionally, the computing device 4000 may include a location-detecting device, such as a global positioning system (GPS) microprocessor 4011, which may be configured to receive and process global positioning signals and determine, with possible assistance from an external server and antenna, a geographic position of the computing device 4000.

The examples in FIGS. 4A and 4B are hardware configurations, although the components shown may be implemented as software as well. For example, modifications may be made to add, remove, combine, divide, etc. components of the computing device 4000 as desired. Additionally, the components may be implemented using basic computing devices and components, and the same components (e.g., processor 4001, ROM storage 4002, display 4006, etc.) may be used to implement any of the other computing devices and components described herein. For example, the various components described herein may be implemented using computing devices having components such as a processor executing computer-executable instructions stored on a computer-readable medium, as shown in FIG. 4. Some or all of the entities described herein may be software based, and may co-exist in a common physical platform (e.g., a requesting entity may be a separate software process and program from a dependent entity, both of which may be executed as software on a common computing device).

Base stations, wireless devices, relay nodes, and other communication devices may comprise one or more transceivers. A transceiver may be a device that comprises both a transmitter and receiver. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment. Although one or more of the above types of devices may be referenced herein (e.g., user equipment, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., a wireless device, base station, eNB, gNB, computing device, etc.), in one or more networks, but it will be understood that one or more features and/or steps may be implemented on any device and/or in any network. As used throughout, the term "base station" may comprise one or more of: a base station, a node, a Node B, a gNB, an eNB, am ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 5A and FIG. 5B depict examples of the RM states of a wireless device, such as the wireless device 100, 200 as observed by the wireless device 100, 200 and AMF 155, 255. FIG. 5A shows RM state transition in the wireless device. Two RM states may be used in a wireless device 100, 200 (and possibly in the AMF 155, 255) that may reflect the registration status of the wireless device 100, 200 in the selected PLMN. The registration status of the wireless device 100, 200 in the selected PLMN may be RM-DEREGISTERED 500 or RM-REGISTERED 510. In the RM DEREGISTERED state 500, the wireless device 100, 200 may not be registered with a network. The wireless device 100, 200 context in AMF 155, 255 may not hold valid location or routing information for the wireless device 100, 200 so the wireless device 100, 200 may be not reachable by the AMF 155, 255. Some wireless device context may still be stored in the wireless device 100, 200 and the AMF 155, 255. In the RM REGISTERED state 510, the wireless device 100, 200 may be registered with the network. In the RM-REGISTERED 510 state, the wireless device 100, 200 may receive services that require registration with the network.

FIG. 5B shows RM state transitions in the AMF 155, 255. Two RM states may be used in the AMF 155, 255 for the wireless device 100, 200 that reflect the registration status of the wireless device 100, 100 in the selected PLMN. The two RM states that may be used in the AMF 155, 255 for the wireless device 100, 200 in the selected PLMN may be RM-DEREGISTERED 520 or RM-REGISTERED 530. The state of RM-DEREGISTERED 500 in the wireless device 100, 200 may correspond to the state of RM-DEREGISTERED 520 in the AMF 155, 255. The state of RM-REGISTERED 510 in the wireless device 100, 200 may correspond to the state of RM-REGISTERED 530 in the AMF 155, 255.

FIG. 6A and FIG. 6B depict examples of CM state transitions as observed by the wireless device 100 and AMF 155. Connection management CM may comprise the functions of establishing and releasing a signaling connection between a wireless device 100, 200 and the AMF 155, 255 over N1. This signaling connection may be used to provide NAS signaling exchange between the wireless device 100, 200 and a core network. The signaling connection may comprise both the AN signaling connection between the wireless device 100, 200 and/or the (R)AN 105, 205 (e.g. RRC connection over 3GPP access) and the N2 connection for this wireless device 100, 200 between the AN and the AMF 155, 255. FIG. 6A shows CM state transitions in the wireless device 100, 200. Two CM states may be used for the NAS signaling connectivity of the wireless device 100, 200 with the AMF 155, 255: CM-IDLE 600 and CM-CONNECTED 610. A wireless device 100, 200 in CM-IDLE 600 state may be in RM-REGISTERED 510 state that may have no NAS signaling connection established with the AMF 155, 255 over N1. The wireless device 100, 200 may perform cell selection, cell reselection, and PLMN selection. A wireless device 100, 200 in CM-CONNECTED 610 state may have a NAS signaling connection with the AMF 155, 255 over N1. RRC inactive state may apply to NG-RAN (e.g., it applies to NR and E-UTRA connected to 5G CN). The AMF 155, 255 may provide (e.g., based on network configuration) assistance information to the NG (R)AN 105, 205, for example, to assist the NG (R)AN's 105, 205 decision as to whether the wireless device 100, 200 may be sent to RRC inactive state. If a wireless device 100, 200 may be CM-CONNECTED 610 with RRC inactive state, the wireless device 100, 200 may resume the RRC connection (e.g., due to uplink data pending), may execute a mobile initiated signaling procedure (e.g., as a response to (R)AN 105, 205 paging), and/or notify the network that it has left the (R)AN 105, 205 notification area. NAS signaling connection management may comprise the functions of establishing and releasing a NAS signaling connection. NAS signaling connection establishment function may be provided by the wireless device 100, 200 and the AMF 155, 255 to establish a NAS signaling connection for a wireless device 100, 200 in CM-IDLE 600 state. The procedure of releasing a NAS signaling connection may be initiated by the 5G (R)AN 105, 205 node or the AMF 155, 255.

FIG. 6B shows CM state transitions in the AMF 155, 255. Two CM states may be used for a wireless device 100, 200 at the AMF 155, 255: CM-IDLE 620 and CM-CONNECTED 630. The state of CM-IDLE 600 in the wireless device 100, 200 may correspond to the state of CM-IDLE 620 in the AMF 155, 255. The state of CM-CONNECTED 610 in the wireless device 100, 200 may correspond to the state of CM-CONNECTED 630 in the AMF 155, 255. Reachability management of the wireless device 100, 200 may detect whether a wireless device 100, 200 may be reachable and/or provide the wireless device location (e.g., the access node in communication with the wireless device) for the network to reach the wireless device 100, 200. This may be done by paging wireless device 100, 200 and wireless device location tracking. The wireless device location tracking may comprise both wireless device registration area tracking and wireless device reachability tracking. Such functionalities may be either located at a 5GC (e.g., for a CM-IDLE 620 state) or an NG-RAN 105, 205 (e.g., for a CM-CONNECTED 630 state).

The wireless device 100, 200 and the AMF 155, 255 may negotiate wireless device 100, 200 reachability characteristics in CM-IDLE 600 and/or 620 states during registration and registration update procedures. A variety of wireless device reachability categories may be negotiated between a wireless device 100, 200 and an AMF 155, 255 for CM-IDLE 600 and/or 620 states, such as wireless device 100, 200 reachability providing mobile device terminated data. The wireless device 100, 200 may be CM-IDLE 600 mode and mobile initiated connection only (MICO) mode. The 5GC may support a PDU connectivity service that provides exchange of PDUs between a wireless device 100, 200 and a data network identified by a DNN. The PDU connectivity service may be supported via PDU sessions that may be established, for example, after request from the wireless device 100, 200.

A PDU session may support one or more PDU session types. PDU sessions may be established (e.g. after wireless device 100, 200 request), modified (e.g., after wireless device 100 and 5GC request) and released (e.g., after wireless device 100, 200 and 5GC request) using NAS SM signaling exchanged over N1 between the wireless device 100, 200 and the SMF 160, 260. The 5GC may be able to trigger a specific application in the wireless device 100 (e.g., after a request from an application server). If receiving that trigger message, the wireless device 100, 200 may pass it to the identified application in the wireless device 100, 200. The identified application in the wireless device 100, 200 may establish a PDU session to a specific DNN.

Figure 7:
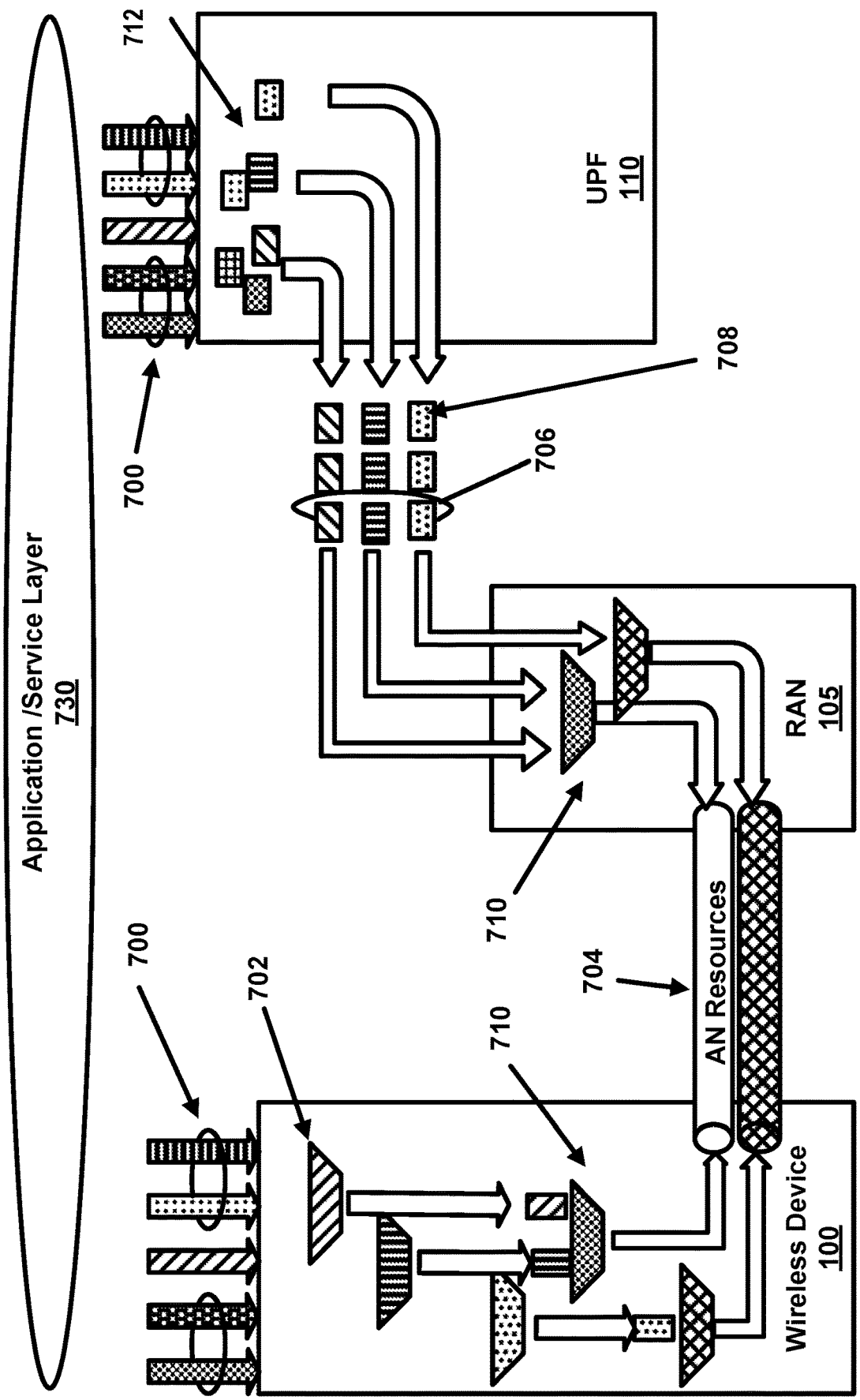
FIG. 7 shows an examples for classification and marking traffic.

FIG. 7 shows an example of a QoS flow based framework. A QoS model (e.g., a 5G QoS model) may support the QoS flow based framework. The QoS model may support both QoS flows that require a guaranteed flow bit rate and QoS flows that may not require a guaranteed flow bit rate. The QoS model may also support reflective QoS. The QoS model may comprise flow mapping or packet marking at the CN_UP 720, AN 710, and/or wireless device 700. Packets may arrive from and/or destined to the application/service layer 730 of wireless device 700, CN_UP 720, and/or an AF (e.g., the AF 145). QoS flow may be granular of QoS differentiation in a PDU session. A QoS Flow IDQFI may be used to identify a QoS flow in a 5G system. User plane traffic with the same QFI within a PDU session may receive the same traffic forwarding treatment. The QFI may be carried in an encapsulation header on N3 (and N9), for example, without any changes to an end-to-end packet header. The QFI may be used with PDUs having different types of payload. The QFI may be unique within a PDU session.

The QoS parameters of a QoS flow may be provided to the (R)AN as a QoS profile over N2 at a PDU session or at a QoS flow establishment, and an NG-RAN may be used, for example, if the user plane may be activated. A default QoS rule may be utilized for every PDU session. An SMF (e.g., SMF 160, 260) may allocate the QFI for a QoS flow and may derive its QoS parameters from the information provided by the PCF. The SMF 160, 260 may provide the QFI together with the QoS profile containing the QoS parameters of a QoS flow to the (R)AN 710. QoS flow may be granular for QoS forwarding treatment in a system (e.g., a 5GS). Traffic mapped to the same QoS flow may receive the same forwarding treatment (e.g., scheduling policy, queue management policy, rate shaping policy, RLC configuration, and/or the like). Providing different QoS forwarding treatment may require separate QoS flow. A QoS indicator may be used as a reference to a specific QoS forwarding behavior (e.g., packet loss rate, and/or packet delay budget) to be provided to a QoS flow. This QoS indicator may be implemented in the access network by the 5QI referencing node specific parameters that control the QoS forwarding treatment (e.g., scheduling weights, admission thresholds, queue management thresholds, link layer protocol configuration, and/or the like.).

One or more devices (e.g., a 5GC) may support edge computing and may provide operators and/or third party services to be hosted close to the wireless device access point of attachment. The one or more devices (e.g., a 5GC) may select a UPF 110, 210 close to the wireless device 100, 210 and may execute the traffic steering from the UPF 110, 210 to the LADN via a N6 interface. This selecting a UPF 110, 210 close to the wireless device may be based on the wireless device subscription data, wireless device location, the information from application function AF 145, 245, policy, and/or other related traffic rules. The one or more devices (e.g., a 5GC) may expose network information and capabilities to an edge computing application function. The functionality support for edge computing may comprise local routing where the one or more devices (e.g., a 5GC) may select UPF 110, 210 to route the user traffic to the LADN, traffic steering where the one or more devices (e.g., a 5GC) selects the traffic to be routed to the applications in the LADN, session and service continuity to provide wireless device 100, 200 and application mobility, user plane selection and reselection (e.g., based on input from application function), network capability exposure where the one or more devices (e.g., a 5GC) and application function may provide information to each other via NEF, QoS and charging where PCF may provide rules for QoS control and charging for the traffic routed to the LADN, and/or support of local area data network where the one or more devices (e.g., a 5GC) may provide support to connect to the LADN in a certain area where the applications are deployed.

An example system (e.g., a 5GS) may be a 3GPP system comprising of 5G access network 105, 205, 5GC and a wireless device 100, 200, and/or the like. Provided NSSAI may be an NSSAI provided by a serving PLMN, for example, during a registration procedure, indicating the NSSAI provided by the network for the wireless device 100, 200 in the serving PLMN for the current registration area. A periodic registration update may be wireless device 100, 200 re-registration at expiry of a periodic registration timer. A requested NSSAI may be a NSSAI that the wireless device 100, 200 may provide to the network. A service-based interface may represent how a set of services may be provided/exposed by a given NF.

A PDU connectivity service may provide exchange of PDUs between a wireless device 100, 200 and a data network. PDU session may be an association between a wireless device 100 and a data network, DN that provides a PDU connectivity service. The type of association may be IP, Ethernet, or unstructured. Service continuity may comprise an uninterrupted user experience of a service, for example, if the IP address and/or anchoring point change. Session continuity may comprise the continuity of a PDU session. For a PDU session of an IP type session, continuity may indicate that the IP address may be preserved for the lifetime of the PDU session. An uplink classifier may be a UPF functionality that aims at diverting uplink traffic, for example, based on filter rules provided by SMF, towards a data network.

The system architecture may support data connectivity and services enabling deployments to use techniques such as, but not limited to, network function virtualization and/or software defined networking. The system architecture may leverage service-based interactions between control plane (CP) network functions where identified. In system architecture, separation of the user plane (UP) functions from the control plane functions may be considered. A system may provide a network function to interact with other NF(s) directly if required. A system may reduce dependencies between the access network (AN) and the core network (CN). The architecture may comprise a converged access-agnostic core network with a common AN-CN interface that integrates different 3GPP and non-3GPP access types. A system furthermore may support a unified authentication framework, stateless NFs (e.g., where the compute resource may be decoupled from the storage resource), capability exposure, and/or concurrent access to local and centralized services. UP functions may be deployed close to the access network, for example, to support low latency services and access to LADNs.

A system may support roaming with both home routed traffic as well as local breakout traffic in the visited PLMN. An example architecture may be service-based and the interaction between network functions may be represented in a variety of ways. FIG. 1 shows an example service-based representation, where network functions within the control plane may provide other authorized network functions to access their services. This service-based representation shown in FIG. 1 may also comprise point-to-point reference points where necessary. FIG. 1 shows an example reference point representation, showing the interaction between the NF services in the network functions described by point-to-point reference point (e.g., N11) between any two network functions.

A network slice may comprise or be associated with the core network control plane and/or user plane network functions such as, for example, a 5G RAN, the N3IWF functions to the non-3GPP Access Network, and/or the like. Network slices may support differing features and/or network function implementations. An operator may deploy multiple network slice instances delivering the same features for different groups of wireless devices, to deliver different committed service, and/or because the network slice instances may be dedicated to an individual customer. The NSSF 120 may store the mapping information between a slice instance ID and an NF ID (and/or NF address).

A wireless device 100, 200 may simultaneously be served by one or more network slice instances via, for example, a 5G-AN. The wireless device 100, 200 may be served by k network slices (e.g., k=8, 16, etc.) at a time. An AMF 155, 255 instance serving the wireless device 100, 200 may belong to a network slice instance serving the wireless device 100.

A PDU session may belong to one specific network slice instance per PLMN. Different network slice instances may not share a PDU session. Different slices may have slice-specific PDU sessions using the same DNN, or different DNNs.

A Single Network Slice Selection Assistance Information (S-NSSAI) may indicate (e.g., identify) a network slice. An S-NSSAI may comprise a slice/service type (SST) and/or a slice differentiator (SD). The SST may refer to the expected network slice behavior in terms of features and services. An SD may be optional information that may complement the slice/service type(s), for example, to allow further differentiation for selecting a network slice instance from potentially multiple network slice instances that comply with the indicated slice/service type. The same network slice instance may be selected using different S-NSSAIs. The CN part of a network slice instance(s) serving a wireless 100, 200 may be selected by the CN.

Subscription data may include the S-NSSAI(s) of the network slices to which the wireless device 100, 200 may subscribe. One or more S-NSSAIs may be indicated (e.g., marked) as a default S-NSSAI. k S-NSSAI may be indicated (e.g., marked) as a default S-NSSAI (e.g., k=8, 16, etc.). The wireless device 100, 200 may subscribe to more than 8 S-NSSAIs, or up to or more than any other quantity of S-NSSAIs.

A wireless device 100, 200 may be configured, by the HPLMN, with a configured NSSAI per PLMN. The wireless device 100, 200 may obtain, from the AMF 155, an allowed NSSAI for a PLMN (which may include one or more S-NSSAIs), for example, based on or after successful completion of a wireless device's registration procedure.

The allowed NSSAI may take precedence over the configured NSSAI, for example, for a PLMN. The wireless device 100, 200 may use the S-NSSAIs in the allowed NSSAI corresponding to a network slice for the subsequent network slice selection related procedures in the serving PLMN.

The establishment of user plane connectivity to a data network via a network slice instance(s) may comprise: performing an RM procedure to select an AMF 155, 255 that supports the required network slices, establishing one or more PDU sessions to the required data network via the network slice instance(s), and/or the like.

The wireless device 100, 200 may provide a requested NSSAI to the network in the RRC and NAS layer. The requested NSAAI may comprise the S-NSSAI(s) corresponding to the slice(s) to which the wireless device 100, 200 attempts to register, a temporary user ID if one was assigned to the wireless device 100, 200 and/or the like. The wireless device 100, 200 may provide the requested NSSA, for example, if the wireless device 100, 200 registers with a PLMN, and/or if the wireless device 100, 200 for the PLMN has a configured NSSAI or an allowed NSSAI. The requested NSSAI may be a configured-NSSAI, an allowed-NSSAI, and/or the like. The RAN 105, 205 may route NAS signaling to and/or from the wireless device 100, 200 to and/or from a default AMF 155, 255. The RAN 105, 205 may route NAS signaling to and/or from the wireless device 100, 200 to and/or from a default AMF 155, 255, for example, if a wireless device 100, 200 registers with a PLMN and does not have a configured NSSAI or allowed NSSAI for the PLMN.

The network may change the set of permitted network slice(s) to which the wireless device 100, 200 is registered. The network may change the set of permitted network slice(s) to which the wireless device 100, 200 is registered, for example, based on local policies, subscription changes, and/or wireless device 100, 200 mobility. The network may change the set of permitted network slice(s) for a registration procedure. The network may trigger a notification to be sent to the wireless device 100, notifying the wireless device 100 of the change of the supported network slices using an RM procedure (which may trigger a registration procedure). The network may provide the wireless device 100 with a new allowed NSSAI and tracking area list.

For a registration procedure in a PLMN, the AMF 155, 255 that first receives the registration request may redirect the registration request to another AMF 155, 255 via the RAN 105, 205 and/or via direct signaling between the initial AMF 155, 255 and the target AMF 155, 255. The AMF 155, 255 that first receives the registration request may redirect the registration request to another AMF 155, 255 via the RAN 105, 205 and/or via direct signaling between the initial AMF 155, 255 and the target AMF 155, 255, for example, if the network decides that the wireless device 100, 200 should be served by a different AMF 155, 255, for example, based on network slice(s) aspects.

The network operator may provision the wireless device 100 with an NSSP. The NSSP may comprise one or more NSSP rules.

The wireless device 100, 200 may route the user data of the application in one or more of the PDU sessions. The wireless device 100, 200 may route the user data of the application in one or more of the PDU sessions, for example, if a wireless device 100, 200 has one or more established PDU sessions corresponding to the a specific S-NSSAI, unless other conditions in the wireless device 100, 200 prohibit the use of the PDU sessions. The wireless device 100, 200 may consider the DNN to determine which PDU session to use if the application provides a DNN. The wireless device 100, 200 may request a new PDU session corresponding to the S-NSSAI. The wireless device 100, 200 may request a new PDU session corresponding to the S-NSSAI, for example, with the DNN that may be provided by the application, if the wireless device 100, 200 does not have a PDU session established with the specific S-NSSAI. The RAN 105, 205 may be aware of the network slices used by the wireless 100, 200 in order for the RAN 105, 205 to select a proper resource for supporting network slicing in the RAN 105, 205.

An AMF 155, 255 may select an SMF 160, 260 in a network slice instance, for example, based on the S-NSSAI, DNN, and/or other information (e.g., wireless device 100, 200 subscription and local operator policies, and/or the like). An AMF 155, 255 may select an SMF 160, 260 in a network slice instance based on the S-NSSAI, DNN, and/or other information, for example, if the wireless device 100, 200 triggers the establishment of a PDU session. The selected SMF 160, 260 may establish the PDU session based on the S-NSSAI and DNN.

The wireless device 100, 200 may or may not include the NSSAI in NAS signaling. The wireless device 100, 200 may not include the NSSAI in NAS signaling, for example, in order to support network-controlled privacy of slice information for the slices that the wireless device 100, 200 may access. The wireless device 100, 200 may not include the NSSAI in NAS signaling, for example, unless the wireless device 100, 200 has a NAS security context. The wireless device 100, 200 may not include NSSAI, for example, in unprotected RRC signaling. The wireless device 100, 200 may not include NSSAI, for example, if the wireless device 100, 200 is aware of or configured such that privacy considerations are used for the NSSAI.

Network slice specific network functions in VPLMN and HPLMN may be selected, for example, for a wireless device that may be roaming. The network slice specific network functions in VPLMN and HPLMN may be selected, for example, based on the S-NSSAI provided by the wireless device 100, 200 PDU connection establishment. Selection of slice specific NF instances may be performed by each PLMN or by one or more PLMNs. Selection of slice specific NF instances may be performed by a PLMN, for example, if a standardized S-NSSAI is used. Selection of slice specific NF instances may be performed by a PLMN, for example, based on the provided S-NSSAI. The VPLMN may map the S-NSSAI of HPLMN to a S-NSSAI of VPLMN, for example, based on a roaming agreement (e.g., including mapping to a default S-NSSAI of VPLMN). The selection of slice specific NF instance in a VPLMN may be, for example, based on the S-NSSAI of VPLMN. The selection of any slice specific NF instance in HPLMN may be, for example, based on the S-NSSAI of an HPLMN.

Figure 8:
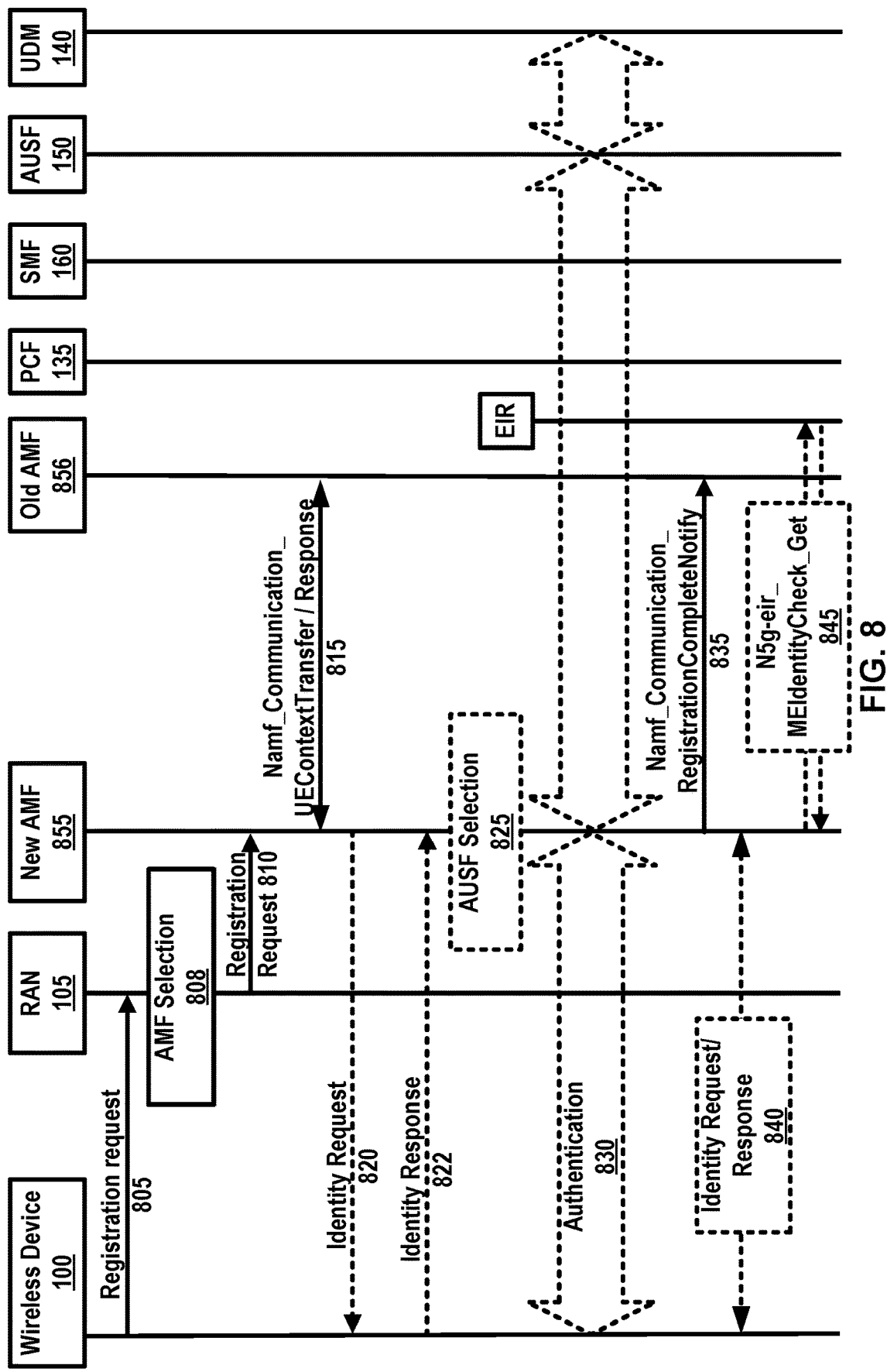
FIG. 8 shows examples of registration procedures.
Figure 9:
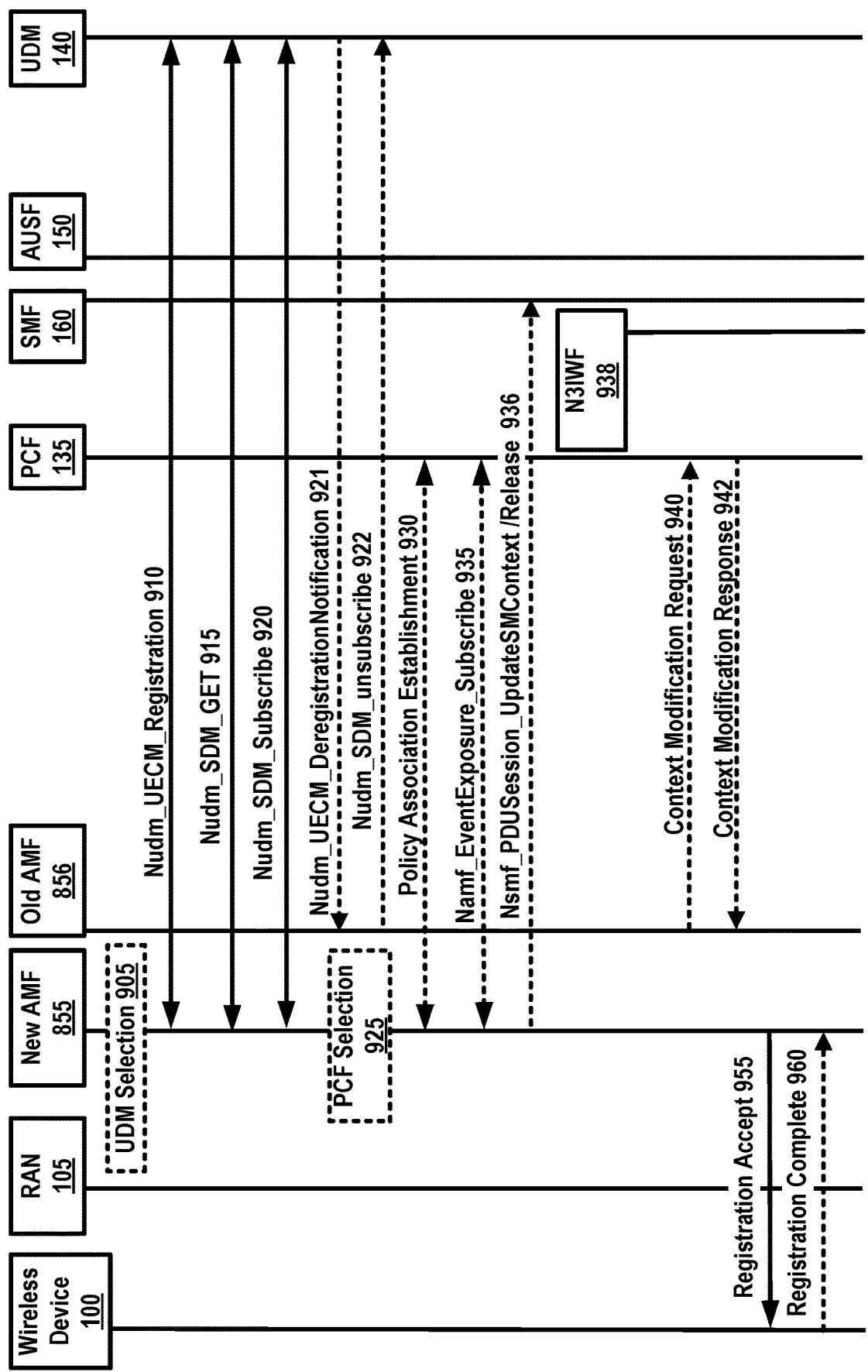
FIG. 9 shows a continuation of the example call flow for an initial registration procedure.

FIG. 8 and FIG. 9 show an example call flow for an initial registration procedure. The initial registration procedure may involve execution of network access control functions (e.g., user authentication and access authorization, which may be based on subscription profiles in UDM 140, 240). The identity of the serving AMF 155, 255 may be registered in a UDM 140, 240, for example, based on or as a result of the initial registration procedure. The RM procedures may be applicable for both a 3GPP access RAN 105, 205 and a non-3GPP access RAN 265.

As shown in FIG. 8 and FIG. 9, a registration procedure may be performed by the wireless device 100, 200. The registration procedure may be performed by the wireless device 100, 200, for example, to become authorized to receive services, to enable mobility tracking, to enable reachability, and/or the like. The wireless device 100, 200 may send a registration request message 805 to the RAN 105 (or 205). The registration request message 805 may comprise, for example, AN parameters and/or an RM-NAS registration request (e.g., registration type, SUCI or SUPI or GUTI (e.g., 5G-GUTI), last visited TAI (if available), security parameters, requested NSSAI, mapping of requested NSSAI, wireless device 5GC capability, PDU session status, PDU session(s) to be re-activated, follow on request, MICO mode preference, and/or the like), and/or the like. The AN parameters may include, for example, SUCI, SUPI, the GUTI (e.g., 5G-GUTI), the selected PLMN ID and requested NSSAI, and/or the like (e.g., for the RAN). The AN parameters may comprise an establishment cause. The establishment cause may provide a reason for requesting an establishment of an RRC connection. The registration type may indicate, for example, whether the wireless device 100 determines and/or requests to perform an initial registration (e.g., if the wireless device 100, 200 is in the RM-DEREGISTERED state), a mobility registration update (e.g., if the wireless device 100, 200 is in the RM-REGISTERED state and initiates a registration procedure, such as due to mobility), a periodic registration update (e.g., if the wireless device 100, 200 is in the RM-REGISTERED state and may initiate a registration procedure, such as due to the periodic registration update timer expiry) or an emergency registration (e.g., if the wireless device 100, 200 is in a limited service state).

The wireless device 100, 200 may include its SUCI or SUPI in the registration request. The wireless device 100, 200 may include its SUCI or SUPI in the registration request, for example, if the wireless device 100, 200 is performing an initial registration (e.g., if the wireless device 100 is in the RM-DEREGISTERED state) to a PLMN for which the wireless device 100, 200 does not already have a GUTI (e.g., 5G-GUTI). The SUCI may be included in the registration request, for example, if the home network has provisioned the public key to protect SUPI in the wireless device 100, 200. The wireless device 100, 200 may perform an initial registration. The wireless device 100, 200 may include the SUPI in a registration request message. The wireless device 100, 200 may include the SUPI in the registration request message, for example, if the wireless device 100, 200 receives a wireless device configuration update command indicating that the wireless device 100, 200 may be required to re-register and/or that the 5G-GUTI is invalid.

The SUPI may be included the registration request message, for example, for an emergency registration. The SUPI may be included for an emergency registration, for example, if the wireless device 100, 200 does not have a valid GUTI (e.g., 5G-GUTI) available. The PEI may be included for an emergency request, for example, if the wireless device 100, 20 has no SUPI and no valid GUTI (e.g., 5G-GUTI). The GUTI (e.g., 5G-GUTI) may be included and may indicate the old (e.g., last serving) AMF 856. The wireless device 100, 200 may not provide the GUTI (e.g., 5G-GUTI) allocated by the AMF 155, 255 over the 3GPP access, for example, during the registration procedure over the non-3GPP access. The wireless device 100, 200 may not provide the GUTI allocated by the AMF 155, 255, for example, if the wireless device 100 is already registered via a non-3GPP access in a PLMN different from the new PLMN (e.g., not the registered PLMN or a PLMN equivalent to the registered PLMN) of the 3GPP access. The wireless device 100, 200 may not provide access to the GUTI (e.g., 5G-GUTI) allocated by the AMF 155 over the non-3GPP during the registration procedure over the 3GPP access. The wireless device 100 may not provide access to the GUTI, for example, if the wireless device 100 is already registered via a 3GPP access in a PLMN (e.g., the registered PLMN) different from the new PLMN (e.g., not the registered PLMN or a PLMN equivalent to the registered PLMN) of the non-3GPP access. The wireless device 100, 200 may provide the wireless device's 100, 200 usage setting. The wireless device 100, 200 may provide the wireless device's 100, 200 usage setting, for example, based on its configuration.

The wireless device 100, 200 may include the mapping of requested NSSAI for initial registration or mobility registration updates. The mapping of requested NSSAI, for example, may comprise the mapping of each S-NSSAI of the requested NSSAI to the S-NSSAIs of the configured NSSAI for the HPLMN. The wireless device 100, 200 may include the mapping of requested NSSAI, for example, to ensure that the network is able to verify whether the S-NSSAI(s) in the requested NSSAI are permitted (e.g., based on the subscribed S-NSSAIs). The last visited TAI may be included in the mapping of requested NSSAI. The last visited TAI may be included in the mapping of requested NSSAI, for example, to help the AMF 155, 255 produce a registration area for the wireless device. Security parameters may be used for authentication and integrity protection. A requested NSSAI may indicate the network slice selection assistance information. The PDU session status may indicate the previously established PDU sessions in the wireless device 100, 200. The PDU session status may indicate the established PDU session of the current PLMN in the wireless device 100, 200. The PDU session status may indicate the established PDU session of the current PLMN in the wireless device 100, 200, for example, if the wireless device 100, 200 is connected to two AMF 155, 255 belonging to different PLMNs (e.g., via 3GPP access and via non-3GPP access). The PDU session(s) to be re-activated may be included, for example, to indicate the PDU session(s) for which the wireless device 100, 200 may intend to activate UP connections. A PDU session corresponding to an LADN may not be included in the PDU session(s) to be re-activated. The PDU session corresponding to a LADN may not be included in the PDU session(s) to be re-activated, for example, if the wireless device 100, 200 is outside the area of availability of the LADN. The follow-on request may be included, for example, if the wireless device 100, 200 has a pending uplink signaling that the wireless device 100, 200 does not include PDU session(s) to be re-activated, or if the registration type indicates the wireless device 100, 200 may want to perform an emergency registration.

The RAN 105, 205 may perform AMF selection 808. The RAN 105, 205 may perform AMF selection 808, for example, based on RAT and a requested NSSAI (e.g., if available). The RAN 105, 205 may perform AMF selection 808, for example, if an SUPI is included or if the GUTI (e.g., 5G-GUTI) does not indicate a valid AMF 155, 255. The RAN 105, 205 may forward the registration request message 810 to a new AMF 855. The RAN 105, 205 may forward the registration request message 810 to a new AMF 855, for example, on the N2 connection of the wireless device 100, 200 if the wireless device 100, 200 is in the CM-CONNECTED state. The RAN 105, 205 may forward the registration request 810 to the new AMF 855, which may have been configured to perform AMF selection 808. The RAN 105, 205 may forward the registration request 810 to the new AMF 855, for example, if the RAN 105, 205 does not select an appropriate new AMF 855.

The RAN 105, 205 may send an N2 registration request message 810 to the new AMF 855. The N2 registration request message 810, may comprise, for example, N2 parameters, RM-NAS registration request (e.g., registration type, SUPI or 5G-GUTI, last visited TAI (if available), security parameters, requested NSSAI, mapping of requested NSSAI, wireless device 5GC capability, PDU session status, PDU session(s) to be re-activated, follow on request, and MICO mode preference), and/or the like. The N2 parameters may comprise the selected PLMN ID, location information, cell identity, and the RAT type related to the cell in which the wireless device 100, 200 is communicating (e.g., camping on) for example, if the RAN 105, 205 is used. The N2 parameters may comprise the establishment cause. The N2 parameters may comprise the establishment cause, for example, if the RAN 105, 205 is used.

A new AMF 855 may send, to the old AMF 856, complete registration request (e.g., an Namf_Communication_UEContextTransfer) 815. The new AMF 855 may invoke an operation (e.g., the Namf_Communication_UEContextTransfer 815 service operation) on the old AMF 856. The new AMF 855 may invoke an operation (e.g., the Namf_Communication_UEContextTransfer 815 service operation) on the old AMF 856 (which may include the complete registration request IE), for example, if the wireless device's GUTI (e.g., 5G-GUTI) is included in the registration request and the serving AMF 155, 255 has changed since last registration procedure. The complete registration request IE may be integrity protected. The new AMF 855 may invoke the operation (e.g., the Namf_Communication_UEContextTransfer 815 service operation) on the old AMF 856, for example, to request the wireless device's 100 SUPI and MM Context. The old AMF 856 may use the integrity protected complete registration request IE, for example, to verify whether the context transfer service operation invocation corresponds to the wireless device 100, 200 requested. The old AMF 856 may transfer the event subscriptions information by each NF consumer, for the wireless device 100, 200, to the new AMF 855. The SUPI request may or may not be skipped. The SUPI request may be skipped, for example, if the wireless device 100, 200 indicates (e.g., identifies) itself with PEI.

The old AMF 856 may send, to the new AMF 855, a response 815 to the transfer message (e.g., Namf_Communication_UEContextTransfer). The response 815 may comprise, for example, SUPI, MM context, SMF 160 information, and/or a PCF ID). The old AMF 856 may respond to the new AMF 855, based on an operation (e.g., Namf_Communication_UEContextTransfer invocation). The old AMF 856 may respond to the new AMF 855, for example, by including the wireless device's SUPI and/or MM context. The old AMF 856 may include SMF 160, 260 information which may comprise, for example, S-NSSAI(s), SMF 160, 260 identities, and/or a PDU session ID (e.g., if the old AMF 856 has information about established PDU sessions). The old AMF 856 may have information about the NGAP wireless device-TNLA bindings. The old AMF 856 may include information about the NGAP wireless device-TNLA bindings in one or more messages, for example, if the old AMF 856 has information about active NGAP wireless device-TNLA bindings to the N3IWF 270.

The identity request procedure 820 may be initiated, for example, by the new AMF 855 sending an identity request message 820 to the wireless device 100, 200 from the SUCI. The identity request message 820 may be initiated, for example, if the SUPI has not been provided by the wireless device 100, 200 and/or if the SUPI has not been retrieved from the old AMF 856. The wireless device 100, 200 may respond, to the identity request message 820 (e.g., identity request procedure), with an identity response message 822. The identity response message 822 may include the SUCI. The wireless device 100, 200 may determine (e.g., derive) the SUCI, for example, by using the provisioned public key of the HPLMN.

The new AMF 855 may determine to initiate an AUSF selection 825. The AUSF selection 825 may be to initiate the wireless device authentication 830 (e.g., wireless device security). The new AMF 855 may initiate the AUSF selection 825, for example, by invoking an AUSF 150, 250. The new AMF 855 may select an AUSF 150, 250, for example, based on the SUPI and/or the SUCI. The new AMF 855 may perform or skip the authentication 830 and/or the security setup. The new AMF 855 may accept that the authentication 830 may fail and continue the registration procedure. The new AMF 855 may accept that the authentication 830 may fail and continue the registration procedure, for example, if the new AMF 855 is configured to support emergency registration for unauthenticated SUPIs. The new AMF 855 may accept that the authentication 830 may fail and continue the registration procedure, for example, if the wireless device 100, 200 indicates that the registration type is an emergency registration.

The authentication 830 may be performed by the Nudm_UEAuthenticate_Get operation. The AUSF 150 may discover a UDM 140, 240. The AUSF 150 may return the SUPI to the new AMF 855, for example, after the authentication 830 is successful. The AUSF 150, 250 may return the SUPI to the new AMF 855 after the authentication 830 is successful, for example, if the new AMF 855 provides a SUCI to AUSF 150, 250. The new AMF 855 may determine whether the registration request must/should be rerouted (e.g., rerouted from the AMF 155 operating as an initial AMF), for example, if network slicing is used. The new AMF 855 may initiate NAS security functions. The new AMF 855 may initiate an NGAP procedure. The initiation may, for example, enable an AN (e.g., 5G-AN) to use the NGAP procedure for securing procedures with the wireless device 100 upon completion of a NAS security function setup. The AN (e.g., 5G-AN) may store the security context. The AN may acknowledge completion of the NAS security function setup to the AMF 155, 255. The AN (e.g., 5G-AN) may use the security context, for example, to protect the messages exchanged with the wireless device 100, 200.

A new AMF 855 may send Namf_Communication_RegistrationCompleteNotify 835 to the old AMF 856. The new AMF 855 may notify the old AMF 856 that the registration of the wireless device 100, 200 in the new AMF 855 is completed. The new AMF 855 may notify the old AMF 856 that the registration of the wireless device 100, 200 in the new AMF 855 is completed (e.g., if the new AMF 855 has changed) by invoking the Namf_Communication_RegistrationCompleteNotify service operation. The registration may be rejected. The new AMF 855 may invoke the Namf_Communication_RegistrationCompleteNotify 835 service operation, for example, if the registration is rejected. The new AMF 855 may send a reject indication reason code to the old AMF 856. The old AMF 856 may continue as if the wireless device context transfer service operation was never received. The old AMF 856 may continue as if the wireless device context transfer service operation was never received, for example, if the authentication/security procedure fails. The new AMF 855 may determine which (if any) of one or more PDU sessions may not be supported in the new registration area. The new AMF 855 may determine which (if any) of one or more PDU sessions may not be supported in the new registration area, for example, if one or more of the S-NSSAIs used in the old registration area are not served in the target registration area. The new AMF 855 may invoke the Namf_Communication_RegistrationCompleteNotify 835 service operation, which may include the rejected PDU session ID and/or a reject cause (e.g., the S-NSSAI becomes no longer available) in one or more messages to the old AMF 856. The new AMF 855 may modify the PDU session status. The old AMF 856 may inform one or more SMFs (e.g., the corresponding SMF 160) to locally release the wireless device's SM context, for example, by invoking the Nsmf_PDUSession_ReleaseSMContext service operation.

The new AMF 855 may send an identity request/response 840 (e.g., PEI) to the wireless device 100, 200. An identity request procedure may be initiated by the new AMF 855. The identity request procedure may be initiated by the new AMF 855, for example, by sending an identity request message 840 to the wireless device 100 to retrieve the PEI (e.g., if the PEI was not provided by the wireless device 100, 200 and/or if the PEI was not retrieved from the old AMF 856). The PEI may be encrypted for transfer, unless, for example, the wireless device 100, 200 performs emergency registration and is not authenticated. The wireless device 100, 200 may include the PEI in the registration request for an emergency registration. The new AMF 855 may initiate ME identity check. The new AMF 855 may initiate ME identity check, for example, by invoking an N5g-eir_EquipmentIdentityCheck_Get service operation 845 (e.g., with an Equipment Identity Register (EIR)).

As shown in FIG. 9, the new AMF 855 (e.g., based on the SUPI) may perform UDM selection 905 to select a UDM 140, 240. The UDM 140, 240 may select a UDR instance. The new AMF 855 may register with the UDM 140, 240. The new AMF 855 may register with the UDM 140, for example, by using a Nudm_UECM_Registration 910. The new AMF 855 may subscribe to be notified if the UDM 140, 240 deregisters the AMF 155, 255, if the AMF 155, 255 has changed since the last registration procedure, if the wireless device 100, 200 provides a SUPI which may not refer to a valid context in the AMF 155, 255, and/or if the wireless device 100, 200 registers to the same AMF 155, 255 that it has already registered to a non-3GPP access (e.g., the wireless device 100, 200 is registered over a non-3GPP access and may initiate the registration procedure to add a 3GPP access).

The UDM 140, 240 may store the AMF 155, 255 identity associated with a first access type and may not remove the AMF 155, 255 identity associated with one or more second access types. The UDM 140, 240 may store information provided at registration in UDR with Nudr_UDM_Update. The AMF 155, 255 may retrieve the access and mobility subscription data and SMF 160, 260 selection subscription data, for example, by using Nudm_SDM_Get 915. The UDM 140, 240 may retrieve the access and mobility subscription data and SMF 160, 260 selection subscription data information from UDR, for example, with Nudr_UDM_Query. The AMF 155, 255 may subscribe to be notified based on a successful response and/or after a successful response is received. The AMF 155, 255 may subscribe to be notified based on a successful response and/or after a successful response is received, for example, if the data requested is modified using Nudm_SDM_Subscribe 920. The UDM 140, 240 may subscribe to UDR, for example, by using Nudr_UDM_Subscribe 920. The GPSI may be provided to the new AMF 855 in the subscription data from the UDM 140, 240. The GPSI may be provided in the subscription data from the UDM 140, 240, for example, if the GPSI is available in the wireless device 100, 200 subscription data. The new AMF 855 may provide the access type it serves for the wireless device 100 to the UDM 140. The access type may, for example, be set to 3GPP access. The UDM 140 may store the associated access type together with the serving AMF 155 in UDR, for example, with Nudr_UDM_Update. The new AMF 855 may create an MM context for the wireless device 100, 200. The new AMF 855 may create an MM context for the wireless device 100, 200, for example, in response to getting the mobility subscription data from the UDM 140, 240. The UDM 140, 240 may initiate Nudm_UECM_DeregistrationNotification 921 to the old AMF 856, corresponding to 3GPP, access. The UDM 140, 240 may initiate Nudm_UECM_DeregistrationNotification 921, for example, if the UDM 140, 240 stores the associated access type together with the serving AMF 155, 255. The old AMF 856 may remove the MM context of the wireless device 100, 200. The old AMF 856 may invoke a Namf_EventExposure_Notify service operation, for example, by sending one or more messages to the associated SMFs 160, 260 of the wireless device 100, 200. The old AMF 856 may invoke the service operation, for example, to notify the associated SMFs 160, 260 that the wireless device 100, 200 is deregistered from the old AMF 856. The SMF 160, 260 may release the PDU session(s). The SMF 160, 260 may release the PDU session(s), for example, based on the notification, if the serving NF removal reason indicated by the UDM 140, 240 is initial registration. The old AMF 856 may unsubscribe with the UDM 140, 240 for subscription data, for example, by using Nudm_SDM_unsubscribe 922.

The new AMF 855 may select 925 a PCF 135, 235. The new AMF 855 may select 925 a PCF 135, 235, for example, if the AMF 155, 255 determines to initiate PCF 135, 235 communication (e.g., the new AMF 855 has not yet obtained access and mobility policy for the wireless device 100, 200 and/or if the access and mobility policy in the new AMF 855 is no longer valid). The new AMF 855 may select the (V-)PCF identified by the PCF ID. The new AMF 855 may select the (V-)PCF identified by the PCF ID, for example, if the new AMF 855 receives a PCF ID from the old AMF 856 and successfully contacts the PCF 135, 235 indicated (e.g., identified) by the PCF ID. The new AMF 855 may select 925 a PCF 135, 235. The new AMF 855 may select 925 a PCF 135, 235, for example, if the PCF 135, 235 indicated (e.g., identified) by the PCF ID is not used (e.g., no response from the PCF 135 is received) and/or if there is no PCF ID received from the old AMF 856.

The new AMF 855 may perform a policy association establishment 930. The new AMF 855 may perform the policy association establishment 930, for example, during registration procedure. The new AMF 855 may include the PCF-ID in a Npcf_AMPolicyControl Get operation for the policy association establishment 930. The new AMF 855 may include the PCF-ID in the Npcf_AMPolicyControl Get operation, for example, if the new AMF 855 communicates with or contacts the PCF 135, 235 indicated (e.g., identified) by the (V-)PCF ID received, for example, during inter-AMF mobility. The PCF 135, 235 may provide the updated mobility restrictions to the new AMF 855. The PCF 135, 235 may provide the updated mobility restrictions to the new AMF 855, for example, if the AMF 155, 255 notifies the mobility restrictions (e.g., wireless device 100, 200 location) to the PCF 135, 235 for adjustment, or if the PCF 135, 235 updates the mobility restrictions itself due to some conditions (e.g., application in use, time and date). The PCF 135, 235 may invoke Namf_EventExposure_Subscribe 935 service operation for the wireless device 100, 200 event subscription.

The new AMF 855 may send, to the SMF 160, 260 an Nsmf_PDUSession_UpdateSMContext 936. The new AMF 855 may invoke the Nsmf_PDUSession_UpdateSMContext 936. The new AMF 855 may invoke the Nsmf_PDUSession_UpdateSMContext 936, for example, if the PDU session(s) to be re-activated is included in the registration request. The new AMF 855 may send the Nsmf_PDUSession_UpdateSMContext 936 request to the SMF(s) 160 associated with the PDU session(s). The new AMF 855 may send the Nsmf_PDUSession_UpdateSMContext 936 request, for example, to activate user plane connections of the PDU session(s). The SMF 160, 260 may decide to trigger (e.g., the intermediate UPF 110, 210 insertion) removal or change of PSA. The procedure may be performed without N11 and N2 interactions. The procedure may be performed without N11 and N2 interactions, for example, to update the N3 user plane between the RAN 105, 205 and the CN (e.g., 5GC) if the intermediate UPF 110, 210 insertion, removal, and/or relocation is performed for the PDU session(s) that is/are not included in PDU session(s) to be re-activated. The new AMF 855 may invoke the Nsmf_PDUSession_ReleaseSMContext 936 service operation towards the SMF 160, 260 (e.g., by sending one or more messages to the SMF 16, 260). The new AMF 855 may invoke the Nsmf_PDUSession_ReleaseSMContext 936 service operation, for example, if any PDU session status indicates that it is released at the wireless device 100, 200. The new AMF 855 may invoke the Nsmf_PDUSession_ReleaseSMContext 936 service operation towards the SMF 160, 260 (e.g., by sending one or more messages to the SMF 16, 260). The new AMF 855 may invoke the Nsmf_PDUSession_ReleaseSMContext 936 service operation, for example, in order to release any network resources related to the PDU session.

The new AMF 855 may send a wireless device Context Modification Request 940 to a N3IWF 938. The new AMF 855 may create an NGAP wireless device association, towards the N3IWF 938 to which the wireless device 100, 200 is connected (e.g., by sending one or more messages to the N3IWF 938). The new AMF 855 may create the NGAP wireless device association, for example, if the AMF 155, 255 has changed. The N3IWF 938 may respond to the new AMF 855, for example, with a wireless device Context Modification Response 942.

The new AMF 855 may send, to the wireless device 100, 200, a registration accept message 955. The registration accept message 955 may comprise, for example, GUTI (e.g., 5G-GUTI), registration area, mobility restrictions, PDU session status, allowed NSSAI (or mapping of allowed NSSAI), periodic registration update timer, LADN information and accepted MICO mode, IMS voice over PS session supported indication, emergency service support indicator, and/or the like. The new AMF 855 may send the registration accept message 955, for example, to the wireless device 100, 200. The registration accept message 955 may, for example, indicate that the registration request has been accepted. The registration accept message 955 may include GUTI (e.g., 5G-GUTI), for example, if the new AMF 855 allocates a new GUTI (e.g., 5G-GUTI). The new AMF 855 may send the registration area to the wireless device 100, 200. The new AMF 855 may send the registration area, for example, via a registration accept message 955 if, for example, the new AMF 855 allocates a new registration area. The wireless device 100, 200 may determine that the old registration area is valid or consider the old registration area to be valid. The wireless device 100, 200 may determine that the old registration area is valid (or consider the old registration area to be valid), for example, if there is no registration area included in the registration accept message. Mobility restrictions may be included in the registration accept message 955. Mobility restrictions may be included in the registration accept message 955, for example if mobility restrictions are used for the wireless device 100, 200 and if the registration type is not an emergency registration.

The new AMF 855 may indicate the established PDU sessions to the wireless device 100, 200, for example, in the PDU session status. The wireless device 100, 200 may locally remove internal resources related to PDU sessions. The wireless device 100, 200 may locally remove internal resources related to PDU sessions, for example, that are not marked as established in the received PDU session status. The wireless device 100, 200 may locally remove internal resources related to the PDU session of the current PLMN that are not marked as established in received PDU session status. The wireless device 100, 200 may locally remove internal resources related to the PDU session of the current PLMN that are not marked as established in received PDU session status, for example, if the wireless device 100, 200 is connected to the two AMFs 155, 255 belonging to different PLMN via 3GPP access and non-3GPP access. The new AMF 855 may indicate the PDU session status to the wireless device 100, 200. The new AMF 855 may indicate the PDU session status to the wireless device 100, 200, for example, if the PDU session status information is in the registration request. The mapping of the allowed NSSAI may be, for example, the mapping of each S-NSSAI of the allowed NSSAI to the S-NSSAIs of the configured NSSAI for the HPLMN. The new AMF 855 may include, in the registration accept message 955, the LADN information for LADNs that are or may be available within the registration area determined by the new AMF 855 for the wireless device 100, 200. The new AMF 855 may indicate whether MICO mode may be used. The new AMF 855 may indicate whether MICO mode may be used, for example, if the wireless device 100, 200 includes MICO mode in the request. The new AMF 855 may set the IMS voice over PS session supported indication. The new AMF 855 may perform a wireless device/RAN radio information and compatibility request procedure. The new AMF 855 may perform a wireless device/RAN radio information and compatibility request procedure, for example, to check the compatibility of the wireless device 100, 200 and RAN radio capabilities related to IMS voice over PS to set the IMS voice over PS session supported indication. The emergency service support indicator may inform the wireless device 100, 200 that emergency services are supported (e.g., the wireless device 100, 200 may request PDU session for emergency services.) The handover restriction list and wireless device-AMBR may be provided, to RAN 105, 205, by the new AMF 855.

The wireless device 100, 200 may send a registration complete message 960 to the new AMF 855. The wireless device 100, 200 may send the registration complete message 960 to the new AMF 855, for example, to acknowledge that a new GUTI (e.g., 5G-GUTI) has been assigned. The new AMF 855 may release the signaling connection with the wireless device 100, 200. The new AMF 855 may release the signaling connection with the wireless device 100, 200, for example, if information about the PDU session(s) to be re-activated is not included in the registration request. The new AMF 855 may not release the signaling connection after the completion of the registration procedure. The new AMF 855 may not release the signaling connection after the completion of the registration procedure, for example, if the follow-on request is included in the registration request. The new AMF 855 may not release the signaling connection after the completion of the registration procedure, for example, if the new AMF 855 is aware that some signaling is pending in the new AMF 855 or between the wireless device 100, 200 and the CN (e.g., 5GC).

Figure 10:
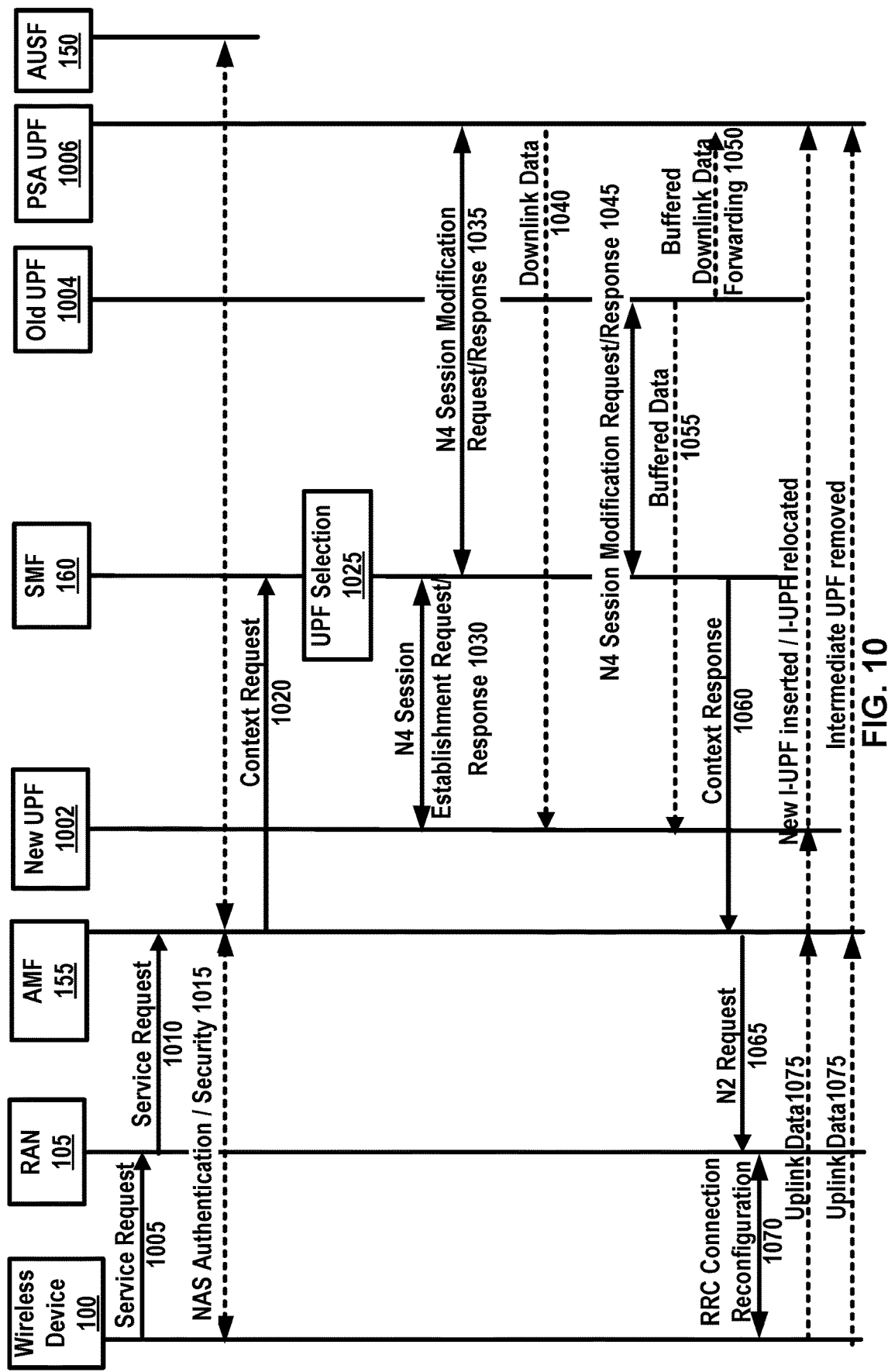
FIG. 10 shows an example call flow for a service request procedure.
Figure 11:
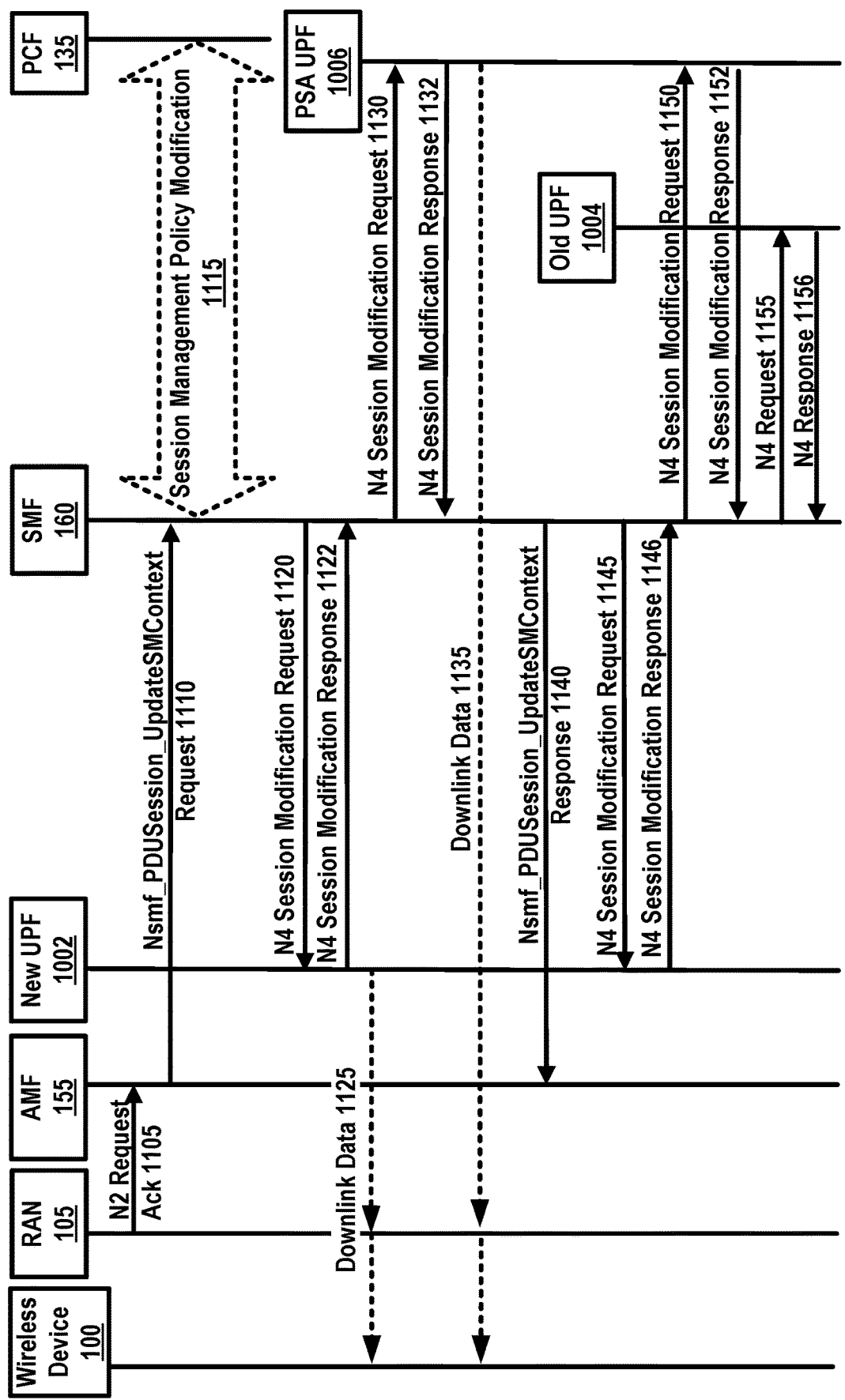
FIG. 11 shows an example call flow for a service request procedure.

FIG. 10 and FIG. 11 show an example call flow for a service request procedure. As shown in FIG. 10, a service request procedure (e.g., a wireless device 100 triggered service request procedure) may be used by a wireless device 100, 200 in a CM-IDLE state, for example, to request the establishment of a secure connection to an AMF 155, 255. FIG. 11 shows a service request procedure that may be a continuation of FIG. 10. The service request procedure may be used, for example, to activate a user plane connection for an established PDU session. The service request procedure may be triggered by the wireless device 100, 200 or the CN (e.g., 5GC). The service request procedure may be used, for example, if the wireless device 100, 200 is in the CM-IDLE state and/or in the CM-CONNECTED state. The service request procedure may, for example, selectively allow activation of user plane connections for some of the established PDU sessions.

A wireless device 100, 200 in the CM-IDLE state may initiate the service request procedure. A wireless device 100, 200 in the CM-IDLE state may initiate the service request procedure, for example, to send uplink signaling messages, user data, and/or the like, as a response to a network paging request, and/or the like. The wireless device 100, 200 may send the service request 1005 to a RAN 105, 205. The RAN may forward the service request 1010 to the AMF 155, 255. The AMF 155, 255 may perform authentication. The AMF 155, 255 may perform authentication, for example, after receiving the service request message 1010. The wireless device 100, 200 and/or a network device may send one or more messages (e.g., PDU session establishment from the wireless device 100, 200 to a SMF 160, 260) via the AMF 155, 255, for example, after the establishment of the signaling connection to the AMF 155, 255.

The AMF 155, 255 may respond, to the service request, with a service accept message. The AMF 155, 255 may respond with a service accept message, for example, to synchronize PDU session status between the wireless device 100, 200 and network. The AMF 155, 255 may respond with a service reject message to the wireless device 100, 200, for example, if the service request is not accepted by the network. The service reject message may include an indication and/or cause code requesting the wireless device 100, 200 to perform a registration update procedure. A network device (e.g., the CN) may perform one or more operations for a service request (e.g., based on user data). The network may take perform one or more operations for a service request, for example, if the user plane connection activation is unsuccessful. As shown in FIG. 10 and FIG. 11, more than one UPF (e.g., New UPF 1002, old UPF 1004, and PDU session Anchor PSA UPF 1006) may be involved in one or more operations relating to the service requests.

The wireless device 100, 200 may send, to the RAN 105, 205, an AN message. The AN message may comprise, for example, AN parameters, mobility management, MM NAS service request (e.g., list of PDU sessions to be activated, list of allowed PDU sessions, security parameters, PDU session status, and/or the like), and/or the like. The wireless device 100, 200 may provide the list of PDU sessions that may be activated, for example, if the wireless device 100, 200 re-activates the PDU session(s). The list of allowed PDU sessions may be provided by the wireless device 100, 200. The list of allowed PDU sessions may be provided by the wireless device 100, 200, for example, if the service request may be a response of a paging or a NAS notification. The list of allowed PDU sessions may indicate (e.g., identify) the PDU sessions that may be transferred and/or associated to the access on which the service request may be sent. The AN parameters may include a selected PLMN ID and/or an establishment cause for the RAN. The establishment cause may provide a reason for requesting the establishment of an RRC connection. The wireless device 100, 200 may send a NAS service request message 1005, encapsulated in an RRC message to the RAN 105, 205, towards the AMF 155, 255.

The wireless device 100, 200 may indicate (e.g., identify), using the list of PDU sessions to be activated, the PDU session(s) for which the UP connections are to be activated in the NAS service request message. The wireless device 100, 200 may indicate (e.g., identify) the PDU session(s) for which the UP connections are to be activated in the NAS service request message, for example, if the service request is triggered for user data. The wireless device 100, 200 may not indicate (e.g., identify) any PDU session(s). The wireless device 100, 200 may not indicate (e.g., identify) any PDU session(s), for example, if the service request is triggered for signaling. The wireless device 100, 200 may indicate (e.g., identify) the PDU session(s) having UP connections that may be activated in a MM NAS service request message. The wireless device 100, 200 may indicate (e.g., identify) the PDU session(s) having UP connections that may be activated, for example, by a list of PDU sessions to be activated if the identification procedure is triggered for a paging response, and/or if the wireless device 100, 200 has (e.g., at the same time) user data to be transferred.

The NAS service request message 1005 may indicate (e.g., identify), in the list of allowed PDU sessions, the list of PDU sessions associated with the non-3GPP access that may be re-activated over 3GPP. The NAS service request message 1005 may indicate (e.g., identify) the list of PDU sessions associated with the non-3GPP access that may be re-activated over 3GPP, for example, if the service request over 3GPP access is triggered in response to a paging indicating non-3GPP access. The PDU session status may indicate the PDU sessions available to the wireless device 100, 200. The wireless device 100, 200 may not trigger the service request procedure for a PDU session corresponding to a LADN. The wireless device 100, 200 may not trigger the service request procedure for a PDU session corresponding to a LADN, for example, if the wireless device 100, 200 is outside the area of availability of the LADN. The wireless device 100, 200 may not indicate (e.g., identify) such PDU session(s) in the list of PDU sessions to be activated. The wireless device 100, 200 may not indicate (e.g., identify) such PDU session(s) in the list of PDU sessions to be activated, for example, if the service request is triggered for other reasons.

The RAN 105, 205 may send an N2 service request message 1010 (e.g., a service request) to the AMF 155, 255. The N2 service request message 1010, for example, may comprise N2 parameters, a MM NAS service request, and/or the like. The AMF 155, 255 may reject the N2 message. The AMF 155, 255 may reject the N2 message, for example, if the AMF 155, 255 is unable to handle the service request. The N2 parameters may include, for example, the GUTI (e.g., 5G-GUTI), selected PLMN ID, location information, RAT type, establishment cause, and/or the like, for example, if the RAN 105, 205 (e.g., NG-RAN) is used. The GUTI (e.g., 5G-GUTI) may be obtained in an RRC procedure. The RAN 105, 205 may select the AMF 155, 255 based on or according to the GUTI (e.g., 5G-GUTI). The location information and/or the RAT type may relate to the cell in which the wireless device 100, 200 may be communicating (e.g., camping on). The AMF 155, 255 may initiate a PDU session release procedure. The AMF 155, 255 may initiate a PDU session release procedure, for example, in the network for the PDU sessions that have PDU session ID(s) that are indicated by the wireless device 100, 200 (e.g., based on the PDU session status) as not available.

The AMF 155, 255 may initiate a NAS authentication/security procedure 1015. The AMF 155, 255 may initiate a NAS authentication/security procedure 1015, for example, if the service request is not integrity protected or if integrity protection verification failed. The wireless device 100, 200 and the network may exchange NAS signaling based on or after successful establishment of the signaling connection. The wireless device 100, 200 and the network may exchange NAS signaling, for example, if the wireless device 100, 200 triggers the service request to establish a signaling connection. The AMF 155, 255 may send, to the SMF 160, 260, a PDU session update context request 1020 (e.g., Nsmf_PDUSession_UpdateSMContext request comprising PDU session ID(s), cause(s), wireless device location information, access type, and/or the like).

The context request 1020 (e.g., Nsmf_PDUSession_UpdateSMContext) may be invoked by the AMF 155. The context request 1020 may be invoked, for example, if the wireless device 100, 200 indicated (e.g., identifies) PDU session(s) to be activated in the NAS service request message. The context request 1020 (e.g., Nsmf_PDUSession_UpdateSMContext request) may be triggered by the SMF 160, 260. The PDU session(s) indicated (e.g., identified) by the wireless device 100 may correlate to PDU session ID(s) other than the PDU session that may be triggering the procedure. The current wireless device location may be outside the area of validity for the N2 information provided by the SMF 160, for example, during a network triggered service request procedure. The AMF 155, 255 may not send the N2 information provided by the SMF 160, 260, for example, during the network triggered service request procedure.

The AMF 155, 255 may determine the PDU session(s) to be activated. The AMF 155, 255 may send a context request 1020 (e.g., Nsmf_PDUSession_UpdateSMContext request) to the SMF 160, 260 associated with the PDU session(s). The cause may indicate the establishment of user plane resources for the PDU session(s).

The AMF 155, 255 may notify the SMF 160, 260 that the user plane for the PDU session may not be re-activated. The AMF 155, 255 may notify the SMF 160, 260 that the user plane for the PDU session may not be re-activated, for example, if the procedure is triggered based on or in response to paging indicating non-3GPP access and/or if the list of allowed PDU sessions provided by the wireless device 100 does not include the PDU session for which the wireless device 100, 200 was paged. The service request procedure may succeed without re-activating the user plane of any PDU sessions. The AMF 155, 255 may notify the wireless device 100, 200 that the request procedure has succeeded (e.g., without re-activating the user plane of any PDU sessions).

The SMF 160, 260 may determine to keep the PDU session. The SMF 160, 260 may determine to keep the PDU session, for example, based on local policies and/or based on the wireless device location reporting from the AMF 155, 255, for example, if the PDU session ID corresponds to a LADN and/or if the SMF 160, 260 determines that the wireless device 100, 200 is outside the area of availability of the LADN. The SMF 160, 260 may reject the activation of a user plane connection. The SMF 160, 260 may reject the activation of a user plane connection, for example, for the PDU session. The SMF 160, 260 may inform the AMF 155, 255 of the determination that the wireless device 100, 200 is outside the area of availability of the LADN. The SMF 160, 260 may notify the new UPF 1002 that originated the data notification to discard downlink data for the PDU sessions and/or not to provide further data notification messages. The SMF 160, 260 may notify the new UPF 1002 that originated the data notification to discard downlink data for the PDU sessions and/or not to provide further data notification messages, for example, if the procedure is triggered by a network triggered service request. The SMF 160, 260 may respond to the AMF 155, 255 with an appropriate reject cause, and the user plane activation of PDU session may be stopped.

The SMF 160, 260 may determine to release the PDU session. The SMF 160, 260 may determine to release the PDU session, for example, based on local policies and/or based on the wireless device 100, 200 location reporting from the AMF 155, 255. The SMF 160, 260 may determine to release the PDU session, for example, if the PDU session ID corresponds to a LADN and/or if the SMF 160, 260 determines that the wireless device 100, 200 is outside the area of availability of the LADN. The SMF 160, 260 may locally release the PDU session and/or may inform the AMF 155, 255 that the PDU session may be released. The SMF 160, 260 may respond, to the AMF 155, 255, with an appropriate reject cause. The user plane activation of the PDU session may be stopped. The user plane activation of the PDU session may be stopped, for example, based on or in response to the reject cause.

The SMF 160, 260 may check the UPF Selection 1025 criteria. The SMF 160, 260 may check the UPF Selection 1025 criteria, for example, based on the location information received from the AMF 155, 255, (e.g., slice isolation requirements, slice coexistence requirements, UPF's dynamic load, UPF's relative static capacity among UPFs supporting the same DNN, UPF location available at the SMF 160, 260, wireless device 100, 200 location information, capability of the UPF and the functionality required for the particular wireless device 100, 200 session) if the UP activation of the PDU session is accepted by the SMF 160, 260. The appropriate UPF may be selected, for example, by matching the functionality and features required for a wireless device 100, 200, DNN, PDU session type (e.g., IPv4, IPv6, ethernet type or unstructured type) and/or, if applicable, the static IP address/prefix, SSC mode selected for the PDU session, wireless device 100, 200 subscription profile in UDM 140, 240, DNAI as included in the PCC rules, local operator policies, S-NSSAI, access technology being used by the wireless device 100, 200, UPF logical topology, and/or the like. The SMF may determine to continue using the current UPF(s). The SMF may determine to select a new UPF 1002 (or add/remove an intermediate UPF). The SMF may determine to select a new UPF 1002, for example, if the wireless device 100, 200 has moved out of the service area of an old UPF 1004 that was previously connecting to the RAN 105, 205 and maintaining the UPF(s) acting as PDU session anchor. The SMF may trigger re-establishment of the PDU session. The SMF may trigger re-establishment of the PDU session, for example, to perform relocation/reallocation of the UPF acting as PDU session anchor (e.g., the wireless device 100, 200 has moved out of the service area of the anchor UPF 110, 210 that is connecting to RAN 105, 205).

The SMF 160, 260 may send an N4 session establishment request message 1030 to the new UPF 1002 (e.g., new intermediate UPF). The N4 session establishment request message 1030 may be sent to the new UPF 1002. The N4 session establishment request message 1030 may provide, for example, packet detection, data forwarding, enforcement, and reporting rules to be installed on the new UPF 1002, if the SMF 160, 260 selects a new UPF 1002 to act as an intermediate UPF for the PDU session or if the SMF 160, 260 selects to insert an intermediate UPF for a PDU session which may not have an intermediate UPF. The PDU session anchor addressing information (on N9) for the PDU session may be provided to the new UPF 1002 (e.g., new intermediate UPF).

The SMF 160, 260 may include a data forwarding indication. The SMF 160, 260 may include a data forwarding indication, for example, if a new UPF 1002 is selected by the SMF 160, 260 to replace the old (intermediate) UPF 1004. The data forwarding indication may indicate, to the new UPF 1002, that a second tunnel endpoint may be reserved for buffered DL data from the old UPF 1004.

The new UPF 1002 (e.g., new intermediate UPF) may send an N4 session establishment response message 1030 to the SMF 160, 260. The new UPF 1002 may provide DL CN tunnel info for the new UPF 1002 and UL CN tunnel info (e.g., CN N3 tunnel info) to the SMF 160, 260. The new UPF 1002 may provide DL CN tunnel info for the new UPF 1002 and UL CN tunnel info (e.g., CN N3 tunnel info) to the SMF 160, 260, for example, if the new UPF 1002 may allocate CN tunnel information. The new UPF 1002 (e.g., new intermediate UPF), acting as N3 terminating point, may send the DL CN tunnel info for the old UPF 1004 (e.g., old intermediate UPF) to the SMF 160, 260. The new UPF 1002 (e.g., new intermediate UPF), acting as N3 terminating point, may send the DL CN tunnel info for the old UPF 1004 (e.g., old intermediate UPF) to the SMF 160, 260 if the data forwarding indication is received. The SMF 160, 260 may start a timer, for example, to release the resource in the old intermediate UPF 1004.

The SMF 160, 260 may send an N4 session modification request message 1035 to a PDU session anchor, PSA UPF 1006. The N4 session modification request message 1035 may provide, for example, the data forwarding indication and/or the DL tunnel information from the new UPF 1002, if the SMF 160 selects the new UPF 1002 for the PDU session or removes the old UPF 1004. The PSA UPF 1006 may send or begin to send the downlink data 1040 to the new UPF 1002, such as indicated in the DL tunnel information. PSA UPF 1006 may send or begin to send the downlink data 1040 to the new UPF 1002, for example, if the new UPF 1002 is added for the PDU session.

The SMF 160, 260 may include the data forwarding indication in a service request. The SMF 160, 260 may include the data forwarding indication in a service request, for example, if the service request is triggered by the network and/or if the SMF 160, 260 removes the old UPF 1004 and does not replace the old UPF 1004 with the new UPF 1002. The data forwarding indication may indicate, to the PSA UPF 1006 that a second tunnel endpoint may be reserved for buffered DL data from the old UPF 1004. The PSA UPF 1006 may buffer or begin to buffer the downlink data it receives from the N6 interface.

The PSA UPF 1006 may send an N4 session modification response 1035 to the SMF 160, 260. The PSA UPF 1006 may become, for example, an N3 terminating point. The PSA UPF 1006 may send CN DL tunnel information, for the old UPF 1004 (e.g., old intermediate UPF) to the SMF 160, 260, for example, if the data forwarding indication is received. The SMF 160, 260 may start a timer, for example, to release the resource in old UPF 1004.

The PSA UPF 1006 may send downlink data 1040 to the new UPF 1002. The SMF 160, 260 may send an N4 session modification request message 1045 (e.g., new UPF address, new UPF DL tunnel ID, and/or the like) to the old UPF 1004. The SMF 160, 260 may send the N4 session modification request message 1045 to the old UPF 1004. The SMF 160, 260 may provide the DL tunnel information for the buffered downlink data, for example, if the service request is triggered by the network and/or if the SMF 160, 260 removes the old UPF 1004. The DL tunnel information may be from the new UPF 1002 and/or may act as an N3 terminating point. The DL tunnel information may be from the new UPF 1002 and/or may act as an N3 terminating point, for example, if the SMF 160, 260 allocates a new UPF 1002. The DL tunnel information may be from the PSA UPF 1006, acting as N3 terminating point. The DL tunnel information may be from the PSA UPF 1006, acting as N3 terminating point, for example, if the SMF 160, 260 does not allocate a new UPF 1002. The SMF 160, 260 may start a timer to monitor the forwarding tunnel. The old UPF 1004 may send the N4 session modification response message 1045 to the SMF 160, 260.

The old UPF 1004 may forward its buffered data 1055 (e.g., buffered downlink data forwarding) to the new UPF 1002 acting as N3 terminating point. The old UPF 1004 may forward its buffered data 1055 to the new UPF 1002 acting as N3 terminating point, for example, if the old UPF 1004 is relocated and/or the forwarding tunnel was established to the new UPF 1002. The old UPF 1004 may forward its buffered data 1050 (e.g., buffered downlink data forwarding), to the PSA UPF 1006 acting as N3 terminating point. The old UPF 1004 may forward its buffered data 1050, to the PSA UPF 1006 acting as N3 terminating point, for example, if the old UPF 1004 is removed, the new UPF 1002 is not assigned for the PDU session, and the forwarding tunnel is established to the PSA UPF 1006.

The SMF 160 may send an N11 context response message 1060 to the AMF 155, 255. The SMF 160 may send the N11 context response message 1060 to the AMF 155, 255, for example, based on or after receipt of the context request 1020, (e.g., Nsmf_PDUSession_UpdateSMContext request) with a cause (e.g., establishment of user plane resources). The context response message 1060 may comprise a Nsmf_PDUSession_UpdateSMContext response. The Nsmf_PDUSession_UpdateSMContext response may comprise: N1 SM container (PDU session ID, PDU session re-establishment indication), N2 SM information (PDU session ID, QoS profile, CN N3 tunnel info, S-NSSAI), cause) The SMF 160, 260 may determine whether UPF reallocation may be performed. The SMF 160, 260 may determine whether UPF reallocation may be performed, for example, based on the wireless device 100, 200 location information, the UPF service area, and/or operator policies. The SMF 160, 260 may generate N2 SM information. The SMF 160, 260 may send an Nsmf_PDUSession_UpdateSMContext response to the AMF 155, 255. The SMF 160, 260 may send the Nsmf_PDUSession_UpdateSMContext response to the AMF 155, 255, for example, to establish the user plane(s) for a PDU session that the SMF 160, 260 may determine to be served by the current UPF (e.g., PDU session anchor or intermediate UPF). The N2 SM information may contain information that the AMF 155, 255 may provide to the RAN 105, 205. The SMF 160, 260 may reject the activation of UP of the PDU session. The SMF 160, 260 may reject the activation of UP of the PDU session, for example, by sending a context request 1020 (e.g., Nsmf_PDUSession_UpdateSMContext response) that may contain an N1 SM container, to the wireless device 100, 200 via the AMF 155, 255 for a PDU session that the SMF 160, 260 determines requires a UPF relocation for a PSA UPF 1006. The N1 SM container may include the corresponding PDU session ID and PDU session re-establishment indication.

The SMF 160, 260 may invoke an Namf_Communication_N1N2MessageTransfer service operation to the AMF 155, 255. The SMF 160, 260 may invoke the Namf_Communication_N1N2MessageTransfer service operation, for example, to establish the user plane(s) for the PDU sessions based on or after/upon reception of the Namf_EventExposure_Notify from the AMF 155, 255 to the SMF 160, 260. The Namf_EventExposure_Notify may have an indication that the wireless device 100, 200 is reachable, for example, if the SMF 160, 260 has pending DL data. The SMF 160, 260 may resume sending DL data notifications to the AMF 155, 255 for DL data.

The SMF 160, 260 may send a message, to the AMF 155, 255, to reject the activation of UP of the PDU session. The SMF 160, 260 may reject the activation of UP of the PDU session, for example, by including a cause in the Nsmf_PDUSession_UpdateSMContext response, if the PDU session corresponds to a LADN and the wireless device 100, 200 is outside the area of availability of the LADN. The SMF 160, 260 may reject the activation of UP of the PDU session, for example, if the AMF 155, 255 notifies the SMF 160, 260 that the wireless device 100, 200 may be reachable for regulatory prioritized service. The SMF 160, 260 may reject the activation of UP of the PDU session, for example, if the PDU session to be activated is not for a regulatory prioritized service and/or if the SMF 160, 260 determines to perform PSA UPF 1006 relocation for the requested PDU session.

The AMF 155, 255 may send, to the RAN 105, 205, an N2 request message 1065 (e.g., N2 SM information received from the SMF 160, 260, security context, AMF 155, 255 signaling connection ID, handover restriction list, MM NAS service accept, list of recommended cells/TAs/NG-RAN node identifiers). The RAN 105, 205 may store, for example, the security context, AMF 155, 255 signaling connection ID, QoS information for the QoS flows of the PDU sessions that may be activated, and/or N3 tunnel IDs in the wireless device RAN context. The MM NAS service accept may include the PDU session status in the AMF 155, 255. The MM NAS service accept may include the PDU session ID and/or the reason why the user plane resources may not be activated (e.g., LADN not available). The MM NAS service accept may include the PDU session ID and/or the reason why the user plane resources may not be activated, for example, if the activation of the UP of a PDU session is rejected by the SMF 160, 260. A local PDU session release for the session request procedure may be indicated to the wireless device 100, 200 via the session status.

The AMF 155, 255 may not wait to receive responses from all the SMFs 160, 260 before it sends the N2 SM information to the wireless device 100, 200. The AMF 155, 255 may not wait to receive responses from all the SMFs 160, 260 before it sends the N2 SM information to the wireless device 100, 200, for example, if there are multiple PDU sessions that may involve multiple SMFs 160, 260. The AMF 155, 255 may wait for all responses from the SMFs 160, 260 before it sends a MM NAS service accept message to the wireless device 100, 200.

The AMF 155, 255 may include at least one N2 SM information from the SMF 160, 260. The AMF 155, 255 may include at least one N2 SM information from the SMF 160, 260, for example, if the procedure is triggered for the PDU session user plane activation. The AMF 155, 255 may send additional N2 SM information, from the SMFs 160, 260, in separate N2 message(s) (e.g., N2 tunnel setup request), if there is additional N2 SM information. The AMF 155, 255 may send one or more N2 request messages to the RAN 105, 205. The AMF 155, 255 may send one or more N2 request messages to the RAN 105, for example, after all the context response messages 1060 are received from all the SMFs 160, 260 associated with the wireless device 100, 200 (e.g., if there are multiple SMFs 160, 260). The N2 request message 1065 may include the N2 SM information received in each of the context response messages 1060 (e.g., Nsmf_PDUSession_UpdateSMContext responses) and PDU session IDs. The N2 request message 1065 may include the N2 SM information received in each of the context response messages 1060 and PDU session IDs, for example, to enable the AMF 155, 255 to associate responses to the relevant SMF 160, 260 (e.g., if multiple SMFs 160, 260 are involved).

The AMF 155, 255 may include a list of recommended cells, TAs, and/or RAN (e.g., NG-RAN) node identifiers in the N2 request 1065. The AMF 155, 255 may include a list of recommended cells, TAs, and/or RAN (e.g., NG-RAN) node identifiers in the N2 request 1065, for example, if the RAN 105, 205 (e.g., NG RAN) node provides the list of recommended cells/TAs/NG-RAN node identifiers. The RAN 105, 205 may use the information from the N2 request, to allocate the RAN 105, 205 notification area. The RAN 105, 205 may use the information from the N2 request to allocate the RAN 105, 205 notification area, for example, if the RAN 105, 205 determines to enable the RRC inactive state for the wireless device 100, 200.

The AMF 155, 255 may include the wireless device's RRC inactive assistance information. The AMF 155, 255 may include the wireless device's RRC inactive assistance information, for example, if the AMF 155, 255 receives an indication, from the SMF 160, 260 (e.g., during a PDU session establishment procedure), that the wireless device 100, 200 is using a PDU session related to latency sensitive services for any of the PDU sessions established for the wireless device 100, 200, and/or if the AMF 155, 255 has received an indication from the wireless device 100, 200 that supports the CM-CONNECTED with RRC inactive state. The AMF 155, 255 may include the wireless device's RRC inactive assistance information. The AMF 155, 255 may include the wireless device's RRC inactive assistance information, for example, based on network configuration.

The RAN 105, 205 may send, to the wireless device 100, 200, a message to perform RRC connection reconfiguration 1070, with the wireless device 100, 200. The RAN 105, 205 may send the message to perform RRC connection reconfiguration 1070, for example, based on the QoS information, for all the QoS flows of the PDU sessions whose UP connections are activated and data radio bearers. The user plane security may be established.

The RAN 105, 205 may send/forward the MM NAS service accept to the wireless device 100, 200. The RAN 105, 205 may send/forward the MM NAS service accept to the wireless device 100, 200, for example, if the N2 request 1065 includes an MM NAS service accept message. The wireless device 100, 200 may locally delete the context of PDU sessions that may not be available in the CN (e.g., 5GC). The wireless device 100, 200 may send uplink data 1075 to the RAN 105, 205, AMF 155, 255, and the PSA UPF 1006.

The wireless device 100, 200 may initiate PDU session re-establishment for the PDU session(s) that may be re-established. The wireless device 100, 200 may initiate PDU session re-establishment, for example, after the service request procedure is complete. The wireless device 100, 200 may initiate PDU session re-establishment, for example, if the N1 SM information is sent (e.g., transmitted) to the wireless device 100 and indicates that some PDU session(s) may be re-established. The uplink data from the wireless device 100 may be sent/forwarded to the RAN 105, 205. The uplink data from the wireless device 100 may be sent/forwarded to the RAN 105, 205, for example, after the user plane radio resources are setup. The RAN 105, 205 (e.g., NG-RAN) may send the uplink data to the provided UPF address and the tunnel ID. The new UPF 1002 may be inserted and/or relocated as a new intermediate UPF for communications (e.g., uplink data 1075) between the AMF (or new UPF 1002) and the PSA UPF 1006. The new UPF 1002 may be removed. The AMF 1002 may communicate (e.g., send uplink data 1075) with the PSA UPF 1006, for example, after the new UPF 1002 may be removed.

As shown in FIG. 11, the RAN 105, 205 may send an N2 request Ack message 1105 to the AMF 155, 255. The N2 request Ack message 1105 may comprise N2 SM information. The N2 SM information may comprise, for example, AN tunnel information, a list of accepted QoS flows for the PDU sessions whose UP connections are activated, and/or a list of rejected QoS flows for the PDU sessions whose UP connections are activated. The N2 request message 1065 may include N2 SM information(s) (e.g., AN tunnel information). The RAN 105, 205 may respond to the N2 SM information by sending a separate N2 message (e.g., N2 tunnel setup response). The N2 request Ack message 1105 may comprise, for example, multiple N2 SM information and/or information to enable the AMF 155, 255 to associate the responses to an SMF 160, 260 (e.g., a relevant SMF 160, 260), if multiple N2 SM information is included in the N2 request message 1065.

The AMF 155, 255 may send, to the SMF 160, 260, an Nsmf_PDUSession_UpdateSMContext request message 1110 (e.g., N2 SM information, such as AN tunnel information, and RAT type) for each or at least one PDU session. The AMF 155, 255 may send/forward the N2 SM information to the relevant SMF 160, 260. The AMF 155, 255 may send/forward the N2 SM information to the relevant SMF 160, 260, for example, if the AMF 155, 255 receives N2 SM information (one or multiple) from the RAN 105, 205. The AMF 155, 255 may include the wireless device time zone (e.g., in the Nsmf_PDUSession_UpdateSMContext request message 1110). The AMF 155, 255 may include the wireless device time zone, for example, if the wireless device time zone changes relative to a last reported wireless device time zone.

The SMF 160, 260 and PCF 135, 235 may perform session management policy modification 1115. The session management policy modification 1115 may comprise, for example, updating and/or removal of session related policies. The SMF 160, 260 may send a notification containing new location information to the PCF 135, 235 (if subscribed). The SMF 160, 260 may send a notification containing new location information to the PCF 135, 235, for example, if dynamic PCC is deployed, such as by invoking an event exposure notification operation (e.g., a Nsmf_EventExposure_Notify service operation). The PCF 135, 235 may provide updated policies. The PCF 135, 235 may provide updated policies, for example, by invoking a policy control update notification message (e.g., an Npcf_SMPolicyControl_UpdateNotify operation).

The SMF 160, 260 may initiate an N4 session modification procedure. The SMF 160, 260 may initiate an N4 session modification procedure, for example, by sending an N4 session modification request message 1120, to the new UPF 1002. The SMF 160, 260 may provide, for example, AN tunnel information if the SMF 160, 260 selects a new UPF 1002 to act as an intermediate UPF for the PDU session. The new UPF 1102 may send an N4 session modification response 1122 to the SMF 160. Downlink data 1125 from the new UPF 1002 may be sent/forwarded to the RAN 105, 205 and wireless device 100, 200. The SMF 150, 250 may send an N4 session modification request message 1130 to the PCF 135, 235. The PCF 135, 235 may send an N4 session modification response message 1132 to the SMF 160, 260. The PCF 135, 235 may send downlink data 1135 to the RAN 105, 205. The wireless device 100, 200. The SMF 160, 260 may send an Nsmf_PDUSession_UpdateSMContext response 1140 to the AMF 155, 255.

The SMF 160, 260 may send an N4 session modification request 1145 to the new UPF 1002 (e.g., new intermediate UPF) acting as an N3 terminating point. The SMF 160, 260 may send an N4 session modification request 1145 to the new UPF 1002 (e.g., new intermediate UPF) acting as an N3 terminating point, for example, to release the forwarding tunnel, if the forwarding tunnel is established to the new UPF 1002 and/or if the timer set, by the SMF 160, 260, for forwarding tunnel is expired. The new UPF 1002 (e.g., new intermediate UPF) may send an N4 session modification response 1146 to the SMF 160, 260. The SMF 160, 260 may send an N4 session modification request 1150 or an N4 session release request to the PSA UPF 1006 and/or the old UPF 1004. The SMF 160, 260 may send an N4 Request 1155 comprising, for example, an N4 session modification request or an N4 session release request. A N4 session modification request, for example, may provide AN tunnel information, if the SMF 160, 260 continues using the old UPF 1004. The SMF 160, 260 may initiate resource release. The SMF 160, 260 may initiate resource release, for example, if the SMF 160, 260 selects a new UPF 1002 to act as intermediate UPF and if the old UPF 1004 may not be a PSA UPF 1006, by sending an N4 session release request (release cause) to the old UPF 1004 after the timer expires.

The old UPF 1004 (e.g., old intermediate UPF) may send an N4 Response 1156. The N4 Response 1156 may comprise, for example, a N4 session modification response and/or an N4 session release response to the SMF 160, 260. The old UPF 1004 may confirm the modification and/or release of resources with the N4 session modification response and/or the N4 session release response message. The AMF 155, 255 may invoke an Namf_EventExposure_Notify service operation. The AMF 155, 255 may invoke an Namf_EventExposure_Notify service, for example, to notify the NFs, that have subscribed to the events, of the mobility related events. The AMF 155, 255 may invoke the Namf_EventExposure_Notify. The AMF 155, 255 may invoke the Namf_EventExposure_Notify, for example, towards the SMF 160, 260 (e.g., by sending one or more messages to the SMF 160, 260), if the SMF 160, 260 subscribed for notification of a wireless device 100, 200 moving into or out of an area of interest and/or if the wireless device's current location indicates that it may be moving into or moving out of the area of interest to which the wireless device may be subscribed. The AMF 155, 255 may invoke the Namf_EventExposure_Notify, for example, towards the SMF 160, 260 (e.g., sending one or more messages to the SMF 160, 260), for example, if the SMF 160, 260 subscribed for LADN DNN and/or if the wireless device 100, 200 may be moving into or outside of an area where the LADN is available, and/or if the wireless device 100, 200 may be in MICO mode and the AMF 155, 255 notified an SMF 160, 260 of the wireless device 100, 200 being unreachable and that SMF 160, 260 may not be able to send DL data notifications to the AMF 155, 255. The AMF 155, 255 may inform the SMF 160, 260 that the wireless device 100, 200 may be or is reachable. The AMF 155, 255 may inform the SMF 160, 260 if the SMF 160, 260 subscribed for wireless device 100, 200 reachability status. Then the AMF 155, 255 may, for example, notify the SMF 160, 260 of wireless device 100, 200 reachability.

Figure 12:
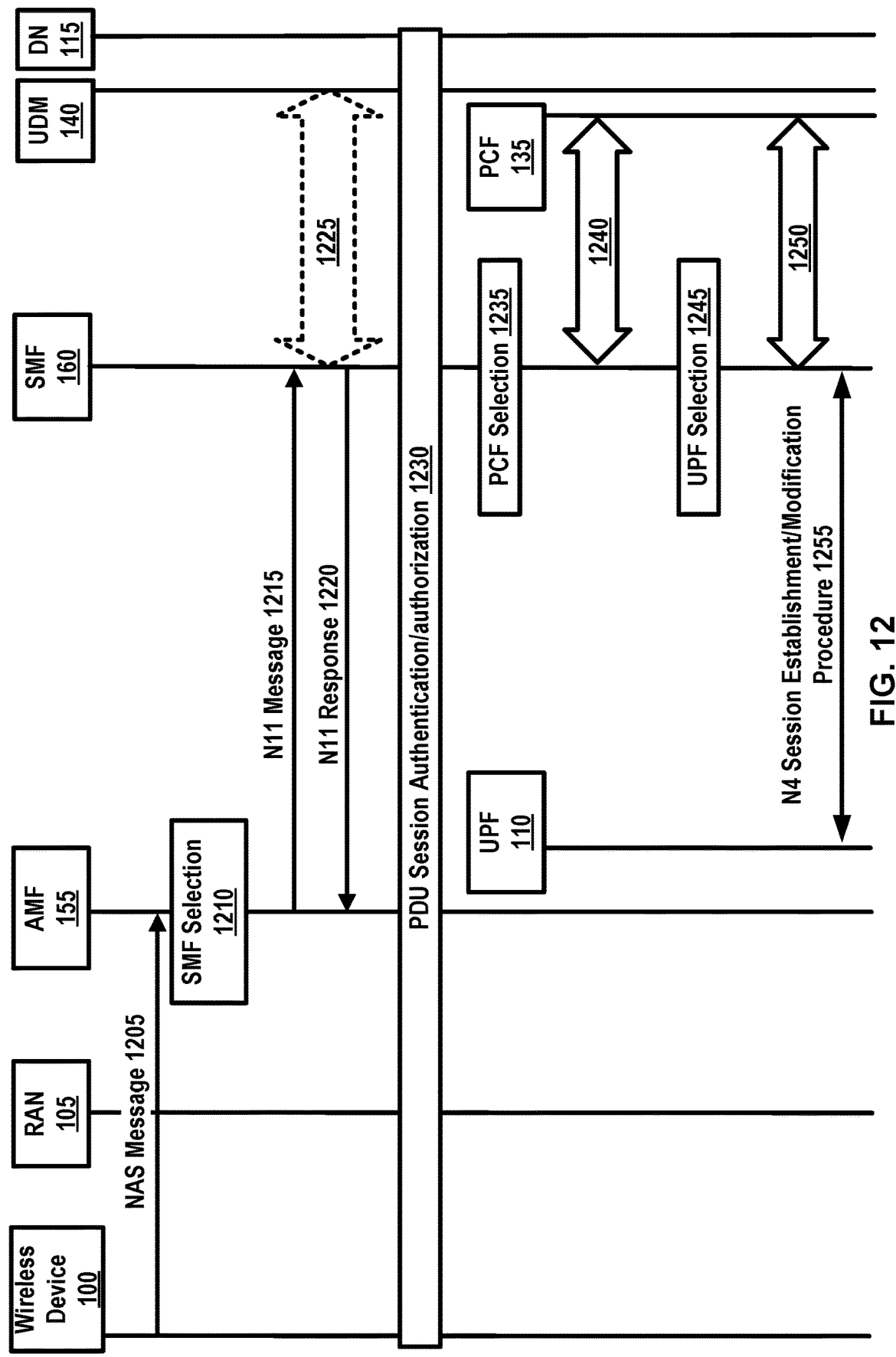
FIG. 12 shows an example of a PDU session establishment procedure.
Figure 13:
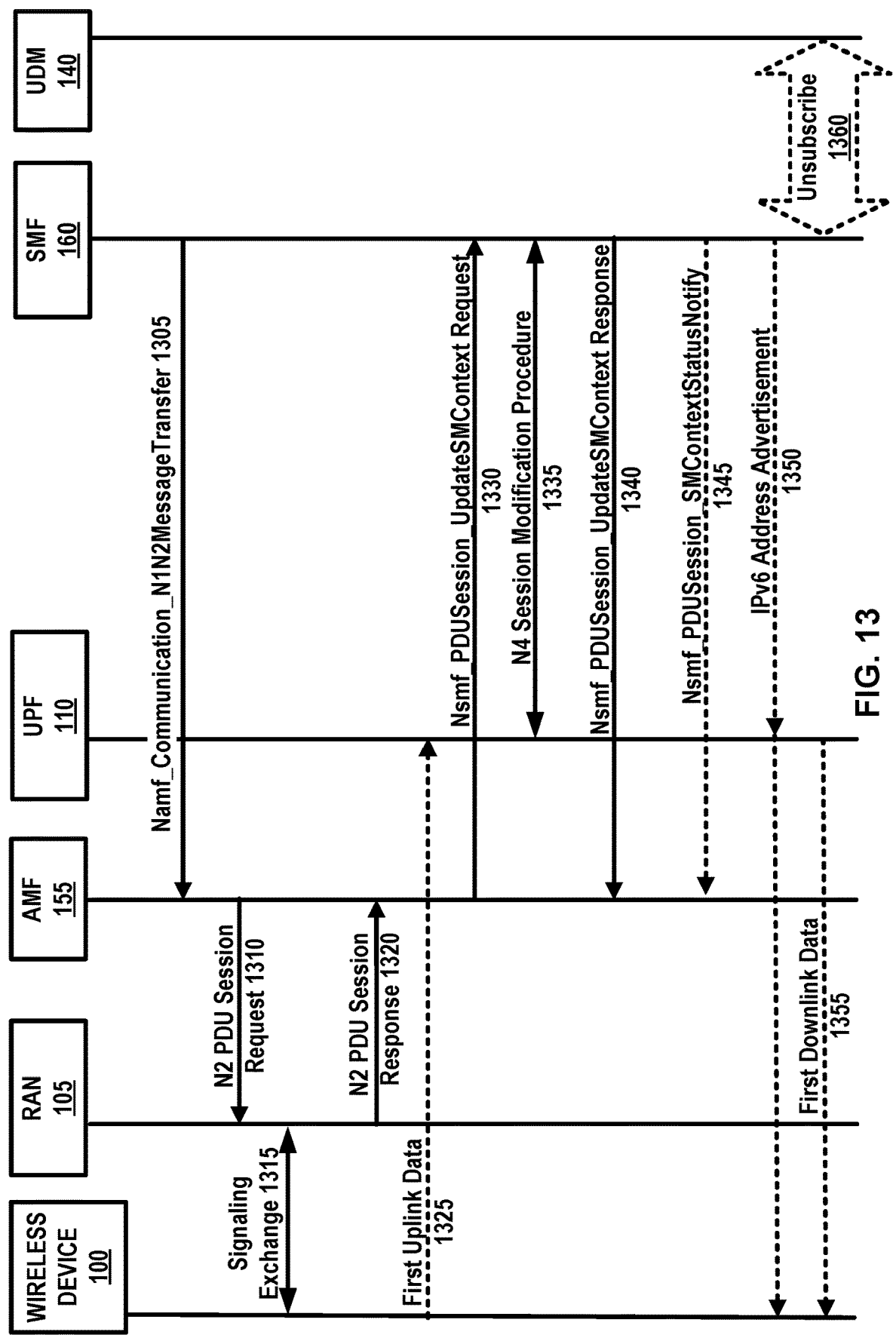
FIG. 13 shows an example PDU session establishment procedure.

A PDU session establishment procedure is shown in FIG. 12 and FIG. 13. A wireless device 100, 200 may send, to an AMF 155, 255, a NAS message 1205 (e.g., PDU session establishment request message, SM NAS message). The NAS message 1205 may comprise, for example, NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like (e.g., if the PDU session establishment procedure is used). The wireless device 100, 200 may generate a new PDU session ID. The wireless device 100, 200 may generate a new PDU session ID, for example, to establish a new PDU session. The wireless device 100, 200 may initiate the wireless device's requested PDU session establishment procedure. The wireless device 100, 200 may initiate the wireless device's requested PDU session establishment procedure, for example, by sending a request type indicating an emergency request, if emergency services are required and if an emergency PDU session may not already be established. The wireless device 100 may initiate the wireless device's requested PDU session establishment procedure. The wireless device 100 may initiate the wireless device's requested PDU session establishment procedure, for example, by sending (e.g., transmitting) a NAS message containing a PDU session establishment request within the N1 SM container. The PDU session establishment request, may comprise, for example, a PDU type, SSC mode, protocol configuration options, and/or the like. The request type, for example, may indicate an initial request, for example, if the PDU session establishment is a request to establish the new PDU session. The request type may indicate an existing PDU session, for example, if the request refers to an existing PDU session between a 3GPP access and a non-3GPP access or to an existing PDN connection in EPC. The request type, for example, may indicate an emergency request, for example, if the PDU session establishment is a request to establish a PDU session for emergency services. The request type, for example, may indicate an existing emergency PDU session, for example, if the request refers to an existing PDU session for emergency services between a 3GPP access and a non-3GPP access.

The NAS message 1205 sent by the wireless device 100, 200 may be encapsulated, by the AN, in an N2 message to the AMF 155, 255. The N2 message to the AMF 155, 255 may comprise, for example, user location information and/or access technology type information. The PDU session establishment request message may comprise a SM PDU DN request container. The SM PDU DN request container may comprise information for the PDU session authorization by the external DN. The wireless device 100, 200 may include the old PDU session ID in the request message. The wireless device 100, 200 may include the old PDU session ID in the request message, for example, if the procedure may be triggered for SSC mode 3 operation. SSC mode 3 operation may indicate the PDU session ID of the on-going PDU session to be released, in the NAS message. The old PDU session ID may be an optional parameter that may be included in the PDU session establishment request message. The AMF 155, 255 may receive, from the AN, the NAS message 1205 (e.g., NAS SM message). The NAS message 1205, for example, may comprise the user location information (e.g., cell ID for the RAN 105, 205). The wireless device 100, 200 may not trigger a PDU session establishment, for a PDU session corresponding to a LADN, for example, if the wireless device 100, 200 is outside the area of availability of the LADN.

The AMF 155, 255 may determine that the NAS message or the SM NAS message corresponds to the request for the new PDU session. The AMF 155, 255 may determine that the NAS message or the SM NAS message corresponds to the request for the new PDU session, for example, based on a request type indicating initial request and/or based on whether the PDU session ID may (or may not) be used for an/any existing PDU session(s) of the wireless device 100, 200. The AMF 155, 255 may determine a default S-NSSAI for the requested PDU session. The AMF 155, 255 may determine a default S-NSSAI for the requested PDU session, for example, if the NAS message does not contain an S-NSSAI, according to the wireless device 100, 200 subscription, if it contains only one default S-NSSAI, and/or based on operator policy. The AMF 155, 255 may perform SMF selection 1210 to select an SMF 160, 260. The AMF 155, 255 may store an association of the S-NSSAI, the PDU session ID, and an SMF ID. The AMF 155, 255 may store an association of the S-NSSAI, the PDU session ID, and an SMF ID, for example, if the request type may indicate an initial request and/or if the request may be due to handover from an Evolved Packet System (EPS). The AMF 155, 255 may select the SMF 160, 260. The AMF 155, 255 may store an association of the new PDU session ID and/or the selected SMF ID. The AMF 155, 255 may select the SMF 160, 260 and may store an association of the new PDU session ID and the selected SMF ID, for example, if the request type is an initial request and/or if the old PDU session ID indicates the existing PDU session is (or may be) contained in the message.

The AMF 155, 255 may send, to the SMF 160, 260, an N11 message 1215 (e.g., Nsmf_PDUS_ession_CreateSMContext request or Nsmf_PDUSession_UpdateSMContext request). The Nsmf_PDUSession_CreateSMContext request, for example, may comprise SUPI or PEI, DNN, S-NSSAI, PDU session ID, AMF ID, request type, N1 SM container (PDU session establishment request), user location information, access type, PEI, and/or GPSI. The Nsmf_PDUSession_UpdateSMContext request, for example, may comprise SUPI, DNN, S-NSSAI, PDU session ID, AMF ID, request type, N1 SM container (PDU session establishment request), user location information, access type, RAT type, and/or PEI. The AMF 155, 255 may invoke the Nsmf_PDUSession_CreateSMContext request. The AMF 155, 255 may invoke the Nsmf_PDUSession_CreateSMContext request, for example, if the AMF 155, 255 may not have an association with the SMF 160, 260 for the PDU session ID provided by the wireless device 100, 200 (e.g., if the request type indicates initial request). The AMF 155, 255 may invoke the Nsmf_PDUSession_UpdateSMContext request. The AMF 155, 255 may invoke the Nsmf_PDUSession_UpdateSMContext request, for example, if the AMF 155, 255 already has an association with an SMF 160, 260 for the PDU session ID provided by the wireless device 100, 200 (e.g., if the request type indicates an existing PDU session). The AMF ID may be the wireless device's GUAMI, which may uniquely indicate (e.g., identify) the AMF 155, 255 serving the wireless device 100, 200. The AMF 155, 255 may forward the PDU session ID with the N1 SM container containing the PDU session establishment request received from the wireless device 100, 200. The AMF 155, 255 may provide the PEI instead of the SUPI. The AMF 155, 255 may provide the PEI instead of the SUPI, for example, if the wireless device 100, 200 has registered for emergency services without providing the SUPI. The AMF 155, 255 may indicate that the SUPI has not been authenticated. The AMF 155, 255 may indicate that the SUPI has not been authenticated, for example, if the wireless device 100, 200 has registered for emergency services and has not been authenticated.

The SMF 160, 260 may perform registration and subscription retrieval and update 1225 with the UDM 140, 240. The SMF 160, 260 may retrieve the subscription data. The SMF 160, 260 may subscribe to be notified, for example, if subscription data is modified. The SMF 160, 260 may retrieve the subscription data (and subscribe to be notified if subscription data is modified), for example, if the request type indicates neither emergency request nor existing emergency PDU session, if the SMF 160, 260 is not yet registered, and/or if the subscription data is not (or may not be) available. The SMF 160, 260 may determine that the request may be due to a handover between 3GPP access and non-3GPP access or due to a handover from EPS. The SMF 160, 260 may determine that the request may be due to a handover between 3GPP access and non-3GPP access, or due to a handover from the EPS, for example, if the request type indicates an existing PDU session or an existing emergency PDU session. The SMF 160, 260 may indicate (e.g., identify) the existing PDU session based on the PDU session ID. The SMF 160, 260 may not create a new SM context. The SMF 160, 260 may instead update the existing SM context and/or provide the representation of the updated SM context to the AMF 155, 255 in the response. The SMF 160, 260 may indicate (e.g., identify) the existing PDU session to be released. The SMF 160, 260 may indicate (e.g., identify) the existing PDU session to be released, for example, based on the old PDU session ID, if the request type is an initial request, and/or if the old PDU session ID may be included in the Nsmf_PDUSession_CreateSMContext request.

The SMF 160, 260 may send, to the AMF 155, 255, a N11 message response 1220. The N11 response message 1220 may comprise, for example, a PDU session create/update response, a Nsmf_PDUSession_CreateSMContext response (cause, SM context ID or N1 SM container (PDU session reject(cause)), or an Nsmf_PDUSession_UpdateSMContext response. The SMF 160, 260 may select a UPF 110. The SMF 160, 260 may trigger a PDU session establishment authentication/authorization 1230. The SMF 160, 260 may select a UPF 110 (and may trigger the PDU session establishment authentication/authorization 1230), for example, if the SMF 160, 260 performs secondary authorization/authentication, for example, during the establishment of the PDU session by the DN 115 (e.g., DN-AAA server).

The SMF 160, 260 may select an SSC mode for the PDU session. The SMF 160, 260 may select an SSC mode for the PDU session, for example, if the request type indicates an initial request. The SMF 160, 260 may select one or more UPFs as needed. The SMF 160, 260 may allocate an IP address/prefix for the PDU session. The SMF 160, 260 may allocate the IP address/prefix for the PDU session, for example, based on the PDU type (e.g., IPv4 or IPv6). The SMF 160, 260 may allocate an interface identifier to the wireless device 100, 200 for the wireless device 100, 200. The SMF 160, 260 may allocate an interface identifier to the wireless device 100, 200 for the wireless device 100, 200, for example, to build its link-local address if the PDU type is IPv6. The SMF 160, 260 may allocate an IPv6 prefix for the PDU session and N6 point-to-point tunneling (based on UDP/IPv6). The SMF 160, 260 may allocate an IPv6 prefix for the PDU session and N6 point-to-point tunneling, for example, if the PDU type is unstructured.

The SMF 160, 260 may perform PCF selection 1235. The SMF 160, 260 may perform PCF selection 1235, for example, if dynamic PCC is deployed. The SMF 160, 260 may use the PCF 135, 235 already selected for the PDU session. The SMF 160, 260 may use the PCF 135, 235 already selected for the PDU session, for example, if the request type indicates an existing PDU session or an existing emergency PDU session. The SMF 160, 260 may use local policy. The SMF 160, 260 may use local policy, for example, if dynamic PCC is not deployed.

The SMF 160, 260 may perform a session management policy establishment procedure 1240. The SMF 160, 260 may perform the session management policy establishment procedure 1240, for example, to establish a PDU session with the PCF 135, 235. The session management policy establishment procedure 1240 may receive/retrieve, for example, the default PCC Rules for the PDU session from the UDM 140, 240. The GPSI, may be included, if available, at the SMF 160, 260. The SMF 160, 260 may notify an event previously subscribed to by the PCF 135, 235 with a session management policy modification procedure. The PCF 135, 235 may update policy information in the SMF 160, 260. The PCF 135, 235 may update policy information in the SMF 160, 260, for example, if the request type in the N11 message 1215 indicates an existing PDU session. The PCF 135, 235 may provide authorized session-AMBR, the authorized 5QI, and/or ARP to the SMF 160, 260. The PCF 135, 235 may subscribe to the IP allocation/release event in the SMF 160, 260 (and/or may subscribe to other events). The PCF 135, 235 may set the ARP of the PCC rules to a value that may be reserved for emergency services, for example, based on the emergency DNN.

The SMF 160, 260 may select an SSC mode for the PDU session. The SMF 160, 260 may select an SSC mode for the PDU session, for example, if the request type in the N11 message 1215 indicates an initial request. The SMF 160, 260 may, for example, select, during UPF selection 1245, one or more UPFs as needed. The SMF 160, 260, for example, may allocate an IP address/prefix for the PDU session for PDU type IPv4 or IPv6. The SMF 160, 260 may allocate an interface identifier to the wireless device 100, 200. The SMF 160, 260 may allocate an interface identifier to the wireless device 100, 200, for example, for the wireless device 100, 200 to build its link-local address for PDU type IPv6. The SMF 160, 260 may allocate an IPv6 prefix for the PDU session and N6 point-to-point tunneling (e.g., based on UDP/IPv6) for an unstructured PDU type. A MAC and an IP address may not be allocated, for example, by the SMF 160, 260, to the wireless device 100, 200, for the PDU session for an Ethernet PDU type PDU session.

The SMF 160, 260 may maintain the same IP address/prefix that may be allocated to the wireless device 100 in the source network. The SMF 160, 260 may maintain the same IP address/prefix that may be allocated to the wireless device 100 in the source network, for example, if the request type in the N11 message 1215 is an existing PDU session. The SMF 160, 260 may maintain the SSC mode of the PDU session (e.g., the current PDU session Anchor and IP address). The SMF 160, 260 may maintain the SSC mode of the PDU session, for example, if the request type in the N11 message 1215 indicates an existing PDU session referring to an existing PDU session moved between 3GPP access and non-3GPP access. The SMF 160, 260 may trigger new intermediate UPF insertion or allocation of a new UPF 110. The SMF 160 may select the UPF 110, 210 and/or select SSC mode 1, for example, if the request type indicates emergency request.

The SMF 160, 260 may perform a session management policy modification procedure 1250. The SMF 160, 260 may perform a session management policy modification procedure 1250, for example, to report an event to the PCF 135, 235 that has previously subscribed. The SMF 160, 260 may send to the PCF 135, 235 (that may have been previously subscribed) an indication/notification of the allocated wireless device IP address/prefix. The SMF 160, 260 may send to the PCF 135, 235 (that has previously subscribed) an indication/notification of the allocated wireless device IP address/prefix, for example, if the request type is an initial request, if dynamic PCC is deployed, and if the PDU type is IPv4 or IPv6. The PCF 135, 235 may provide one or more updated policies to the SMF 160, 260. The PCF 135 may provide authorized session-AMBR, the authorized 5QI, and/or the ARP to the SMF 160, 260.

The SMF 160, 260 may initiate an N4 session establishment/modification procedure 1255 with the selected UPF 110, 210. The SMF 160, 260 may initiate an N4 session establishment/modification procedure 1255, for example, if the request type indicates an initial request. The N4 session establishment procedure 1255 may comprise an N4 establishment/modification request and/or an N4 establishment/modification response. The SMF 160, 260 may initiate the N4 session modification procedure 1255. The SMF 160, 260 may initiate the N4 session modification procedure 1255, for example, with the selected UPF 110, 210. The SMF 160, 260 may send an N4 session establishment/modification request to the UPF 110, 210, for example, for the PDU session. The SMF 160, 260 may provide packet detection, enforcement, reporting rules, and/or the like to be installed on the UPF 110, 210, for example, for the PDU session. The CN tunnel information may be provided to the UPF 110, 210. The CN tunnel information may be provided to the UPF 110, 210, for example, if the CN tunnel information is allocated by the SMF 160, 260. The SMF 160, 260 may determine an inactivity timer and/or may provide the inactivity timer to the UPF 110, 210. The SMF 160, 260 may determine the inactivity timer and/or may provide the inactivity timer to the UPF 110, 210, for example, if selective user plane deactivation is required for the PDU session. The UPF 110, 210 may acknowledge the inactivity timer. The UPF 110, 210 may acknowledge the inactivity timer, for example, by sending an N4 session establishment/modification response. CN tunnel information may be provided to SMF 160, 260. CN tunnel information may be provided to SMF 160, 260, for example, if CN tunnel information is allocated by the UPF. The SMF 160, 260 may initiate the N4 session establishment/modification procedure 1255 with each UPF 110, 210 of the PDU session. The SMF 160, 260 may initiate the N4 session establishment/modification procedure 1255 with one or more (or each) UPF 110, 210 of the PDU session, for example, if multiple UPFs are selected for the PDU session.

As shown in FIG. 13, the SMF 160, 260 may send, to the AMF 155, 255, an Namf_Communication_N1N2Message-Transfer 1305 message. The Namf_Communication_N1N2-MessageTransfer message 1305, for example, may comprise the PDU session ID, access type, N2 SM information (PDU session ID, QFI(s), QoS profile(s), CN tunnel info, S-NS-SAI, session-AMBR, PDU session type, and/or the like), and N1 SM container (PDU session establishment accept (QoS Rule(s), selected SSC mode, S-NSSAI, allocated IPv4 address, interface identifier, session-AMBR, selected PDU session type, and/or the like)). The CN tunnel information may comprise tunnel information for the UPF 110, 210 that terminates N3, for example, if multiple UPFs are used for the PDU session. The N2 SM information may carry information that the AMF 155, 255 may forward to the RAN 105, 205 (e.g., the CN tunnel information corresponding to the core network address of the N3 tunnel corresponding to the PDU session; one or multiple QoS profiles and the corresponding QFIs may be provided to the RAN 105; the PDU session ID may be used by AN signaling with the wireless device 100, 200 to indicate to the wireless device 100, 200 the association between AN resources and a PDU session for the wireless device 100, 200; and/or the like). A PDU session may be associated to an S-NSSAI and a DNN. The N1 SM container may comprise the PDU session establishment accept. The AMF 155, 255 may provide the PDU session establishment accept to the wireless device 100, 200. Multiple QoS rules and/or QoS profiles may be included within the N1 SM and in the N2 SM information and/or in the PDU session establishment accept. The Namf_Communication_N1N2MessageTransfer 1305 may comprise the PDU session ID and/or information allowing the AMF 155, 255 to know which access to use for the wireless device.

The AMF 155, 255 may send, to the RAN 105, 205, an N2 PDU session request 1310. The N2 PDU session request 1310 may comprise N2 SM information, NAS message (e.g., PDU session ID, N1 SM container (PDU session establishment accept, and/or the like)). The AMF 155, 255 may send a NAS message. The NAS message may comprise the PDU session ID, the PDU session establishment accept targeted to the wireless device 100, 200, and the N2 SM information received from the SMF 160, 260 within the N2 PDU session request 1310 to the RAN 105, 205.

The RAN 105, 205 may issue an AN specific signaling exchange 1315 (e.g., AN specific resource setup) with the wireless device 100, 200. The RAN 105, 205 may issue an AN specific signaling exchange 1315 (e.g., AN specific resource setup) with the wireless device 100, 200, for example, that may be related to the information received from the SMF 160, 260. An RRC connection reconfiguration procedure may be performed by the wireless device 100, 200 and the RAN 105, 205. The RRC connection reconfiguration procedure may be performed, for example, to establish the necessary RAN 105, 205 resources related to the QoS Rules for the N2 PDU session request 1310 for a RAN 105, 205 (e.g., 3GPP RAN). The RAN 105, 205 may allocate RAN N3 tunnel information for the PDU session. The master RAN 105, 205 node may assign some (e.g., zero or more) QFIs to be setup to a master RAN 105, 205 node. The master RAN 105, 205 node may assign one or more other QFIs to a secondary RAN 105, 205 node, for example, for dual connectivity. The AN tunnel information may comprise a tunnel endpoint for each involved RAN 105, 205 node and the QFIs assigned to each tunnel endpoint. A QFI may be assigned to either the master RAN 105, 205 node or the secondary RAN 105, 205 node. The RAN 105, 205 may send/forward the N2 PDU Session Request 1310 (e.g., NAS message, PDU session ID and N1 SM container (PDU session establishment accept)), for example, to the wireless device 100, 200. The RAN 105, 205 may send/provide the NAS message to the wireless device 100, 200. The RAN 105, 205 may send/provide the NAS message to the wireless device 100, 200, for example, if the necessary RAN 105, 205 resources are established and if the allocation of RAN 105, 205 tunnel information is successful.

The N2 PDU session response 1320 (e.g., N2 PDU Session Request ACK) may comprise a PDU session ID, cause, N2 SM information (e.g., PDU session ID, AN tunnel info, and list of accepted/rejected QFI(s)), and/or the like. The AN tunnel information may correspond to the access network address of the N3 tunnel corresponding to the PDU session. The wireless device 100, 200 may send first uplink data to the UPF 110, 210.

The AMF 155, 255 may forward the N2 SM information received from RAN 105, 205, to the SMF 160, 260, via a Nsmf_PDUSession_UpdateSMContext request 1330. The Nsmf_PDUSession_UpdateSMContext request 1330, may comprise N2 SM information, request type, and/or the like. The SMF 160, 260 may release the rejected QFI associated QoS profiles. The SMF 160, 260 may release the rejected QFI associated QoS profiles, for example, if the list of rejected QFI(s) is included in N2 SM information.

The SMF 160, 260 may initiate an N4 session modification procedure 1335 with the UPF 110, 210. The N4 session modification procedure 1335 may comprise an N4 session modification request and/or an N4 session modification response. The N4 session modification request may be sent, from the SMF 160, 260, to the UPF 110, 210. The N4 session modification response may be sent, from the UPF 110, 210, to the SMF 160, 260. The SMF 160, 260 may provide AN tunnel information and/or the corresponding forwarding rules to the UPF 110, 210. The UPF 110, 210 may provide an N4 session modification response 1335 to the SMF 160, 260.

The SMF 160, 260 may send, to the AMF 155, 255, an Nsmf_PDUSession_UpdateSMContext response message 1340 (e.g., cause message). The SMF 160, 260 may subscribe to the wireless device 100, 200 mobility event notification, from the AMF 155, 255 (e.g., location reporting and wireless device 100, 200 moving into or out of area of interest), by invoking an Namf_EventExposure_Subscribe service operation. The SMF 160, 260 may subscribe, for LADN, to the wireless device 100, 200 moving into or out of LADN service area event notification. The SMF 160, 260 may subscribe, for LADN, to the wireless device 100, 200 moving into or out of LADN service area event notification, for example, by providing the LADN DNN as an indicator for the area of interest. The AMF 155, 255 may forward relevant subscribed to events to the SMF 160, 260.

The SMF 160, 260 may send, to the AMF 155, 255, an Nsmf_PDUSession_SMContextStatusNotify message 1345 (e.g., release message). The SMF 160, 260 may inform the AMF 155, 255, that the PDU session establishment is not successful. The SMF 160, 260 may inform the AMF 155, 255, that the PDU session establishment is not successful, for example, by invoking Nsmf_PDUSession_SMContext-StatusNotify 1345. The SMF 160, 260 may release N4 session(s) created, PDU session addresses if allocated (e.g., IP address), and association with the PCF 135, 235. The SMF 160, 260 may generate an IPv6 router advertisement 1350 (e.g., IPv6 router configuration), for PDU type IPv6. The SMF 160, 260 may send the IPv6 router advertisement 1350 to the wireless device 100, 200 via N4 and/or the UPF 110, 210. The UPF 110, 210 may send first downlink data 1355 to the wireless device 100, 200.

The SMF 160, 260 may unsubscribe 1360 (e.g., deregister) from the modification of session management subscription data. The SMF 160, 260 may unsubscribe 1360 (e.g., deregister) from the modification of session management subscription data, for example, for the corresponding SUPI, DNN, and/or S-NSSAI, if the PDU session is not established. The SMF 160, 260 may unsubscribe 1360, for example, by using Nudm_SDM_Unsubscribe (SUPI, DNN, S-NSSAI), if the SMF 160, 260 is not handling a PDU session of the wireless device 100, 200 for the SUPI, DNN, and/or S-NSSAI. The SMF 160, 260 may deregister 1360, from a PDU session. The SMF 160, 260 may deregister 1360, from a PDU session, for example, if the PDU session is not established by using Nudm_UECM_Deregistration, for the SUPI, DNN, and/or PDU session ID.

A wireless device may operate in one or more states. The wireless device may be managed/controlled/instructed/etc. by another device. The device that may manage the wireless device may be determined, for example, based on the state of the wireless device. For example, for a wireless device in an RRC-IDLE state, a core network (e.g., AMF) may manage the mobility of the wireless device, such as using CN paging, a registration procedure, and/or releasing RRC security. For a wireless device in an RRC-Inactive stage, a RAN device (e.g., a base station, gNB, etc.) may manage the mobility of the wireless device, such as using RAN paging, RAN area updates, and/or maintaining RRC security. Releasing and/or resuming an RRC connection of a wireless device in the RRC-Inactive state (e.g., transitioning the wireless device into and/or out of the RRC-Inactive state) may be inefficient, waste radio resources, and/or cause delay, for example, which may be due to paging procedures (e.g., CN paging, RAN paging, etc.) between: the CN or RAN; and the wireless device. Methods, apparatuses, and systems described herein achieve advantages for transitioning a wireless device into (e.g., resuming operation) and/or out of (e.g., releasing operation) the RRC-Inactive state via communications that provide efficiencies over paging procedures.

A network node (e.g., a common network node, an access and mobility management function (AMF), mobility management entity (MME), etc.) may assist in a release operation of a wireless device for a first access technology (e.g., 3GPP network) using a connection established via a second access technology (e.g., non-3GPP network, wireless LAN, CDMA, or any other access technology) with the wireless device. A wireless device may register, to the network node, via one or more (e.g., multiple) base stations of different access technologies. The wireless device may register with the network node via a 3GPP access technology (e.g. LTE, 5G-NR, and/or any other 3GPP access technology) and via a non-3GPP access technology (e.g., wireless LAN, WiFi, etc.).

Release processes for a wireless device in an RRC-INACTIVE state, in at least some systems, may require RAN paging of the wireless device. RAN paging may be used, for example, even if the wireless device is connected via a second access technology. RAN paging may not be an efficient use of resources for the resume process. For example, the base station may already know the state (e.g., RRC-INACTIVE, RRC-IDLE, etc.) of a wireless device, but an AMF may not know the state of the wireless device (e.g., the AMF may be unaware that the wireless device is in RRC-IDLE state). The AMF may be unable to message the wireless device, for example, if it does not know the state of the wireless device. In such systems, a CN may not receive an indication that a wireless device is in a specific RRC state. Additional messaging to the CN to indicate the RRC state of a wireless device may be performed, but may require additional overhead. Messaging the CN to indicate the RRC state of a wireless device, however, may enable wireless device resume procedures without paging. A reduction in paging may provide a reduction of resources necessary to perform resume procedures, and/or may provide power savings over existing technologies that may use inefficient paging (e.g., RAN paging, CN paging, etc.). The improvements described herein may provide resource conservation, faster transition into and out of inactive RRC states (e.g., RRC-INACTIVE state), and/or faster release of an inactive wireless device.

FIG. 14A shows example network connectivity associated with modifying PDU sessions (e.g., before modification of a single-access PDU session (via a first access network) to support a multi-access PDU session using/via a second access network). A wireless device and/or a system (e.g., wireless system, core network, etc.) may support a single-access PDU session using/via a first access network. The wireless device 100 may be communicating with a system (e.g., wireless system, core network, etc.) via a 3GPP access network 1402, (e.g., a 5G wireless connection, 4G wireless connection, or any other wireless technology). The core nework may comprise an AMF 155, UPF1 110, SMF 160 and/or UPF (PSA) 110-3. The UPF(PSA) 110-3 may provide a connection to a data network 115. The wireless device may indicate to the AMF, radio capability information indicating multi-access PDU support as part of a registration procedure. The system (e.g., wireless system, core network, SMF 160 of the core network) may determine to modify the single-access PDU session to a multi-access PDU session using/via the first access network and/or a second access network. The system (e.g., wireless system, core network, etc.) may verify that the second access network is supported by the wireless device. The SMF 160 may send, to the AMF 155, a request to verify that the second access network is supported by the wireless device.

A core network (e.g., an SMF of a core network) may determine/assume that a second access network is available for a multi-access PDU session. The network may initiate multiple access PDU sessions, however, a wireless device may not be within the coverage and/or in the coverage area of a second access network. This request without feedback may result in undetermined wireless device action and may cause an interworking problem.

A session modification command may be sent (e.g., by a core network) to request to the wireless device to modify the single-access PDU session to a multi-access PDU session using/via a second access network. A wireless device may determine availability of the requested second access network. The wireless device may indicate whether the multiple access PDU session is supported/available/possible, for example, based on the availability of the second access network. The wireless device may indicate (e.g., to the core network and/or via the second access network) that the wireless device is within the coverage and/or in the coverage area of the second access network and/or has multi-access PDU session capability, for example, based on being within the coverage and/or in the coverage area of the second access network. The wireless device may respond to the core network with an indication (e.g., cause value) indicating no radio coverage and/or no multi-access PDU session capability, for example, based on no availability of the second access network. The core network (e.g., SMF) may stop/terminate modifying the single-access PDU session to a multi-access PDU session using a second access network, for example, based on the response (e.g. the wireless device lacks sufficient radio coverage for the second access network).

A wireless device may initiate a single-access PDU session with indication of multi-access PDU session capability. A network may determine to initiate a multi-access PDU session, for example, based on or at the time of the request. The initiation of a multi-access PDU session may establish either single-access or multi-access PDU, for example, based on or at the time of request from the wireless device.

A wireless device may register with a core network, for example, to communicate via a first access network. The wireless device may include and/or indicate radio capability information as part of the registration procedure. The radio capability information may indicate multi-access packet data unit (PDU) session capability. The wireless device may establish a single-access PDU session with a core network. The core network may send a session modification command to request the wireless device to modify the single-access PDU session to a multi-access PDU session.

The core network may determine to modify the single-access PDU session to a multi-access PDU session, for example, based on triggers. The core network may determine that PDU sessions are overloaded in a first access network. The core network may use multi-access PDU sessions to balance a load from wireless devices. The core network may reduce cost to a user, for example, by pushing data to another access network (e.g., moving traffic from cellular to WiFi, moving from a more expensive network to a less expensive network). The core network may improve user experience by using a second access network with better quality and/or more available services. A wireless device may benefit by keeping/maintaining PDU services, for example, even if access to an access network is terminated and/or unavailable.

The SMF 160 may send, to a wireless device via existing access network, a request for determining radio coverage of a second access network. The wireless device 100 may respond, to the SMF 160 via the first access network 1402, indicating that the wireless device is within the coverage and/or in the coverage area of the second access network 1404. The wireless device 100 may determine whether the wireless device has registered with the second access network 1404. The wireless device 100 may initiate registration with the second access network 1404, for example, based on the wireless device determining that the wireless device lacks registration. The wireless device 100 may add a non-3GPP access network 1404 (e.g., Wi-Fi, Bluetooth, etc.) and/or split, switch, and/or steer traffic between a 3GPP access network 1402 and/or a non-3GPP access network 1404, as shown in FIG. 14B.

The wireless device 100 may not be within the coverage and/or in the coverage area of the second access network. The wireless device 100 may respond to the SMF with an indication (e.g., cause value) indicating no radio coverage. The SMF may stop/terminate an attempt to modify an existing single-access PDU session to a multi-access PDU session.

The radio capability message may be part of a registration procedure. The radio capability message may include an indication of multi-access PDU session support. The message may include a new field. The message may use a bit (e.g., a reserved bit) to indicate multi-access PDU session support. The wireless device may respond to a request to a wireless device for determining radio coverage of a second access network via an existing access network. The wireless device may respond using one or more fields including power preference, power status, link quality, power requirements, in coverage, etc.

FIG. 14B shows example network connectivity associated with modifying PDU sessions (e.g., after modification of a single-access PDU session (e.g., using/via a first access network) to support a multi-access PDU session (e.g., using/via a second access network)). A wireless device and/or a system (e.g., wireless system, core network, etc.) may support a multi-access PDU session using/via/adding a second access network. The wireless device 100 may be communicating with a system (e.g., wireless system, core network, etc.) via a 3GPP access network 1402 (e.g., a 5G wireless connection, 4G wireless connection, or any other wireless technology). The core nework may comprise an AMF 155, UPF1 110, SMF 160 and/or UPF (PSA) 110-3. The UPF(PSA) 110-3 may provide a connection to a data network 115. The wireless device 100 may communicate, via a non-3GPP access network 1404 during a multi-access PDU session, with a system (e.g., wireless system, core network, etc.).

Figure 15A:
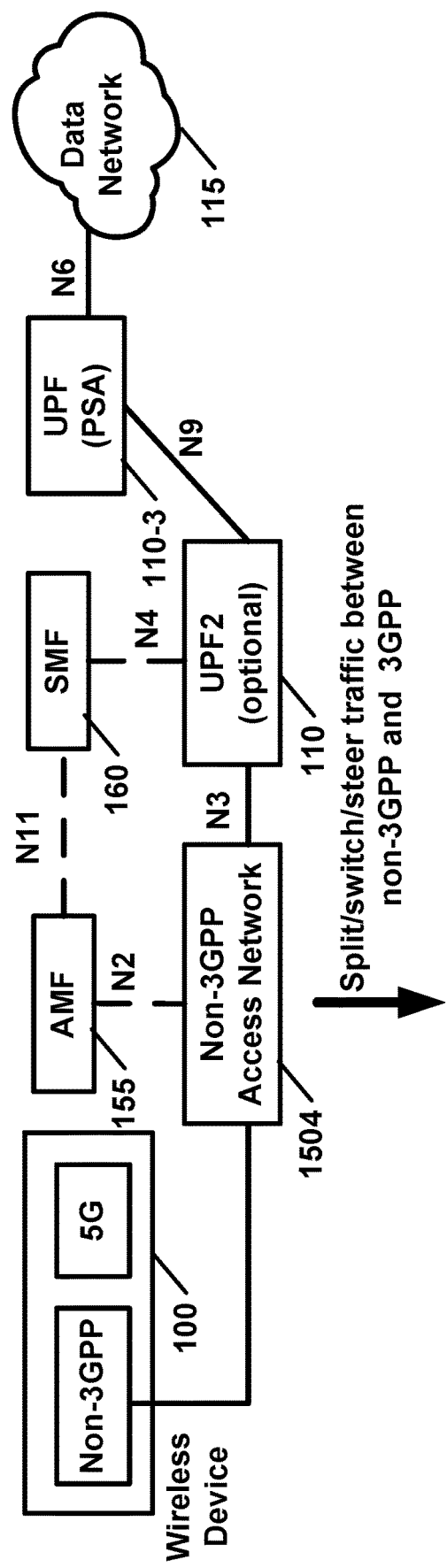
FIG. 15A and FIG. 15B show example network connectivity associated with modifying PDU sessions.

FIG. 15A shows example network connectivity associated with modifying PDU sessions (e.g., before modification of a single-access PDU session (e.g., via a second access network) to support a multi-access PDU session (e.g., using/via a first access network)). A wireless device and/or a system (e.g., wireless system, core network, etc.) may support a single-access PDU session using/via a second access network.

The wireless device 100 may communicate, for example, via a non-3GPP access network 1502, with a system (e.g., wireless system, core network, etc.) using/via a non-3GPP access network connection (e.g. Wi-Fi, Bluetooth, etc.). The core nework may comprise an AMF 155, UPF2 110, SMF 160 and/or UPF (PSA) 110-3. The UPF(PSA) 110-3 may provide a connection to a data network 115. The system (e.g., wireless system, core network, SMF 160 of a core network) may determine to modify the single-access PDU session to a multi-access PDU session using/via the first access network and/or the second access network. The system (e.g., wireless system, core network, etc.) may verify that the first access network is supported by the wireless device, for example, based on the SMF 160 sending, to the AMF 155, a request to verify that the first access network is supported by the wireless device.

The SMF 160 may send a request to a wireless device for determining radio coverage of a first access network via existing access network. The wireless device 100 may respond, via the second access network 1504, to the SMF 160, indicating that the wireless device is within the coverage and/or in the coverage area of the first access network 1502. The wireless device 100 may determine whether the wireless device has registered with the first access network 1502. The wireless device 100 may initiate registration with the first access network 1502, for example, based the wireless device determining that it has not registered. The wireless device 100 may add a 3GPP access network 1502 and/or split, switch, and/or steer traffic between a 3GPP access network 1502 and/or a non-3GPP access network 1504, such as shown in FIG. 15B.

The wireless device 100 may not be within the coverage and/or in the coverage area of the second access network. The wireless device 100 may respond to the SMF with an indication (e.g., cause value) indicating no radio coverage. The SMF may stop/terminate an attempt to modify an existing single-access PDU session to a multi-access PDU session.

Figure 15B:
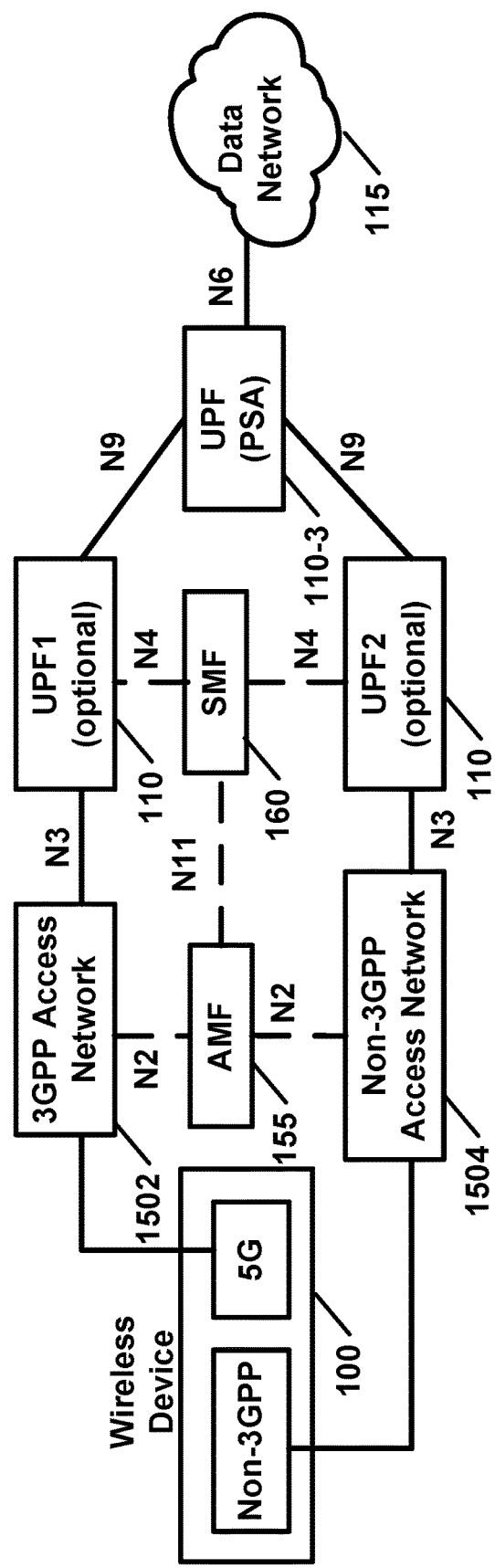

FIG. 15B shows example network connectivity associated with modifying PDU sessions (e.g., after modification of a single-access PDU session (via a first access network) to support a multi-access PDU session (e.g., using/via a first access network)). A wireless device and/or a system (e.g., wireless system, core network, etc.) may support a multi-access PDU session using/via/adding a first access network. The wireless device 100 may be communicating with a system (e.g., wireless system, core network, etc.) via a non-3GPP access network 1502. The core nework may comprise an AMF 155, UPF1 110, SMF 160 and/or UPF (PSA) 110-3. The UPF(PSA) 110-3 may provide a connection to a data network 115. The wireless device 100 may additionally/alternatively communicate, via a 3GPP access network 1502 and/or during a multi-access PDU session, with a system (e.g., wireless system, core network, etc.).

Figure 16:
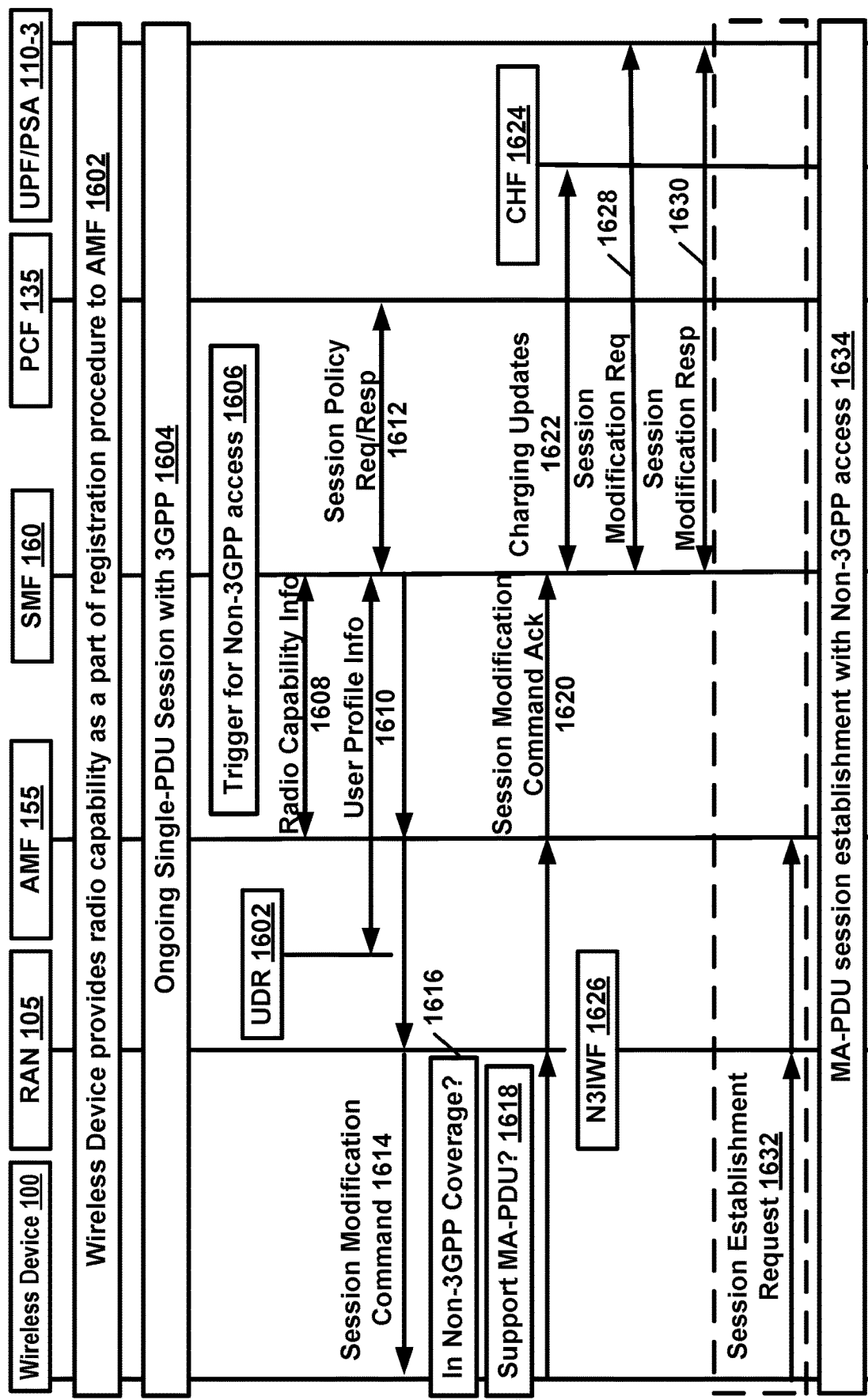
FIG. 16 shows an example call flow associated with modifying PDU sessions.

FIG. 16 shows an example call flow associated with modifying PDU sessions (e.g., modification of a single-access PDU session (e.g., via a first access network) to support a multi-access PDU session (e.g., using/via a second access network)). A wireless device 100 may provide 1602 radio capability to the AMF 155 as part of a registration procedure. An SMF 160 may establish 1604 an ongoing single-PDU session using/via a 3GPP access network. An SMF 160 may determine (e.g., based on receiving a trigger) 1606 to modify an existing single-access PDU session (e.g., using/via a first access network) to a multi-access PDU session (e.g., using/via a second access network). The existing single-access PDU session may be using/via the first access network and/or the second access network. The determination may be based on modification of allowed network slice selection assistance information and/or other parameters.

The SMF 160 may communicate with an AMF 155, for example, based on sending a message and/or invoking an operation via an N11 interface to obtain 1608 radio capability information. The SMF 160 may communicate 1610 with the UDR 1602, for example, based on sending a message and/or invoking an operation (e.g., user profile info, nudr_dm_query request, etc.). The SMF 160 may obtain, from the UDR 1602 subscription information of a user of a wireless device, to verify whether the user is authorized to use a multi-access PDU session. The SMF 160 may communicate 1612 with a PCF, for example, by sending a message and/or invoking an operation via an N7 interface (e.g., session policy request and/or the like). The SMF 160 may obtain, from the PCF, subscription information of a user of a wireless device to verify whether the user is authorized to use a multi-access PDU session. The SMF 160 may send a session modification command. The session modification command may be relayed through the AMF 155 and/or RAN 105 to the wireless device 100 to enable a multi-access PDU session using/via a second access network. The wireless device may determine 1616 whether the wireless device is within the coverage and/or in the coverage area of the non-3GPP access network. The wireless device may determine 1618 whether the wireless device supports the multi-access PDU session. The wireless device may send 1620 a session modification command acknowledge, for example, based on being within the coverage and/or in the coverage area of the non-3GPP access network and/or supporting the multi-access PDU session.

The SMF 160 may send 1622, to a charging function (CHF), a charging update request message requesting modification of charging rules for the second access network. The charging update request message may comprise the session identifier of the single-access PDU session and/or a type of the second access network. The SMF 160 may receive 1622, from the charging function, a charging update response message, for example, based on or in response to sending the charging update request message. The charging update response message may comprise the session identifier of the single-access PDU session and/or at least one charging rule.

The SMF 160 may send, to the user plane function (UPF), a session modification request 1628 message indicating a request to modify single-access PDU session to the multi-access PDU session, comprising at least one traffic rule. The SMF 160 may receive, from the UPF, a session modification response 1630 message indicating a result of the session modification request message. The wireless device may send 1632 a session establishment request to the N3IWF 1626. The N3IWF may communicate the session establishment request to the AMF 155. The wireless device may establish 1634 the multi-access PDU session with the non-3GPP access network.

A determination (e.g., trigger 1606) of modifying the single-access PDU session to the multi-access PDU session may be based on a subscription information of a user of the wireless device stored in the UDR 1602. The SMF may receive 1612, from a PCF 1612, a policy update request (e.g., session policy modification request, session policy update request, npcf_smpolicycontrol_update request, etc.). The SMF may determine to modify the single-access PDU session to the multi-access PDU session, for example, based on the received policy update request. The determination may be based on, for example, a performance measurement information of the existing (e.g., first or serving) access network. The SMF 160 may obtain, from a first access network, a performance measurement information. The SMF 160 may send a request (e.g., get performance report, etc.) to the first access network. The SMF 160 may obtain, from a user plane entity (e.g., user plane function, PDU session anchor, performance function, etc.), performance measurement information. The performance measurement information may comprise jitter, delay, round trip delay, throughput and/or the like.

The SMF 160 may communicate, via an N11 interface, with an AMF 155, for example, by sending a message and/or invoking an operation (e.g., namf_communication_n1n2messagetransfer, radio capability info request, etc.). The SMF 160 may obtain 1608 radio capability information (e.g., information on support of a radio access type of a second access network). The AMF 155 may employ a capability information request (e.g., wireless device capability information message) to verify support of the second access network. The AMF 155 may respond/reply, to the SMF 160, indicating result of the verification of the support of the second access network.

The SMF 160 may communicate 1610 with the UDR 1602, for example, by sending a message and/or invoking an operation (e.g., user profile info, nudr_dm_query request, etc.). The SMF 160 may obtain subscription information of a user of a wireless device to verify whether the user is authorized to use a multi-access PDU session. Values of the user authorization status may be authorized, or not authorized. The user data repository may respond/reply, to the SMF 160, indicating result of the user authorization status. Values of user authorization status may be authorized or not authorized.

The SMF 160 may communicate with a user data management, for example, by sending a message and/or invoking an operation via an N10 interface (e.g., user profile info, user data info, get user data info, nudm_sdm_get, etc.). The SMF 160 may obtain subscription information of a user of a wireless device to verify whether the user is authorized to use a multi-access PDU session. The user data management may respond/reply to the SMF 160 indicating a result of the authorization that may be a value indicating authorized or not authorized.

The SMF 160 may communicate 1612 with a policy control function. The SMF 160 may send a message and/or invoke an operation via an N7 interface (e.g., session policy request etc.) to obtain subscription information of a user of a wireless device. The SMF 160 may verify whether the user is authorized to use a multi-access PDU session. The policy control function may respond (e.g., reply with a session policy response, etc. etc.) to the SMF 160 indicating a result of the authorization which may be a value indicating authorized or not authorized. The policy function may provide at least one ATSSS rule in the reply to the SMF 160, for example, based on the user of the wireless device being authorized to use the multi-access PDU session.

The SMF 160 may communicate with an AMF 155, for example, by sending a message and/or invoking an operation via an N11 interface (e.g., check registration status request etc.). The SMF 160 may verify whether a wireless device is registered with a second access network. The SMF 160 may communicate with a user data management (nudm_sdm_info etc.), for example, by sending a message and/or invoking an operation via an N10 interface (e.g., check registration status request etc.). The SMF 160 may verify whether a wireless device is registered with a second access network. The SMF 160 may communicate with the UDR (e.g., check registration status request etc.), for example, by sending a message and/or invoking an operation interface. The SMF 160 may verify whether a wireless device is registered with a second access network. The SMF 160 may receive a response of the check registration status request from the AMF 155, UDM, and/or UDR indicating the status of the registration of the wireless device with a second access network.

The SMF 160 may send 1614, to a wireless device, a request (e.g., a non-access stratum (NAS) PDU which may be a namf_communication_n1n2messagetransfer request, etc.) for determining radio coverage of a second access network via existing access network (e.g., the first access network and/or the second access network). The wireless device may respond 1620, to the SMF 160 via the first access network, indicating that the wireless device is within the coverage and/or in the coverage area of the second access network. The wireless device may determine whether the wireless device has registered with the second access network. The wireless device may initiate registration with the second access network, for example, based on the wireless device determining registration with the second access network does not exist. The wireless device may respond 1620, to the SMF 160, with an indication (e.g., cause value) indicating no radio coverage, for example, based on the wireless device not being within the coverage and/or in the coverage area of the second access network. The SMF 160 may terminate an attempt to modify an existing single-access PDU session to a multi-access PDU session.

The SMF 160 may send 1612, to the PCF, a policy update request (e.g., session policy modification request, session policy update request, npcf_smpolicycontrol_update request, etc.). The SMF may request the PCF to modify an existing policy rule for supporting a multi-access PDU session. The request may comprise a session identifier of a single-access PDU session and/or a type of a second access network. The PCF may communicate with an AMF 155, for example, by sending a message and/or invoking an operation via an N15 interface requesting the AMF to send at least one modified policy (URSP) rule to the wireless device. The AMF 155 may forward, to the wireless device via an N1 interface (e.g, within a new or existing NAS PDU), the request with the policy rule received from the policy control function.

The PCF may communicate with an AMF 155 by sending a message and/or invoking an operation via an N15 interface. The PCF may request the AMF to send at least one modified policy/rule (e.g., URSP rule) to the wireless device. The PCF may initiate modifying an existing single-access PDU session to a multi-access PDU session using/via a second access network. The AMF 155 may forward, to the wireless device via an N1 interface within a new or existing NAS PDU, the request with the policy rule received from the policy control function.

The SMF 160 may send 1614, to a wireless device, a session modification command message (e.g., NAS PDU, namf_communication_n1n2messagetransfer, etc.) requesting the wireless device to modify an existing single-access PDU session to a multi-access PDU session using/via a second access network. The SMF 160, may send, to the wireless device, the request using/via a first access network via an AMF 155. The session modification command message may comprise an access type of the second access network, an identifier of the single-access PDU session and/or at least one traffic rule for steering, switching, and/or splitting traffic via the multi-access PDU session.

The SMF 160 may send 1614, to an AMF 155, a session modification command message. The AMF 155 may send/forward, to a first access network, the session modification command message. The first access network may send/forward) 1614, to a wireless device, the session modification command message.

The SMF 160 may send, via an existing (e.g., a first) access network, a separate request for determining radio coverage of a second access network. The SMF 160 may send, to a wireless device and using/via a second access network, a request for determining radio coverage of a second access network with a request to modify an existing single-access PDU session to a multi-access PDU session.

The core network (e.g., an AMF 155, an SMF 160, a UDR 1602, a UDM, etc.) may subscribe to a status of radio coverage of radio access networks supported by the wireless device. The core network may obtain, from a wireless device (e.g., based on wireless device capability information), a list of supported radio access networks stored at the AMF 155. The AMF 155 may receive, from the wireless device, a notification, for example, that an access network is within the coverage and/or in the coverage area of the wireless device. The AMF 155 may receive, from the wireless device, a notification, for example, when an access network is no longer within the coverage and/or in the coverage area of the wireless device. An SMF 160 may obtain, from the AMF 155, status of radio coverage of a second access network, for example, prior to sending 1614 a request (e.g., a session modification request, etc.) to modify an existing single-access PDU session to a multi-access PDU session using/via a second access network.

The wireless device may receive a request (e.g., NAS PDU comprising a session modification request, etc.) requesting the wireless device to provide information of radio coverage of a second access network. The wireless device may receive a request (e.g., NAS PDU) requesting the wireless device to modify an existing single-access PDU session to a multi-access PDU session using/via a second access network. The wireless device may receive a request (e.g., NAS PDU) requesting the wireless device to provide information of radio coverage of a second access network. The wireless device may receive a request (e.g., NAS PDU) for modifying an existing single-access PDU session to a multi-access PDU session using/via a second access network. A request for modifying existing single-access PDU session to a multi-access PDU session may comprise an access type of the second access network, an identifier of the single-access PDU session of the wireless device and/or at least one traffic rule for steering, switching, and/or splitting traffic via the multi-access PDU session. A traffic rule for steering, switching, and/or splitting traffic via the multi-access PDU session may be an access traffic steering, switching, and splitting (ATSSS) rule.

The wireless device may respond/reply, to the system (e.g., wireless system, core network, etc.), with an indication (e.g., a cause value) indicating no radio coverage of a second access network. The wireless device may determine that the wireless device is not within the coverage and/or in the coverage area of a second access network.

The wireless device may determine support for a multi-access PDU session, for example, based on policy rules configured at the wireless device. The wireless device may determine a multi-access PDU session support, for example, based on at least one traffic descriptor pertaining to a route selection policy/rule (e.g., UE route selection policy rule). The wireless device may determine a multi-access PDU session support, for example, based on at least one traffic descriptor pertaining to an ATSSS policy rule. The ATSSS policy rule may be provisioned/configured at the wireless device separately. The route selection policy/rule (e.g., UE route selection policy rule) may comprise one or more ATSSS policy rules.

The wireless device may respond/reply, to the system (e.g., wireless system, core network, etc.), with an indication (e.g., cause value) indicating no multi-access PDU session support, for example, based on a wireless device determining that the wireless device does not support a multi-access PDU session.

The wireless device may respond/reply, to the system (e.g., wireless system, core network, etc.) via a first access network, with a result of a request to modify an existing single-access PDU session to a multi-access PDU session using/via a second access network. The wireless device may determine that the wireless device is within within the coverage and/or in the coverage area of a second access network and/or that the wireless device supports a multi-access PDU session. The wireless device may not send a response to a request to modify an existing single-access PDU session to a multi-access PDU session using/via a second access network. The system (e.g., wireless system, core network, etc.) may determine a result of a request to modify an existing single-access PDU session to a multi-access PDU session using/via a second access network from the wireless device as acceptance. The system (e.g., wireless system, core network, etc.) may receive a request for a registration with the second access network and/or a request for PDU session establishment using/via a second access network.

The wireless device may initiate registration with the second access network, for example, by sending a registration request message (e.g., NAS PDU) from the wireless device to an AMF 155 using/via the second access network. The wireless device may determine that the wireless device is within the coverage and/or in the coverage area of a second access network and/or that the wireless device supports a multi-access PDU session. The wireless device may determine that the wireless device is not registered for a second access network. The wireless device may receive a result of the registration request message (e.g., a registration accept message, etc.) from the system (e.g., wireless system, core network, etc.) via the second access network.

The SMF 160 may receive, from a wireless device, an acceptance of a request (e.g., a session modification command, etc.) to modify an existing single-access PDU session to a multi-access PDU session using/via a second access network. The SMF 160 may receive an acceptance from a wireless device, for example, based on receiving a registration request message to an AMF 155 for a second access network. The SMF 160 may receive an acceptance, for example, based on receiving a session modification command acknowledge message (e.g., NAS PDU, Namf_Communication_N1N2MessageTransfer response operation, etc.) via the first access network. The session modification command acknowledgement message may comprise an indication of support for the multi-access PDU session and/or the identifier of the single-access PDU session of the wireless device.

The wireless device may send session a modification command acknowledgement message (e.g., NAS PDU) to a first access network. The first access network may send (e.g., forward), to the AMF 155, the session modification command acknowledgement message. The AMF 155 may send (e.g., forward), to the SMF 160, the session modification command acknowledgement message.

The wireless device may indicate acceptance, for example, based on sending a PDU session establishment request for the second access network to the system (e.g., wireless system, core network, etc.). The PDU session establishment request may comprise an indicator indicating a request for a multi-access PDU session and/or same session identifier. The PDU session establishment request may comprise an indicator indicating a different session identifier than a session identifier of a single-session PDU established using/via the first access network.

The SMF 160 may send, to a CHF, a charging update request for supporting a multi-access PDU session using/via a second access network. The charging update request may comprise a session identifier of the single-access PDU session and/or a type of the second access network. The SMF 160 may receive, from the CHF, a charging update response message, for example, based on or in response to sending the charging update request message. The charging update response message may comprise the session identifier of the single-access PDU session and/or at least one charging rule.

The SMF 160 may send, via an N4 interface to a UPF, a session modification request (e.g., session update request, N4 session modification request, etc.) The UPF may serve a PDU session via a first-access network. The session modification request may comprise at least one traffic rule for supporting a multi-access PDU session. The SMF 160 may send, via an N4 interface to a UPF, a session establishment request. The UPF may be the same as or different from a UPF serving a PDU session via a first-access network for supporting a multi-access PDU session using/via a second access network. The SMF 160 may provide, to the UPD, at least one traffic rule in the session modification request. The UPD may support a multi-access PDU session to the UPF. The SMF 160 may receive, from the UPF a response of the session modification request indicating a result of a request.

The SMF 160 may initiate a release of a PDU session with a wireless device established using/via a first access network (e.g., an access network to switch from). This release of a PDU session may result in to modifying a multi-access PDU session to a single-PDU session using/via second access network (e.g., an access network to switch to).

Figure 17:
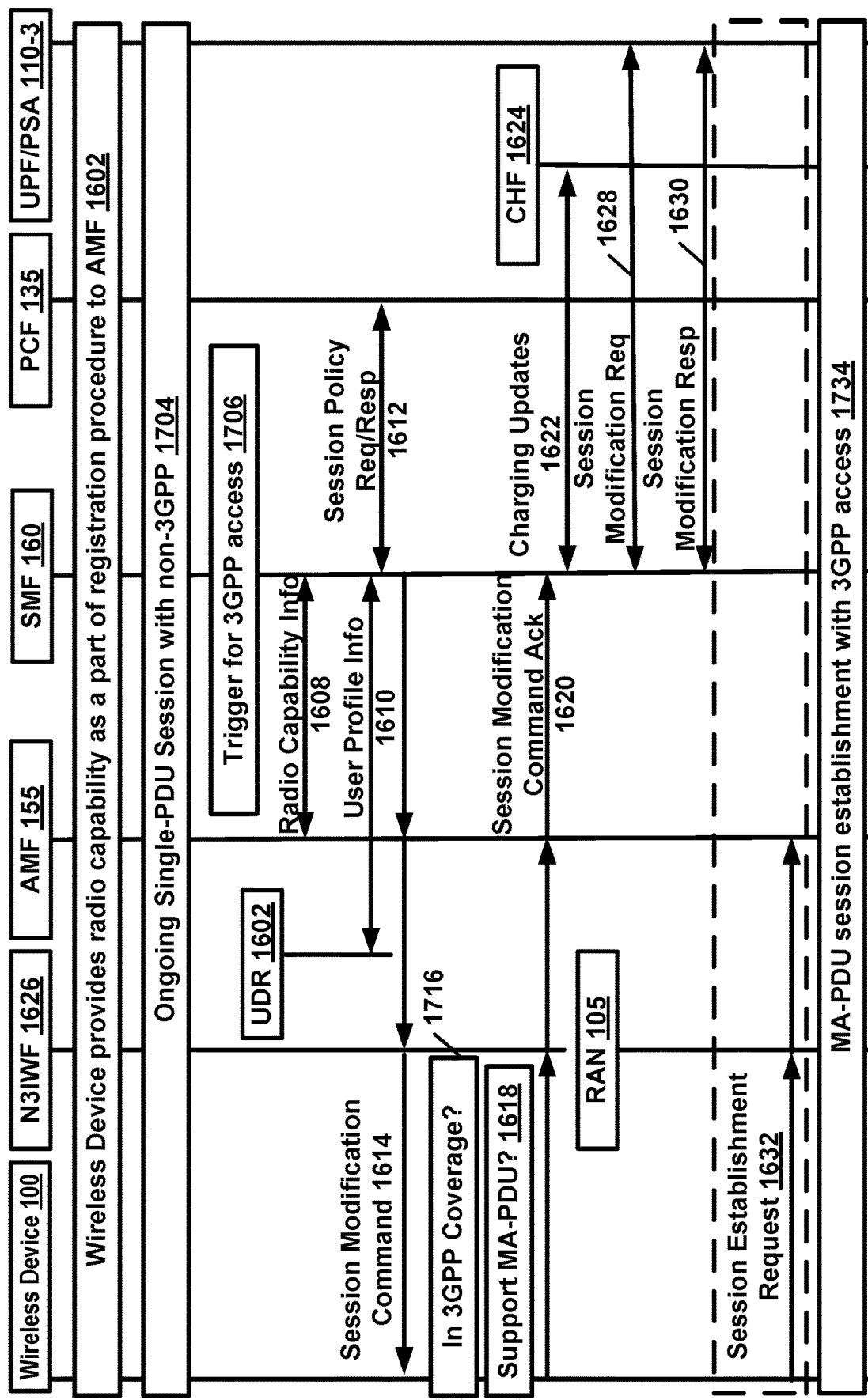
FIG. 17 shows an example call flow associated with modifying PDU sessions.

FIG. 17 shows an example call flow associated with modifying PDU sessions (e.g., for modification of a single-access PDU session (e.g., via a first access network) to support a multi-access PDU session (e.g., using/via a second access network)). A wireless device 100 may provide 1602 an indicator of radio capability of the wireless device (e.g., support for a multi-access PDU session) to the AMF 155 as part of a registration procedure. An SMF 160 may establish 1704 an ongoing single-PDU session using/via a non-3GPP access network. An SMF 160 may determine (e.g., based on receiving a trigger) 1706 to modify an existing single-access PDU session (e.g., which may use a first access network) to a multi-access PDU session using/via a second access network. The existing single-access PDU session may be using/via the first access network and/or the second access network. The determination (e.g., trigger) may be based on a modification of allowed network slice selection assistance information and/or other parameters.

The SMF 160 may communicate with an AMF 155, for example, by sending a message and/or invoking an operation via an N11 interface to obtain 1608 radio capability information. The SMF 160 may communicate 1610, with the UDR 1602, for example, by sending a message and/or invoking an operation (e.g., user profile info, nudr_dm_ query request, etc.). The SMF 160 may obtain subscription information of a user of a wireless device to verify whether the user is authorized to use a multi-access PDU session. The SMF 160 may communicate 1612 with a policy control function and/or any other device/function, for example, by sending a message and/or invoking an operation via an N7 interface (e.g., session policy request and/or the like). The SMF 160 may obtain subscription information of a user of a wireless device to verify whether the user is authorized to use a multi-access PDU session. The SMF 160 may send a session modification command. The session modification command may be relayed/sent through the AMF 155 and/or N3IWF 1626 to the wireless device 100. The session modification command may enable a multi-access PDU session using/via a second access network. The wireless device may determine 1716 whether the wireless device is within the coverage and/or in the coverage area of the 3GPP access network. The wireless device may determine 1618 whether the wireless device supports the multi-access PDU session. The wireless device may send 1620 a session modification command acknowledge, for example, based on being within the coverage and/or in the coverage area of the 3GPP access network and/or supporting the multi-access PDU session.

The SMF 160 may send 1622 to a charging function (CHF), a charging update request message requesting modification of charging rules for the second access network. The charging update request message may comprise the session identifier of the single-access PDU session and/or a type of the second access network. The SMF 160 may receive 1622, from the charging function, a charging update response message, for example, based on or in response to sending the charging update request message. The charging update response message may comprise the session identifier of the single-access PDU session and/or at least one charging rule.

The SMF 160 may send, to the UPF, a session modification request 1628 message indicating a request to modify a single-access PDU session to the multi-access PDU session. The session modification request may comprise at least one traffic rule. The SMF 160 may receive, from the UPF, a session modification response 1630 message indicating a result of the session modification request message. The wireless device may send 1632, to the RAN 105, a session establishment request. The RAN 105 may communicate, to the AMF 155, the session establishment requrest. The wireless device may establish 1734 the multi-access PDU session with the 3GPP access network.

FIG. 18 shows example rules for access traffic steering, switching, and/or splitting. The rules may comprise parameters (e.g., traffic attributes for matching and/or configurations for traffic steering, switching, and/or splitting). The parameters may comprise parameters that define a priority, a traffic descriptor, mode, active network and/or standby network. The wireless device may steer, switch, and/or split traffic among access networks, for example, by applying configurations for a highest priority rule that matches traffic attributes.

An SMF 160 may send 1614 a session modification command message to a wireless device requesting the wireless device to modify an existing single-access PDU session to a multi-access PDU session using/via a second access network. This request from the SMF may be sent to the wireless device using/via a first access network (e.g., via an AMF). The session modification command message may comprise an access type of the second access network, an identifier of the single-access PDU session, and/or at least one traffic rule for steering, switching, and/or splitting traffic via the multi-access PDU session.

Figure 19:
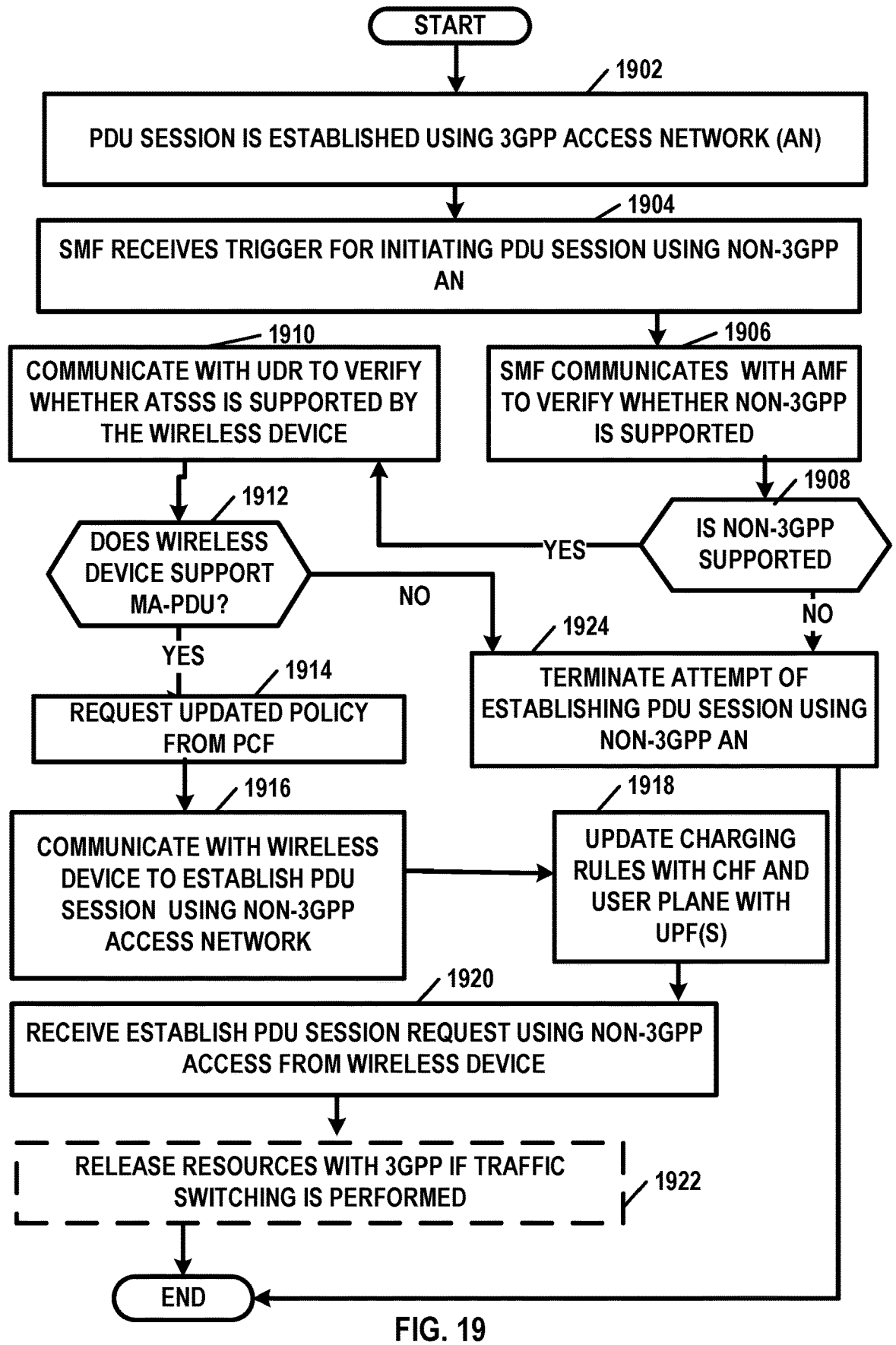
FIG. 19 shows an example method for modification of PDU sessions.

FIG. 19 shows an example method associated with modifying PDU sessions (e.g., for modification of a single-access PDU session (e.g., by a SMF via a first access network) to support a multi-access PDU session (e.g., using/via a second access network)). In step 1902, a PDU session may be established between the system (e.g., wireless system, core network, etc.) and/or the wireless device using/via a 3GPP access network. In step 1904, the SMF may determine (e.g., based on receiving a trigger) to initiate a PDU session using/via a non-3GPP access network. In step 1906, the SMF may communicate, with the AMF, to verify whether the wireless device supports the non-3GPP access network. In step 1908, the SMF may determine that the non-3GPP access network is supported. In step 1910, the SMF may communicate, with the UDR, to verify that at least one traffic rule/policy (e.g., ATSSS) is supported by the wireless device. In step 1912, the SMF may determine that the wireless device supports a multi-access PDU session. In step 1914, the SMF may request an updated policy/rule from the PCF. In step 1916, the system (e.g., wireless system, core network, etc.) may communicate, with the wireless device, to establish a PDU session using/via a non-3GPP access network. In step 1918, the SMF may update the charging rules and/or policies with the CHF and/or with the UPF. In step 1920, the SMF may receive, via a non-3GPP access network from the wireless device, an establish PDU session request. In step 1922, the SMF may release resources with the 3GPP access network, for example, based on traffic switching being peformed.

In step 1908, the SMF may determine that the non-3GPP access network is not supported. In step 1924, the SMF may terminate the attempt of establishing the PDU session using/via the non-3GPP access network. In step 1912, the SMF may determine that the wireless device may not support a multi-access PDU session. In step 1924, the SMF may terminate the attempt of establishing the PDU session using/via the non-3GPP access network.

The determination (e.g., by the SMF) to intitiate a multi-access PDU session may be based on modification of allowed network slice selection assistance information. The determination of modifying the single-access PDU session to the multi-access PDU session may be based on a subscription information of a user of the wireless device stored in a user data repository and/or other storage location/device. The determination may be based on a policy update request (e.g., session policy modification request, session policy update request, npcf_smpolicycontrol_update request, etc.) received from a policy control function. The determination may be based on a performance measurement information of an existing (e.g., first or serving) access network.

The SMF may communicate with an AMF, for example, by sending a message and/or invoking an operation via an N11 interface. The SMF may obtain information for supporting a radio access type of a second access network. The AMF may employ wireless device capability information and/or other information to verify support of the second access network. The AMF may respond/reply to the SMF indicating a result of the verification of the support of the second access network.

The SMF may communicate with a user data repository and/or other storage location/device, for example, by sending a message and/or invoking an operation to obtain subscription information of a user (and/or group of users) of a wireless device. The SMF may verify whether the user(s) and/or the wireless device is/are authorized to use a multi-access PDU session. The user data repository and/or other storage location/device may respond/reply, to the SMF, indicating a result of the authorization.

An SMF may communicate with a user data management and/or other device, for example, by sending a message and/or invoking an operation via an N10 interface to obtain subscription information of a user (and/or group of users) of a wireless device. The SMF may verify whether the user(s) and/or the wireless device is/are authorized to use a multi-access PDU session. The user data management and/or other device may respond/reply, to the SMF, indicating result of the authorization.

An SMF may communicate with a policy control function and/or other device, for example, by sending a message and/or invoking an operation via an N7 interface to obtain subscription information of a user (and/or group of users) of a wireless device. The SMF may verify whether the user(s) and/or wireless device is/are authorized to use a multi-access PDU session. The PCF and/or other device may respond/reply, to the SMF, indicating a result of the authorization. The policy control function and/or other device may provide at least one traffic policy/rule (e.g., ATSSS rule) in the reply to the SMF, for example, based on the user(s) of the wireless device (and/or based on the wireless device) being authorized to use the multi-access PDU session.

The SMF may send a policy update request to a policy control function for modifying an existing single-access PDU session to the multi-access PDU session using/via a second access network. The policy update request may comprise a session identifier of the single-access PDU session and/or a type of the second access network. The policy control function may provide at least one traffic policy/rule (e.g., ATSSS rule) in the reply to the SMF in a policy update response (e.g., session policy modification response, session policy update response, npcf_smpolicy-control_update response, etc.).

The SMF may send a request (e.g., a session modification command message, NAS PDU, etc.), to a wireless device (e.g., via AMF), requesting the wireless device to modify an existing single-access PDU session to a multi-access PDU session using/via a second access network. The SMF may send, via an AMF and/or a first access network, the request to the wireless device in a separate message (e.g., NAS PDU). The SMF may send the request to the wireless device using/via a first access network (e.g., piggybacked, before, after, and/or included in an existing message (e.g., NAS PDU) sent via an AMF). A request for modification of a single-access PDU session to a multi-access PDU session may comprise an access type of the second access network, an identifier of the single-access PDU session of the wireless device, and/or at least one traffic rule for steering, switching, and/or splitting traffic for the multi-access PDU session.

The SMF may receive a response of a request from a wireless device requesting the wireless device to modify an existing single-access PDU session to a multi-access PDU session using/via a second access network from the wireless device. The SMF may not receive, from a wireless device, a response to a request for the wireless device to modify an existing single-access PDU session to a multi-access PDU session using/via a second access network from a wireless device. The SMF may subscribe the wireless device (e.g., based on the registration state of the wireless device) with an AMF. The AMF may receive a registration request message for a second access network from the wireless device. The AMF may provide notification to the SMF handling an existing single-access PDU session using/via the first access network. The AMF may receive a registration request message from the wireless device for a second access network. The SMF may receive a PDU session establishment request via the second access network from the wireless device. The PDU session establishment request may comprise an indicator indicating a request for a multi-access PDU session and/or same session identifier The PDU session establishment request may comprise a session identifier that may be the same as or different from a session identifier of a single-session PDU established using/via a first access network.

The SMF may send, to a CHF, a charging update request for supporting a multi-access PDU session using/via a second access network. The charging update request may comprise a session identifier of the single-access PDU session, a type of the second access network, and/or the like. The SMF may receive, from the CHF, a charging update response message, for example, based on or in response to sending the charging update request message. The charging update response message may comprise the session identifier of the single-access PDU session and/or at least one charging rule.

The SMF may send, to a UPF serving a PDU session via a first-access network, a session modification request via an N4 interface (e.g., session update request, N4 session modification request, etc.). The SMF may send a session establishment request (e.g., session update request, N4 session modification request, etc.) via an N4 interface to a UPF. The UPF may be the same as or different from a UPF serving a PDU session via a first-access network for supporting a multi-access PDU session using/via a second access network. The SMF may provide, to the UPF, at least one traffic rule in the session modification request for supporting a multi-access PDU session to the UPF. The SMF may receive, from the UPF, a response of the session modification request indicating a result of a request.

The SMF may reject a request, from a wireless device, requesting the SMF to modify an existing single-access PDU session to a multi-access PDU session using/via a second access network. The SMF may terminate an attempt of modification of a single-access PDU session to a multi-access PDU session using/via a second access network. The SMF may send, to a PCF, a policy update request (e.g., policy modification request, N7 message, etc.) requesting the PCF to revert the policy rule of the multi-access PDU session to the policy rule of a single-access PDU session (e.g., using/via a first access network).

Figure 20:
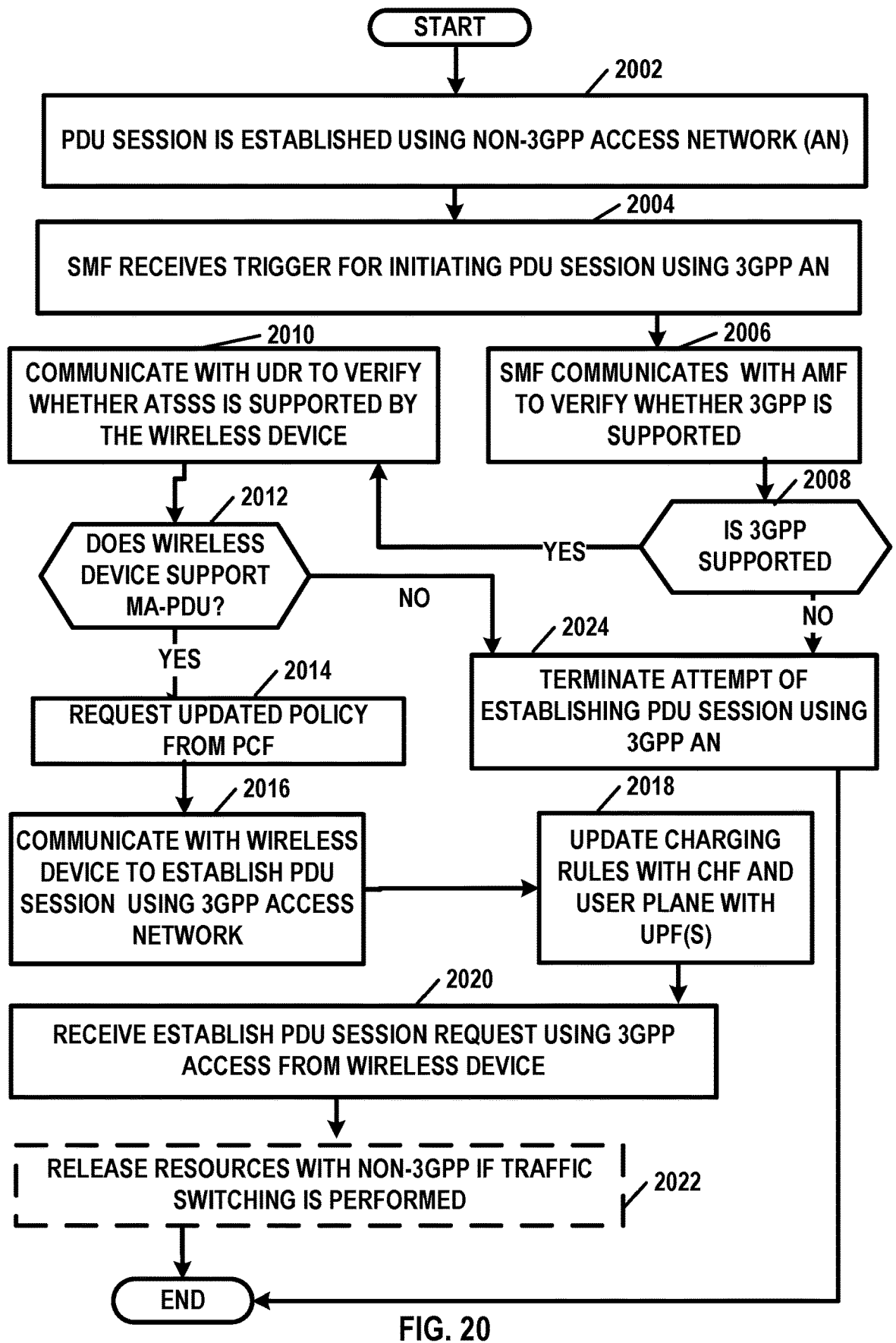
FIG. 20 shows an example method for modification of PDU sessions.

FIG. 20 shows an example method associated with modifying PDU sessions (e.g., for modification of a single-access PDU session (e.g., by a SMF via a first access network) to support a multi-access PDU session (e.g., using/via a second access network)). In step 2002, a PDU session may be established between a system (e.g., wireless system, core network, etc.) and/or a wireless device using/via a non-3GPP access network. In step 2004, the SMF may determine (e.g., based on receiving a trigger) to initiate a PDU session using/via a 3GPP access network. In step 2006, the SMF may communicate with the AMF to verify whether the wireless device supports the 3GPP access network. In step 2008, the SMF may determine that the 3GGP access network is supported. In step 2010, the SMF may communicate with the UDR to verify that one or more traffic rules/policies (e.g., ATSSS) is/are supported by the wireless device. In step 2012, the SMF may determine that the wireless device supports a multi-access PDU session. In step 2014, the SMF may request an updated policy/rule from the PCF. In step 2016, the system (e.g., wireless system, core network, etc.) may communicate with the wireless device to establish a PDU session using/via the 3GPP access network. In step 2018, the SMF may update one or more charging rules and/or policies with the CHF and/or user plane with UPF. In step 2020, the SMF may receive, from the wireless device, an establish PDU session request via a 3GPP access network. In step 2022, the SMF may release resources with non-3GPP access network, for example, based on traffic switching being peformed.

In step 2008, the SMF may determine that the 3GPP access network is not supported. In step 2024, the SMF may terminate an attempt/attempts to establish the PDU session using/via the 3GPP access network. In step 2012, the SMF may determine that the wireless device may not support a multi-access PDU session. In step 2024, the SMF may terminate an attempt/attempts to establish the PDU session using/via the 3GPP access network.

Figure 21:
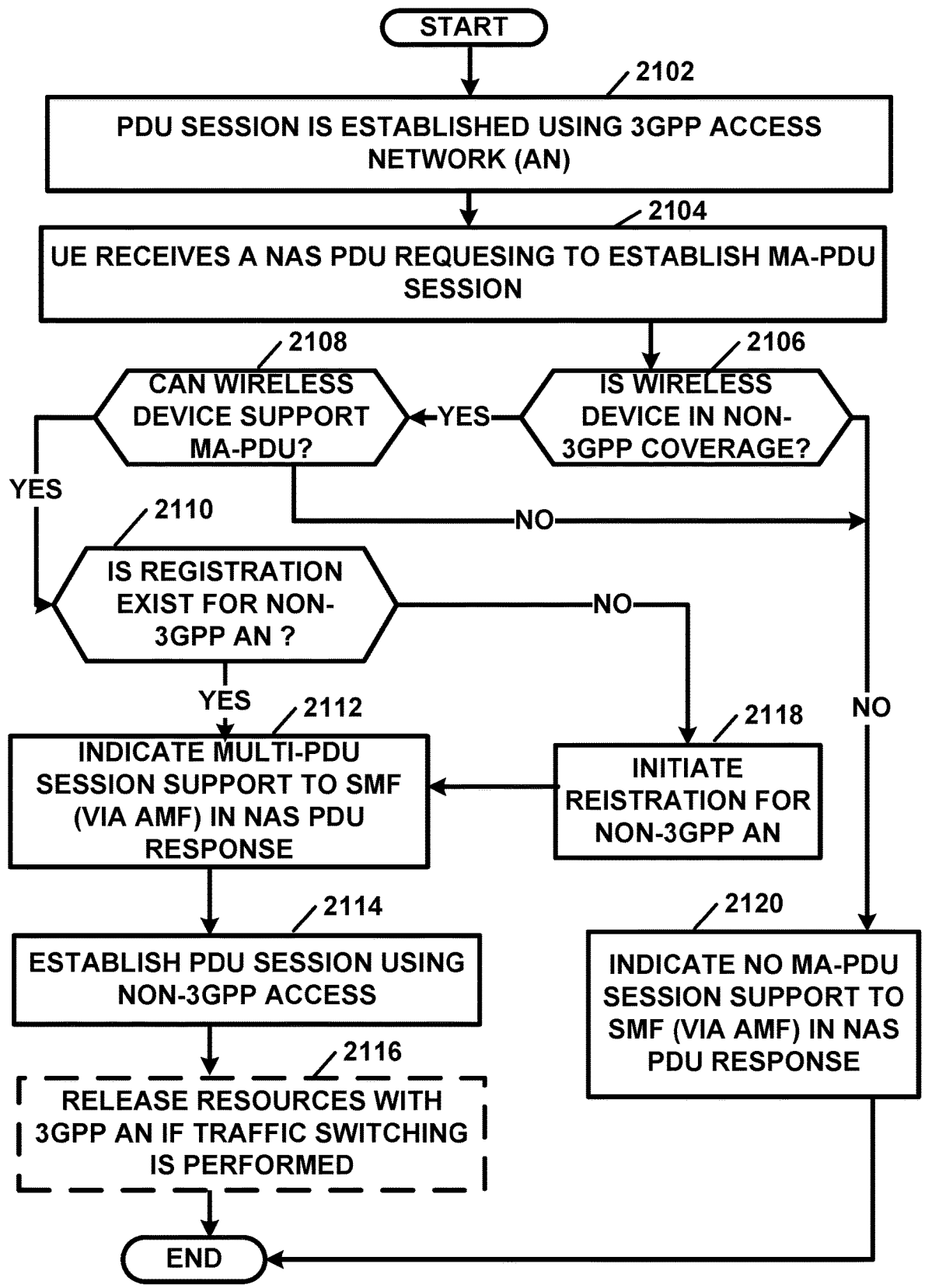
FIG. 21 shows an example method for modification of PDU sessions.

FIG. 21 shows an example method associated with modifying PDU sessions (e.g., for modification of a single-access PDU session (e.g., by a wireless device via a first access network) to support a multi-access PDU session (e.g., using/via a second access network)). In step 2102, a wireless device may establish a PDU session using/via a 3GPP access network. In step 2104, the wireless device may receive a request (e.g., NAS PDU) to establish a multi-access PDU session. In step 2106, the wireless device may determine that the wireless device is within the coverage and/or in the coverage area of a non-3GPP access network. In step 2108, the wireless device may determine that the wireless device supports a multi-access PDU session. In step 2110, the wireless device may determine that registration exists for the non-3GPP access network. In step 2112, the wireless device may indicate a multi-access PDU session support to the SMF (e.g., via the AMF), for example, in a response message (e.g., NAS PDU response). In step 2114, the wireless device may establish the multi-access PDU session using/via the non-3GPP access network. In step 2116, the wireless device may release resources associated with the 3GPP access network, for example, based on traffic switching being peformed.

In step 2106, the wireless device may determine that the wireless device is not within the coverage and/or in the coverage area of the non-3GPP access network. In step 2120, the wireless device may indicate, to the SMF (e.g., via AMF), no multi-access PDU session support, for example, in a response message (e.g., NAS PDU) response. In step 2108, the wireless device may determine that the wireless device does not support a multi-access PDU session. In step 2120, the wireless device may indicate, to the SMF (e.g., via AMF), no multi-access PDU session support, for example, in a response message (e.g., NAS PDU). In step 2110, the wireless device may determine that no registration exists for the non-3GPP access network. In step 2118, the wireless device may initiate registration for the 3GPP access network.

A wireless device may receive a request (e.g., NAS PDU) to modify an existing single-access PDU session to a multi-access PDU session using/via a second access network. The request may comprise an access type of the second access network and/or an identifier of a single-access PDU session of the wireless device. The request may comprise at least one traffic rule for steering, switching, and/or splitting traffic via the multi-access PDU session.

The wireless device may respond/reply with a session modification command acknowledgement message (e.g., NAS PDU) to the system (e.g., wireless system, core network, SMF of a core network, etc.). The session modification command acknowledgement message may be sent via a first access network and/or vai an AMF. The session modification command acknowledgement message may comprise a result of a session modification command request message. The wireless device may determine that the wireless device is within the coverage and/or in the coverage area of a second access network and/or that the wireless device supports a multi-access PDU session. The session modification command acknowledgement message may comprise an indication of support for the multi-access PDU session and/or the identifier of the single-access PDU session of the wireless device.

The wireless device may or may not send, via a first access network, a response of a session modification command request message to modify an existing single-access PDU session to a multi-access PDU session. The wireless device may respond/reply, to the system (e.g., wireless system, core network, etc.), with an indication (e.g., cause value) indicating no radio coverage of a second access network. The wireless device may respond/reply, to the system (e.g., wireless system, core network, etc.), by sending/providing an indication (e.g., cause value indicating) that no multi-access PDU session support.

The wireless device may initiate registration with the second access network, for example, based on sending a registration request message from a system (e.g., wireless system, core network, etc.) to an AMF using/via the second access network. The wireless device may initiate a registration with the second access network. The wireless device may determine that the wireless device is within the coverage and/or in the coverage area of a second access network and/or supports a multi-access PDU session. The wireless device may determine that the wireless device is not registered for a second access network. The wireless device may receive a result of the registration request message. The wireless device may receive the result of the registration message, for example, in a registration accept message (e.g., from the AMF via the second access network).

The wireless device may modify an existing single-access PDU session to a multi-access PDU session, for example, based on sending a PDU session establishment request to the system (e.g., wireless system, core network, etc.) using/via the second access network. The wireless device may determine that it is within the coverage and/or in the coverage area of a second access network and/or that the wireless device supports a multi-access PDU session. The wireless device may determine that the wireless device is registered for a second access network. The PDU session establishment request may comprise an indication of a request for a multi-access PDU session and/or same session identifier. The PDU session establishment request may comprise a session identifier that may be the same as or different from a session identifier of a single-session PDU established using/via a first access network, etc.

Figure 22:
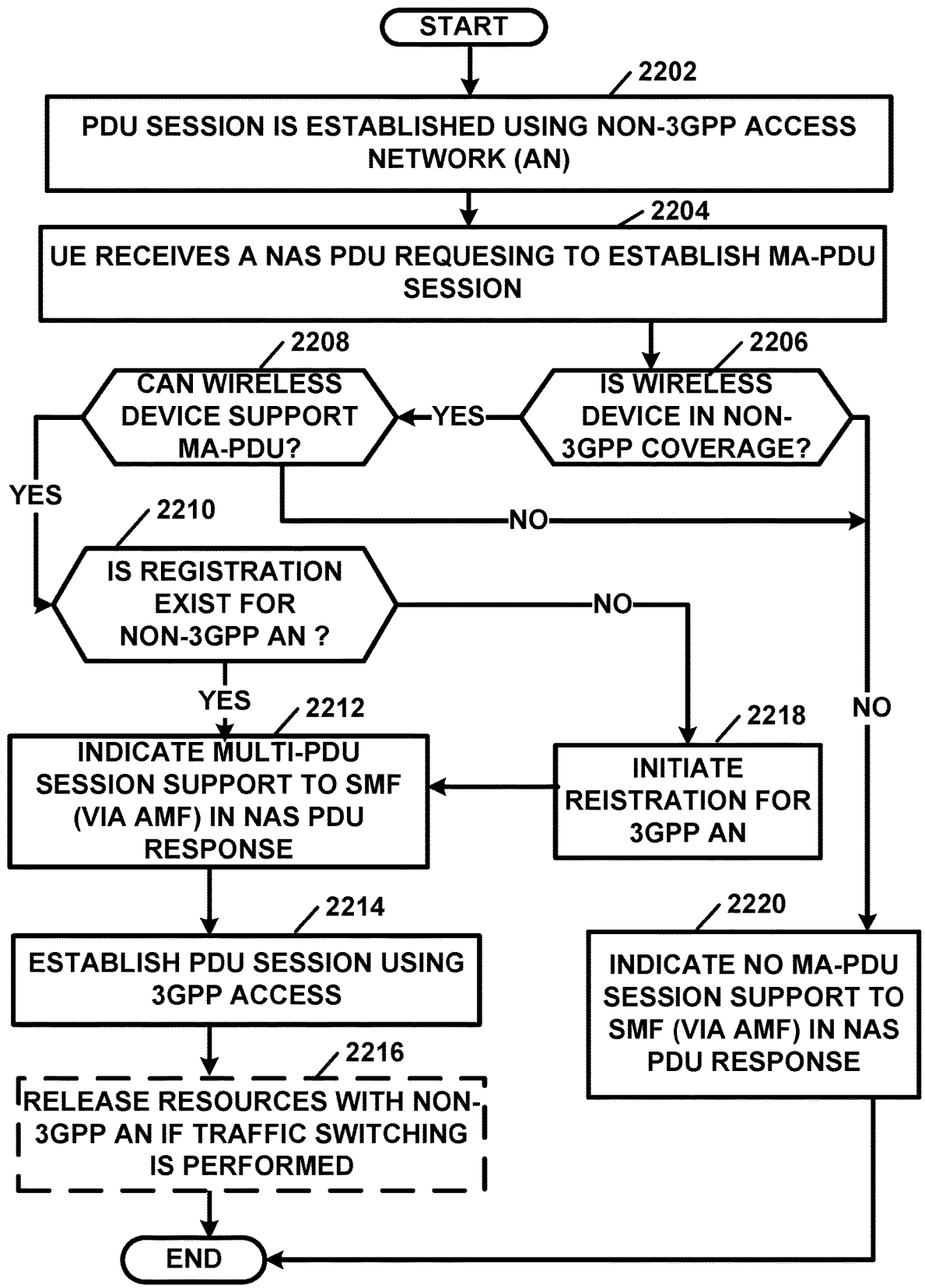
FIG. 22 shows an example method for processing at a wireless device for modification of PDU sessions.

An example FIG. 22 shows an example method associated with modifying PDU sessions (e.g., for processing (e.g., at a wireless device) a modification of a single-access PDU session (e.g., via a second access network) to support a multi-access PDU session (e.g., using/via a first access network)). In step 2202, the wireless device may establish a PDU session using/via a non-3GPP access network. In step 2204, the wireless device may receive a request (e.g., NAS PDU) to establish a multi-access PDU session. In step 2206, the wireless device may determine that the wireless device is within the coverage and/or in the coverage area of a 3GPP access network. In step 2208, the wireless device may determine that the wireless device supports a multi-access PDU session. In step 2210, the wireless device may determine that a registration exists for the 3GPP access network. In step 2212, the wireless device may indicate a multi-access PDU session support to the SMF (e.g., via the AMF), for example, in a response message (e.g., NAS PDU response). In step 2214, the wireless device may establish the multi-access PDU session using/via the 3GPP access network. In step 2216, the wireless device may release resources associated with the non-3GPP access network, for example, based on traffic switching being peformed.

In step 2206, the wireless device may determine that the wireless device is not within the coverage and/or in the coverage area of the non-3GPP access network. In step 2220, the wireless device may indicate, to the SMF (e.g., via AMF), no multi-access PDU session support, for example, in a response message (e.g., NAS PDU response). In step 2208, the wireless device may determine that the wireless device does not support a multi-access PDU session. In step 2220, the wireless device may indicate, to the SMF (e.g., via AMF), no multi-access PDU session support, for example, in a response message (e.g., NAS PDU response). In step 2210, the wireless device may determine that no registration exists for the non-3GPP access network. In step 2218, the wireless device may initiate registration for the 3GPP access network.

A wireless device may establish, via a first access network, a single-access PDU session for the wireless device. The wireless device may receive a session modification command message indicating a request to modify the single-access PDU session to a multi-access PDU session using/via a second access network. The session modification command message may comprise an access type of the second access network and/or an identifier of the single-access PDU session. The session modification command message may comprise at least one traffic rule for steering, switching, and/or splitting traffic via the multi-access PDU session. The wireless device may determine an availability of the second access network, for example, based on or in response to the request to modify the single-access PDU session to a multi-access PDU session using/via a second access network. The wireless device may send a session establishment request message to the second access network requesting modification of the single-access PDU session to the multi-access PDU session.

The wireless device may send, to an AMF, a registration request message. The registration request message may request a registration of the second access network to the second access network. The wireless device may receive, from the second access network, a response to the registration request message. The wireless device may send, to the first access network, a session modification command acknowledgement message comprising an indication of support for the multi-access PDU session and/or the identifier of the single-access PDU session of the wireless device. The wireless device may receive from a SMF, a session modification command message indicating a request to modify the single-access PDU session to the multi-access PDU session using/via the second access network. The wireless device may send, to the SMF, a session modification command acknowledgement message, for example, based on or in response to receiving the session modification command message.

An availability of the second access network may indicate that the wireless device is within the coverage and/or in the coverage area of the second access network. A single-access PDU session may be a PDU session for the wireless device that uses a single radio access network. The single-access PDU session may be a PDU session for the wireless device that uses a single radio access network. A multi-access PDU session may be a PDU session for the wireless device that uses a plurality of radio access networks. A traffic rule may be for steering traffic such that selected data traffic of the multi-access PDU session is sent via a selected one of the first and/or second access networks. A traffic rule may be for switching traffic such that on-going data traffic of the multi-access PDU session is moved from one of the first and/or second access networks to the other one of the first and/or second access networks. A traffic rule may be for splitting traffic such that data traffic of the multi-access PDU session may be sent via both the first and/or second access networks. At least one traffic rule may be an access traffic steering, switching, and/or splitting (ATSSS) rule.

An SMF may establish a single-access packet data unit (PDU) session for a wireless device via a first access network. The SMF may determine to modify the single-access PDU session to a multi-access PDU session using/via the first access network and/or a second access network The SMF may send, to an AMF, a request to verify that the second access network is supported by the wireless device. The SMF may determine to modify the single-access PDU session to a multi-access PDU session. The SMF may send, to the AMF, a session modification command message, for example, based on the indication that the second access network is supported. The session modification command message may comprise an access type of the second access networkand/or an identifier of the single-access PDU session of the wireless device. The session modification command message may comprise at least one traffic rule for steering, switching, and/or splitting traffic via the multi-access PDU session.

The SMF may send to a PCF, a message (e.g., a policy update request message) requesting a policy modification of a single-access PDU session. The message (e.g., policy update request message) may comprise a session identifier of the single-access PDU session and/or a type of the second access network. The SMF may receive, from the PCF, a response (e.g., policy update response message) indicating a result of the policy update request message. The SMF may send a session modification request message to the user plane function (UPF) indicating a request to modify a single-access PDU session to a multi-access PDU session. The session modification request message may comprise at least one traffic rule. The SMF may receive, from the UPF, a session modification response message indicating a result of the session modification request message.

The SMF may send, to a CHF, a charging update request message The charging update request message may comprise a request for a modification of one or more charging rules for the second access network. The charging update request message may comprise the session identifier of the single-access PDU session and/or a type of the second access network. The SMF may receive, from the CHF, a charging update response message, for example, based on or in response to sending the charging update request message. The charging update response message may comprise the session identifier of the single-access PDU session and/or at least one charging rule. The AMF may receive, from the second access network, a session establishment request message requesting modification of the single-access PDU session to the multi-access PDU session using/via the second access network. The SMF may send a UDR a request to verify that a user subscription allows the multi-access PDU session. The SMF may receive, from the UDR, an indication that the multi-access PDU session is supported. A use of the second access network may be determined by a user data management function and/or a policy control function.

The AMF may send, to the first access network, a session modification command message indicating a request to modify the single-access PDU session to the multi-access PDU session using/via the second access network. The AMF may receive, from the first access network, a session modification command acknowledgement message, for example, based on or in response to sending the session modification command message. The session modification command acknowledgement message may comprise an indication of support for the multi-access PDU session and/or the identifier of the single-access PDU session of the wireless device.

The first access network may send, to the wireless device, a session modification command message indicating a request to modify the single-access PDU session to the multi-access PDU session using/via the second access network. The first access network may receive, from the wireless device, a session modification command acknowledgement message, for example, based on or in response to sending the session modification command message. The session modification command acknowledgement message may comprise an indication of support for the multi-access PDU session and/or the identifier of the single-access PDU session of the wireless device.

The SMF may send, to the wireless device, a session modification command message indicating a request to modify the single-access PDU session to the multi-access PDU session using/via the second access network. The SMF may receive, from the wireless device, a session modification command acknowledgement message, for example, based on or in response to sending the session modification command message. The session modification command acknowledgement message may comprise an indication of support for the multi-access PDU session and/or the identifier of the single-access PDU session of the wireless device. The at least one traffic rule may be an access traffic steering, switching, and/or splitting (ATSSS) rule.

A wireless device may perform a method comprising multiple operations. The wireless device may establish a single-access packet data unit (PDU) session, via a first access network, for the wireless device. The wireless device may receive, from the first access network, an indication of a request to modify the single-access PDU session to a multi-access PDU session via a second access network, for the wireless device. The wireless device may determine whether the second access network is available. The wireless device may send, to a network device, a parameter indicating whether the wireless device has radio coverage for the second access network.

The wireless device may also perform one or more additional operations or include additional elements in conjunction with the described method. The network device may comprise a session management function (SMF). The wireless device may send, to the second access network and based on determining that the second access network is available, a request to modify the single-access PDU session to the multi-access PDU session. The wireless device may send, to the second access network, a request for registration of the second access network. The wireless device may modify the single-access PDU session to the multi-access PDU session via the second access network. The receiving the indication may comprise receiving a session modification command comprising at least one of: an access type of the second access network; or an identifier of the single-access PDU session. The session modification command may further comprise at least one traffic rule for the multi-access PDU session.

A session management function (SMF) may perform a method comprising multiple operations. The SMF may establish, a single-access packet data unit (PDU) session, via a first access network, for a wireless device. The SMF may determine to modify the single-access PDU session to a multi-access PDU session using the first access network and a second access network. The SMF may send, to an access and mobility management function (AMF) and based on the determining to modify the single-access PDU session to the multi-access PDU session, a request to verify that the second access network is supported by the wireless device. The SMF may send, to the AMF and based on an indication that the second access network is supported, a message to modify the single-access PDU session to the multi-access PDU session.

The SMF may also perform one or more additional operations or include additional elements in conjunction with the described method. The message may comprise an access type of the second access network; an identifier of the single-access PDU session of the wireless device; and at least one traffic rule for the multi-access PDU session. The SMF may receive, via the second access network and based on determining that the second access network is available, a request to modify the single-access PDU session to the multi-access PDU session. The SMF may receive, via the second access network, a request for registration of the second access network. The SMF may modify the single-access PDU session to the multi-access PDU session via the second access network. The message to modify the single-access PDU session to the multi-access PDU session may be a session modification command, and wherein the session modification command comprises at least one of: an access type of the second access network; or an identifier of the single-access PDU session. The session modification command further comprises at least one traffic rule for the multi-access PDU session.

A wireless device may perform a method comprising multiple operations. The wireless device may send, via a first access network and for a registration process, an indicator of radio capability. The wireless device may establish a single-access packet data unit (PDU) session, via the first access network, for the wireless device. The wireless device may receive, via the first access network and based on the indicator of radio capability, an indication of a request to modify the single-access PDU session to a multi-access PDU session, via a second access network, for the wireless device. The wireless device may modify the single-access PDU session to the multi-access PDU session via the second access network.

The wireless device may also perform one or more additional operations or include additional elements in conjunction with the described method. The wireless device may send, to the second access network, a request for registration of the second access network. The receiving the indication may comprise receiving a session modification command comprising at least one of: an access type of the second access network; or an identifier of the single-access PDU session. The wireless device may send, a parameter indicating whether the wireless device has radio coverage for the second access network. The wireless device may send, to a session management function (SMF), a session modification command acknowledgement that indicates an acceptance of a request to modify an existing single-access PDU session to a multi-access PDU session using the second access network. The wireless device may send, to a session management function (SMF), a session modification command negative acknowledgement that indicates a rejection of a request to modify an existing single-access PDU session to a multi-access PDU session using the second access network.

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
receiving, by a wireless device via a first access network, an indication to modify a single-access packet data unit (PDU) session to a multi-access PDU session via a second access network; and
sending, by the wireless device to a computing device and in response to the indication to modify the single-access PDU session to the multi-access PDU session, a parameter indicating that the multi-access PDU session via the second access network cannot be established for the wireless device.

2. The method of claim 1, wherein the computing device comprises a session management function (SMF).

3. The method of claim 1, further comprising:
sending, by the wireless device via the first access network and for a registration process, an indicator of radio capability, and
wherein the receiving the indication to modify the single-access PDU session to the multi-access PDU session further comprises receiving, by the wireless device via the first access network and based on the indicator of radio capability, the indication to modify the single-access PDU session to the multi-access PDU session via the second access network.

4. The method of claim 1, wherein the receiving the indication to modify the single-access PDU session to the multi-access PDU session comprises receiving a session modification command comprising at least one of:
an access type of the second access network; or
an identifier of the single-access PDU session.

5. The method of claim 4, wherein the session modification command further comprises at least one traffic rule for the multi-access PDU session.

6. The method of claim 1, further comprising sending, by the wireless device to a session management function (SMF), a session modification command negative acknowledgement that indicates a rejection of the indication to modify the single-access PDU session to the multi-access PDU session via the second access network.

7. The method of claim 1, wherein the parameter indicates that the second access network is not available.

8. The method of claim 1, wherein the method further comprises determining that the wireless device has no access coverage for the second access network.

9. A method comprising:
receiving, by a wireless device via a first access network, an indication to modify a single-access packet data unit (PDU) session to a multi-access PDU session via a second access network; and
sending, by the wireless device to a computing device and in response to the indication to modify the single-access PDU session to the multi-access PDU session, a parameter indicating that the multi-access PDU session via the second access network can be established for the wireless device.

10. The method of claim 9, wherein the computing device comprises a session management function (SMF).

11. The method of claim 9, further comprising sending, by the wireless device via the second access network, an indication for registration of the second access network.

12. The method of claim 9, further comprising:
sending, by the wireless device via the first access network and for a registration process, an indicator of radio capability,
wherein the receiving the indication to modify the single-access PDU session to the multi-access PDU session further comprises receiving, by the wireless device via the first access network and based on the indicator of radio capability, the indication to modify the single-access PDU session to the multi-access PDU session via the second access network.

13. The method of claim 9, wherein the receiving the indication to modify the single-access PDU session to the multi-access PDU session comprises receiving a session modification command comprising at least one of:
an access type of the second access network; or
an identifier of the single-access PDU session.

14. The method of claim 13, wherein the session modification command further comprises at least one traffic rule for the multi-access PDU session.

15. The method of claim 9, wherein the parameter indicates that the second access network is available.

16. The method of claim 9, wherein the method further comprises determining that the wireless device has access coverage for the second access network.

17. A method comprising:
sending, by a base station to a wireless device via a first access network, an indication to modify a single-access packet data unit (PDU) session to a multi-access PDU session via a second access network;
receiving, from the wireless device, in response to the indication to modify the single-access PDU session to the multi-access PDU session, a parameter indicating that the multi-access PDU session via the second access network can be established for the wireless device; and
sending, to a computing device, an acknowledgement for modifying the single-access PDU session to the multi-access PDU session.

18. The method of claim 17, wherein the acknowledgement comprises a session modification command acknowledgement.

19. The method of claim 17, wherein the computing device comprises an access and mobility management function (AMF) device.

20. The method of claim 17, wherein the second access network comprises a non-3GPP access network.

21. The method of claim 17, wherein the sending the indication to modify the single-access PDU session to the multi-access PDU session comprises sending a session modification command comprising at least one of:
   an access type of the second access network; or
   an identifier of the single-access PDU session.

22. The method of claim 21, wherein the session modification command further comprises at least one traffic rule for the multi-access PDU session.

23. The method of claim 17, wherein the sending the acknowledgement for modifying the single-access PDU session to the multi-access PDU session is based on receiving the parameter indicating that the multi-access PDU session via the second access network can be established for the wireless device.

24. The method of claim 17, wherein the parameter further indicates that the wireless device supports the multi-access PDU session.

25. The method of claim 17, wherein the parameter indicates at least one of:
   that the second access network is available; or
   that the wireless device has access coverage for the second access network.

* * * * *

UNITED STATES PATENT AND TRADEMARK OFFICE
CERTIFICATE OF CORRECTION

PATENT NO. : 11,729,854 B2
APPLICATION NO. : 16/733535
DATED : August 15, 2023
INVENTOR(S) : Bharatia et al.

It is certified that error appears in the above-identified patent and that said Letters Patent is hereby corrected as shown below:

On the Title Page

Page 2, Column 2, Item (56) Other Publications, Line 17:
Delete "Souice:" and insert --Source:-- therefor In the Drawings Sheet 22 of 23, Fig. 21, Reference Numeral 2104, Line 1:
Delete "REQUESING" and insert --REQUESTING-- therefor Sheet 22 of 23, Fig. 21, Reference Numeral 2118, Line 2:
Delete "REISTRATION" and insert --REGISTRATION-- therefor Sheet 23 of 23, Fig. 22, Reference Numeral 2204, Line 1:
Delete "REQUESING" and insert --REQUESTING-- therefor Sheet 23 of 23, Fig. 22, Reference Numeral 2218, Line 2:
Delete "REISTRATION" and insert --REGISTRATION-- therefor In the Specification Column 6, Detailed Description, Line 12:
Delete "SLAB" and insert --SLAs-- therefor Column 7, Detailed Description, Line 66:
Delete "105, 25" and insert --105, 205-- therefor Column 8, Detailed Description, Line 8:
Delete "100, 100." and insert --100, 200.-- therefor Signed and Sealed this
Eighth Day of October, 2024

Katherine Kelly Vidal
*Director of the United States Patent and Trademark Office*

CERTIFICATE OF CORRECTION (continued)
U.S. Pat. No. 11,729,854 B2

Column 8, Detailed Description, Line 53:
Delete "22" and insert --322-- therefor Column 13, Detailed Description, Line 46:
Delete "100, 100" and insert --100, 200-- therefor Column 20, Detailed Description, Lines 58-59:
Delete "100, 20" and insert --100, 200-- therefor Column 26, Detailed Description, Lines 32-33:
Delete "16, 260)." and insert --160, 260).-- therefor Column 26, Detailed Description, Line 39:
Delete "16, 260)." and insert --160, 260).-- therefor Column 36, Detailed Description, Line 29:
Delete "1002" and insert --155-- therefor Column 37, Detailed Description, Line 19:
Delete "1102" and insert --1002-- therefor Column 37, Detailed Description, Lines 22-23:
Delete "150, 250" and insert --160, 260-- therefor Column 39, Detailed Description, Lines 55-56:
Delete "Nsmf_PDUS_ession_CreateSMContext" and insert --Nsmf_PDUSession_CreateSMContext-- therefor Column 40, Detailed Description, Line 58:
Delete "1220." and insert --1215.-- therefor Column 46, Detailed Description, Line 36:
Delete "nework" and insert --network-- therefor Column 46, Detailed Description, Line 37:
Delete "UPF(PSA)" and insert --UPF (PSA)-- therefor Column 48, Detailed Description, Line 26:
Delete "nework" and insert --network-- therefor Column 48, Detailed Description, Line 28:
Delete "UPF(PSA)" and insert --UPF (PSA)-- therefor Column 48, Detailed Description, Line 42:
Delete "1502," and insert --1504,-- therefor

CERTIFICATE OF CORRECTION (continued)
U.S. Pat. No. 11,729,854 B2

Column 48, Detailed Description, Line 45:
Delete "nework" and insert --network-- therefor Column 48, Detailed Description, Line 46:
Delete "UPF(PSA)" and insert --UPF (PSA)-- therefor Column 49, Detailed Description, Line 21:
Delete "1502." and insert --1504.-- therefor Column 49, Detailed Description, Line 21:
Delete "nework" and insert --network-- therefor Column 49, Detailed Description, Line 23:
Delete "UPF(PSA)" and insert --UPF (PSA)-- therefor Column 51, Detailed Description, Line 24:
Delete "etc. etc.)" and insert --etc.)-- therefor Column 56, Detailed Description, Line 15:
Delete "requrest." and insert --request.-- therefor Column 56, Detailed Description, Line 67:
Delete "peformed." and insert --performed.-- therefor Column 59, Detailed Description, Line 45:
Delete "peformed." and insert --performed.-- therefor Column 60, Detailed Description, Line 9:
Delete "peformed." and insert --performed.-- therefor Column 60, Detailed Description, Line 38:
Delete "vai" and insert --via-- therefor Column 61, Detailed Description, Line 46:
Delete "peformed." and insert --performed.-- therefor Column 62, Detailed Description, Line 57:
After "network", insert --.--

Column 62, Detailed Description, Line 66:
Delete "networkand/or" and insert --network and/or-- therefor